US008281237B1

(12) United States Patent
Stewart et al.

(10) Patent No.: US 8,281,237 B1
(45) Date of Patent: Oct. 2, 2012

(54) SYSTEM, METHOD AND RECORDABLE MEDIUM FOR PRINTING SERVICES OVER A NETWORK AND GRAPHICAL USER INTERFACE

(75) Inventors: Jeff Stewart, New York, NY (US); Jennifer R. Pinco, New York, NY (US)

(73) Assignee: Mimeo.com, Inc., New York, NY (US)

( * ) Notice: Subject to any disclaimer, the term of this patent is extended or adjusted under 35 U.S.C. 154(b) by 1843 days.

(21) Appl. No.: 09/709,433

(22) Filed: Nov. 13, 2000

Related U.S. Application Data

(60) Provisional application No. 60/164,723, filed on Nov. 12, 1999, provisional application No. 60/165,643, filed on Nov. 15, 1999, provisional application No. 60/165,651, filed on Nov. 15, 1999.

(51) Int. Cl.
*G06F 17/00* (2006.01)
(52) U.S. Cl. ....................................... 715/273; 715/274
(58) Field of Classification Search .................. 715/530, 715/526, 527, 523, 524, 200, 273, 274, 275; 709/200, 202, 203, 206, 237
See application file for complete search history.

(56) References Cited

U.S. PATENT DOCUMENTS

| 5,559,933 | A | 9/1996 | Boswell |
| 5,592,683 | A | 1/1997 | Chen et al. |
| 5,873,073 | A | 2/1999 | Bresnan et al. |
| 5,956,483 | A | 9/1999 | Grate et al. |
| 5,963,216 | A | 10/1999 | Chiarabini et al. |
| 5,991,760 | A | 11/1999 | Gauvin et al. |
| 6,003,069 | A | 12/1999 | Cavill |
| 6,012,068 | A | 1/2000 | Boezeman et al. |
| 6,020,972 | A | 2/2000 | Mahoney et al. |
| 6,055,566 | A | 4/2000 | Kikinis |
| 6,073,147 | A | 6/2000 | Chan et al. |
| 6,073,168 | A | 6/2000 | Mighdoll et al. |
| 6,084,883 | A | 7/2000 | Norrell et al. |
| 6,125,372 | A | 9/2000 | White |
| 6,134,568 | A * | 10/2000 | Tonkin ......................... 715/209 |
| 6,167,567 | A | 12/2000 | Chiles et al. |
| 6,189,993 | B1 | 2/2001 | Mantell |
| 6,247,011 | B1 | 6/2001 | Jecha et al. |
| 6,314,408 | B1 | 11/2001 | Salas et al. |
| 6,330,067 | B1 | 12/2001 | Murata |
| 6,427,169 | B1 | 7/2002 | Elzur |
| 6,430,607 | B1 | 8/2002 | Kavner |
| 6,498,656 | B1 | 12/2002 | Mastie et al. |
| 6,600,569 | B1 | 7/2003 | Osada et al. |

(Continued)

OTHER PUBLICATIONS

"QMS Printing Notes for Windows Applications," Jun. 20, 1995, Konica Minolta, pp. 1-5, <http://printer.konicaminolta.com/drivers/windows/winapps.txt>.*

(Continued)

*Primary Examiner* — A. M. Queler
(74) *Attorney, Agent, or Firm* — Hoffman Warnick LLC

(57) ABSTRACT

This invention relates to a system and method to configure, view, and order a document online. The document is uploaded from a client and transferred over a network to a server. The server includes software that allows a user to configure and preview the document online. The user may change configuration parameters as desired. Once the configuration process is complete, the user may order the document, specifying multiple recipients as desired. The user is then billed for the order and the document is delivered to the indicated recipient(s).

5 Claims, 58 Drawing Sheets

U.S. PATENT DOCUMENTS

| | | | |
|---|---|---|---|
| 6,615,234 B1 * | 9/2003 | Adamske et al. | 709/203 |
| 6,633,395 B1 | 10/2003 | Tuchitoi et al. | |
| 6,816,270 B1 | 11/2004 | Cooper et al. | |
| 6,857,009 B1 | 2/2005 | Ferreria et al. | |
| 6,889,379 B1 | 5/2005 | Lindhorst et al. | |
| 6,967,728 B1 | 11/2005 | Vidyanand | |
| 2001/0043753 A1 | 11/2001 | Grohs et al. | |
| 2001/0055492 A1 | 12/2001 | Wood et al. | |

OTHER PUBLICATIONS

Microsoft Press Computer Dictionary, 1993, Microsoft Press, Second Edition, p. 417.*

Since 1992, Xerox Production Printing Services, 2.3.04, Xerox Document Submission Application.

1998 by CAP Ventures "Electronic Print Job Submission".

"Xerox Year 2000 Product Compliance Status Product Details" from www.xerox.com Nov. 20, 2000.

U.S. Appl. No. 10/668,701, "Final Office Action", Aug. 24, 2009, in 14 pages.

U.S. Appl. No. 10/668,701, "After Final Amendment", Oct. 26, 2009, in 14 pages.

U.S. Appl. No. 09/709,486, Notice of Allowance, Jun. 6, 2006, 6 pages.

U.S. Appl. No. 09/709,486, Amendment to Office Action, Feb. 17, 2006, 19 pages.

U.S. Appl. No. 09/709,486, Office Action, Nov. 17, 2005, 8 pages.

U.S. Appl. No. 09/709,486, Advisory Action, Oct. 14, 2005, 3 pages.

U.S. Appl. No. 09/709,486, Amendment to Final Office Action, Sep. 23, 2005, 13 pages.

U.S. Appl. No. 09/709,486, Final Office Action, Jul. 26, 2005, 12 pages.

U.S. Appl. No. 09/709,486, Amendment to Office Action, Apr. 8, 2005, 20 pages.

U.S. Appl. No. 09/709,486, Office Action, Oct. 6, 2004, 18 pages.

U.S. Appl. No. 10/668,701, RCE Amendment, Nov. 15, 2008, 13 pages.

U.S. Appl. No. 10/668,701, Advisory Action, Oct. 16, 2008, 3 pages.

U.S. Appl. No. 10/668,701, Amendment to Final Office Action, Sep. 17, 2008, 12 pages.

U.S. Appl. No. 10/668,701, Final Office Action, Jul. 15, 2008, 8 pages.

U.S. Appl. No. 10/668,701, Amendment to Office Action, Apr. 8, 2008, 11 pages.

U.S. Appl. No. 10/668,701, Office Action, Dec. 14, 2007, 8 pages.

U.S. Appl. No. 10/668,701, RCE Amendment, Sep. 13, 2007, 11 pages.

U.S. Appl. No. 10/668,701, Final Office Action, Jun. 13, 2007, 9 pages.

U.S. Appl. No. 10/668,701, Amendment to Office Action, Mar. 13, 2007, 11 pages.

U.S. Appl. No. 10/668,701, Office Action, Nov. 28, 2006, 6 pages.

Julian Moss, Tech-Pro, TCP/IP Basics, Sep. 1997, 11 printed pages from http://www.tech-pro.net/intro_tcp.html.

* cited by examiner

FIG. 11

Home Page

Sign-up Screen

Download Screen
Determines the users operating system and browser and gives appropriate software version and instructions.

Install Screen

Print to Mimeo.com
Select print from the file menu

Print Dialogue Box

Print Dialogue Box

Reminder Screen

Name & Encrypt Document

Compress document

Secure Sign in

Transfer Document to Mimeo.com

Transferring Document

Transfer Complete

Rendering Document for Preview

FIG. 17A

Library

Ezviewer (Exact Print Configurator)
Users configure and preview the 'printed' document in real time. The price per copy is updated immediately and the user can navigate and preview the entire document.

Ezviewer (Exact Print Configurator)
Paper options

Ezviewer (Exact Print Configurator)
Printing options

Ezviewer (Exact Print Configurator)
Binding Options

Ezviewer (Exact Print Configurator)
Cover options

Ezviewer (Exact Print Configurator) Zoom
Zoom into any page and preview the 'printed' document in full size.

FIG. 17H

Shopping Cart
Add multiple documents to an order and input number of copies of each document Addressing
Send documents to multiple recipients

Delivery options
Delivery options for each recipient are shown by date, price and delivery method.

FIG. 17K

Memo
Users can create a customized memo for the package cover slip.

FIG. 17L

Summary

FIG. 17M

Payment

FIG. 17N

Order Confirmation

Order History

Order Detail / Tracking

FIG. 17R

Account Profile

FIG. 17S

Address Book

SYSTEM, METHOD AND RECORDABLE MEDIUM FOR PRINTING SERVICES OVER A NETWORK AND GRAPHICAL USER INTERFACE

BENEFIT OF EARLIER FILED APPLICATION

This application claims the benefit of U.S. Provisional Application No. 60/164,723, filed Nov. 12, 1999, U.S. Provisional Application No. 60/165,643, filed Nov. 15, 1999, and U.S. Provisional Application No. 60/165,651, filed Nov. 15, 1999.

TECHNICAL FIELD

The present invention relates to a system, method and recordable medium for uploading data across a network, and in particular, to uploading a document across the network for printing services, and configuring, ordering, and viewing the document online.

BACKGROUND ART

Photocopying and reproduction services have been around since the turn of the century. These services traditionally include a variety of competition ranging from internal copy centers and network printers to outsourced and quick copy centers. These photocopying and reproduction services are used in a wide variety of commercial and non-commercial businesses. For example, publishers, firms, universities, sales professionals, training professionals, international consumers, corporations, individuals, sole proprietors, mobile offices, home offices, business travelers and content producers all utilize photocopying and reproduction services.

Internal copy centers may be found, for example, in many businesses. Internal copy centers typically handle photocopying and reproduction for personnel internal to a specific business. These copy centers are, however, often overburdened with the amount of material that they are required to produce, and are often under-staffed and limited in the number of machines that can perform the services. They are also often unreliable to users, require supervision, are often not available after certain hours and do not deliver the package after the services have been completed.

Local network printers, such as a printer attached to a personal computer, are also widely used as a photocopy and reproduction service. Local network printers often suffer from problems such as running out of toner, being in an inconvenient location, very little if any color capability, a lack of confidentiality, lack of preferred software and fonts, and no binding, stapling or shipping.

Outsourced copy centers function similar to internal copy centers except that they are run by an outside copy service. Hence, the problems associated with an internal copy center are similarly attributable to outside copy centers. In addition, the consumer must now associate with persons outside of their business. As is often the case, the exchange of information (i.e. getting the material to the outsourced service, conveying the method of binding, etc.) is miscommunicated and/or not properly conveyed. Quick copy centers (a specific kind of outsourced copy center), such as Kinko's®, Sir Speedy® and KwikCopy®, enable consumers to copy, reproduce and bind. However, these centers have the disadvantages of inconsistent quality and service between stores, inconsistent service offerings, diluted brands, and inconvenient locations.

FIG. 1 illustrates a conventional process that a consumer must follow in order to copy or reproduce a document using, for example, the above noted copy centers. First, the consumer must save the document to disk. Then the consumer must walk to the copy center and wait in line for access to a computer and printer. The consumer can then only hope that the copy center has the necessary software and the same version of the software and the fonts that the consumer used in the document. An order must then be placed, and the consumer must wait for the order to be printed. Once the order has been printed, the consumer must then place the order for copy services, wait for a first copy to preview the document, confirm the order, walk back to the office, wait for copies to finish printing, walk back to the copy center and wait in line to pick up the copies. Finally, the copies must be sent to their final destination by some form of mail delivery. As explained above and by the Quick Copy Center diagram, the process is time consuming and lengthy.

As noted above, copy centers do not afford the consumer the ability to preview a document prior to completion of the service. For example, a consumer cannot view either the document as a whole or parts of the document, such as the font of the document, the binding and/or the color of the cover, until after completion of the entire photocopying and reproduction process. Hence, if the completed product is not satisfactory to the consumer, the entire process must be repeated. This not only increases the time for copying and reproduction, but also inevitably increases the costs to both the consumer and the service provider.

SUMMARY OF THE INVENTION

In one embodiment of the invention, there is an interface to deliver a document from a client to a web server over a network. The interface includes, for example, providing the document selected for delivery at the client, uploading the document over the network to the web server, receiving configuration information corresponding to a configuration of the document, and displaying the document on the interface according to the configuration information.

In another embodiment of the invention, there is a method to view a document. The method includes, for example, uploading a document from a client to a web server, providing an interface, inputting via the interface configuration information corresponding to a configuration of the document and displaying an image of the document that represents the physical appearance of the document according to the configuration information.

In still another embodiment of the invention, there is a system to deliver a document from a client to a web server over a network. The system includes, for example, an interface to configure and order the document, an upload manager uploading the document from the client and transferring the document to the web server, and a facility delivering the configured document to a specified delivery address.

In yet another embodiment of the invention, there is an interface for delivering a document over a network. The interface includes, for example, an application enabling a user to select the document for delivery, an upload manager launching the interface to view the document as a result of selecting the document for delivery.

In still another embodiment of the invention, there is a system for delivery of a document using an interface over a network. The system includes, for example, an application to select the document for delivery, and an upload manager to upload the document to a web server and launch the interface, wherein the interface allows a user to view the document selected.

In yet another embodiment of the invention, there is a method for delivering a document over a network. The method includes, for example, providing an application to enable a user to select a document for delivery of the document, and launching the interface for viewing the document as a result of selecting the document for delivery.

In still another embodiment of the invention, there is a method for delivery of a document over a network. The method of the invention includes, for example, providing an application to select the document for delivery, providing an interface to view the document selected, and uploading the document to a web server and launching the interface.

BRIEF DESCRIPTION OF THE DRAWINGS

The figures relate to a system, method and recordable medium of the present invention. They are merely illustrative in nature and do not limit the scope of invention to their disclosed embodiments.

FIG. 11 depicts an illustrative home page.

DETAILED DESCRIPTION OF THE INVENTION

This invention supports an efficient system, method and recordable medium to copy or reproduce documents. A user may select various binding, formatting and payment options and preview the impact of such selections on a final document prior to the document being reproduced according to such selections. The system, method and recordable medium operates over a network, such as the Internet. Therefore, the user may be located anywhere in the world and request copying or reproduction of a document according to specific parameters, and may view the final document electronically before the final document is produced in a hard copy format. The user may change the document formatting and other options as desired with the preview feature. Such changes are performed in real-time from the user's computer and do not require the time and resources of a conventional copy center. Additionally, the user is not subject to waiting in line while copy center personnel handle previous requests placed by other consumers. Once an order has been placed to the reproduction system, the user can track the order to determine its status at any time during its processing.

Figure 1:
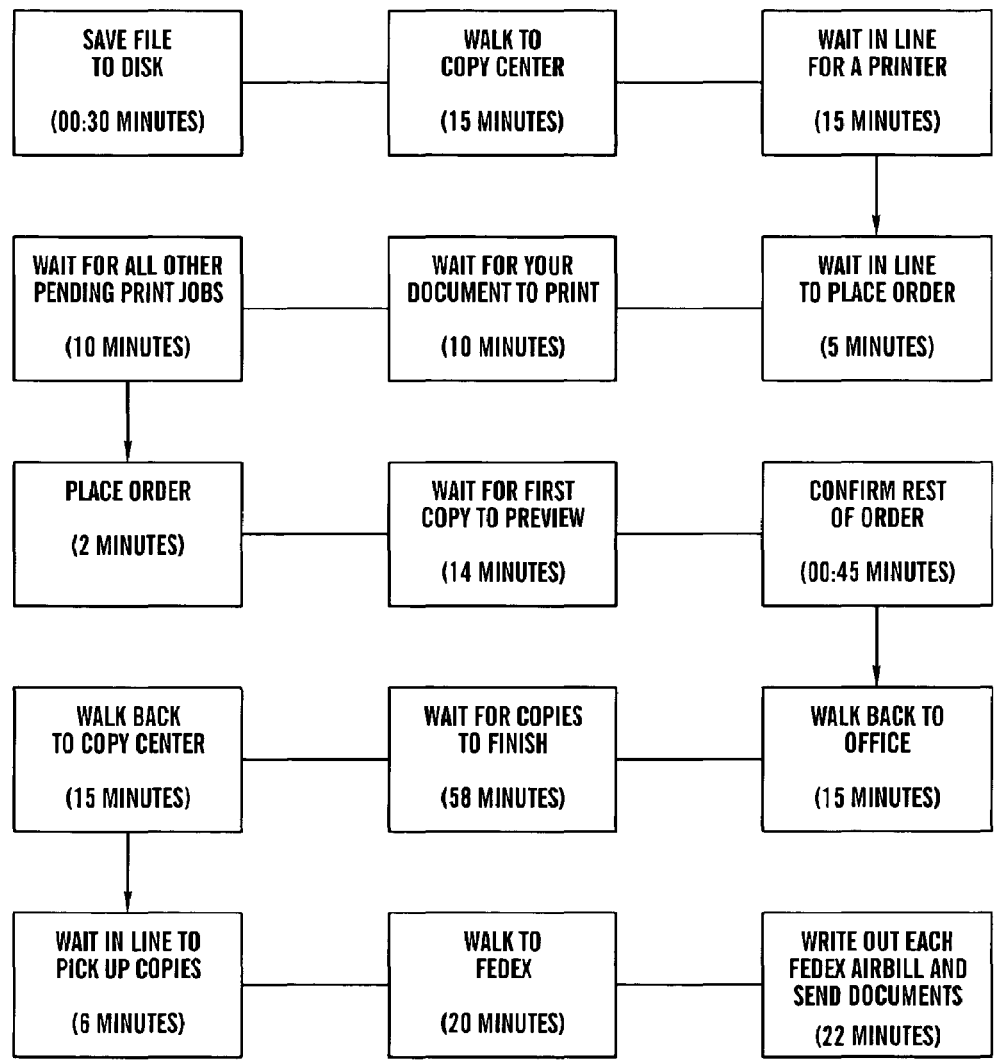
FIG. 1 illustrates a conventional process that a consumer must follow in order to copy or reproduce a document.
Figure 2A:
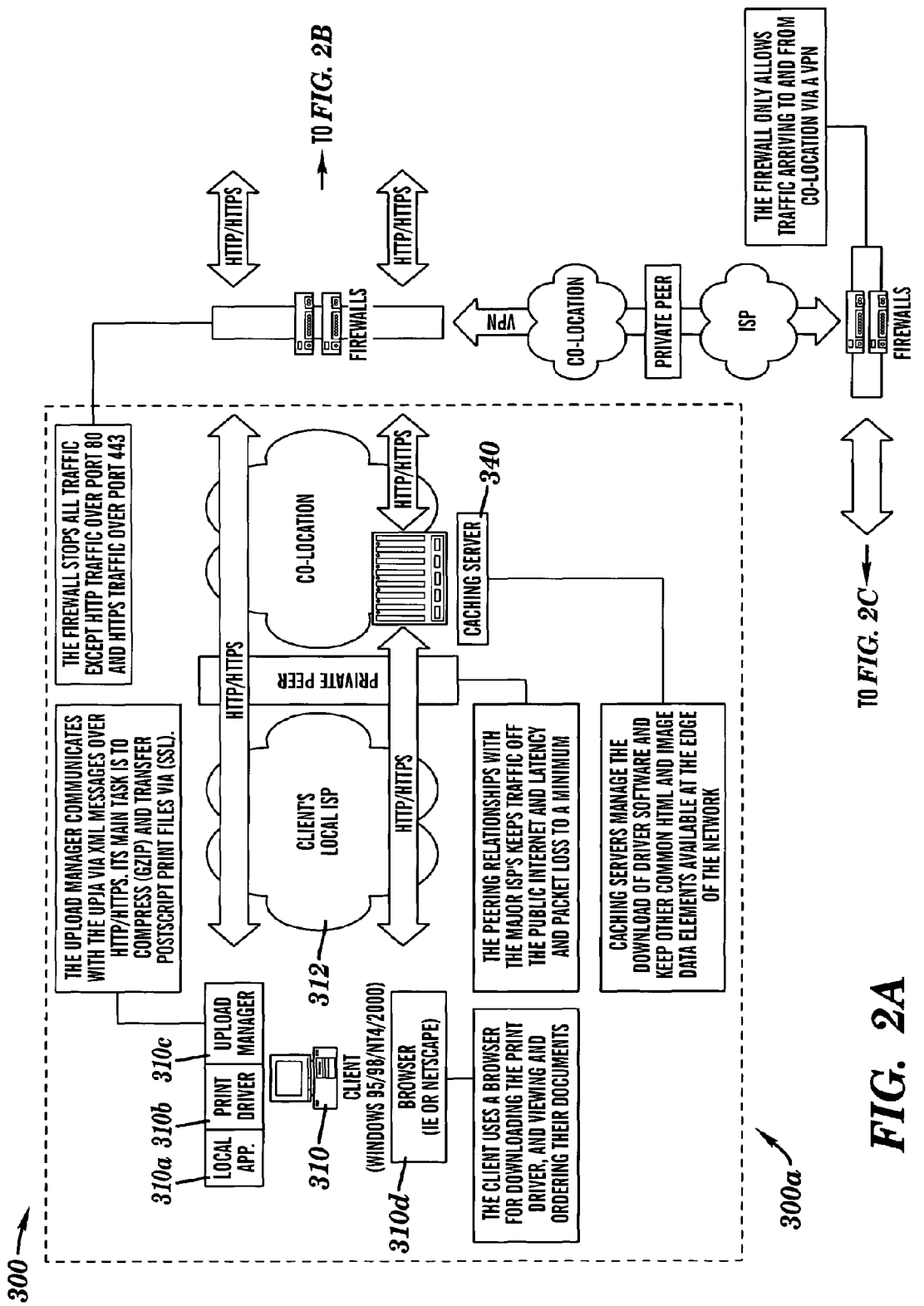
FIGS. 2A-2C, hereinafter collectively referred to as FIG. 2, illustrate an exemplary network of the invention.
Figure 2B:
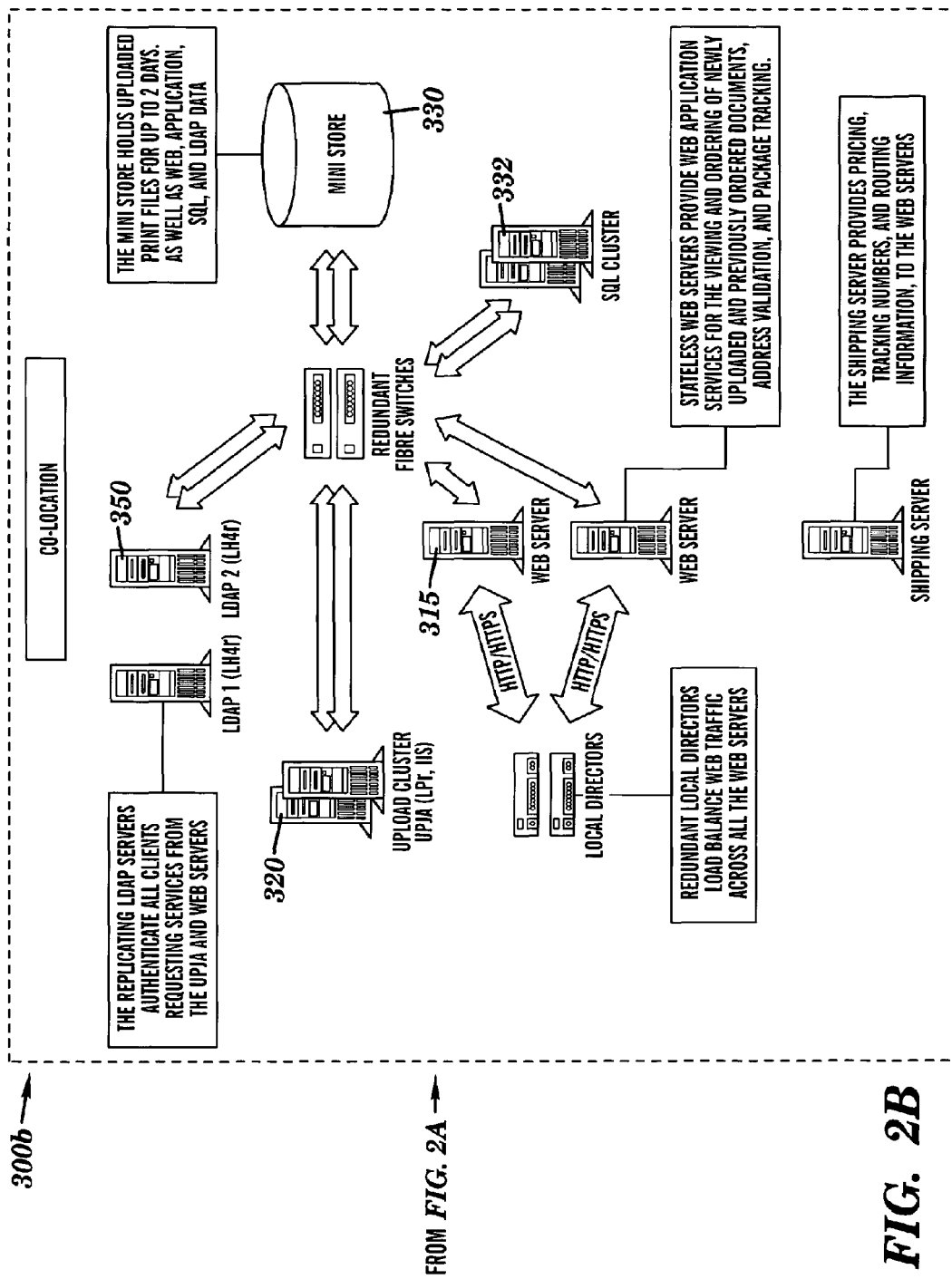
Figure 2C:
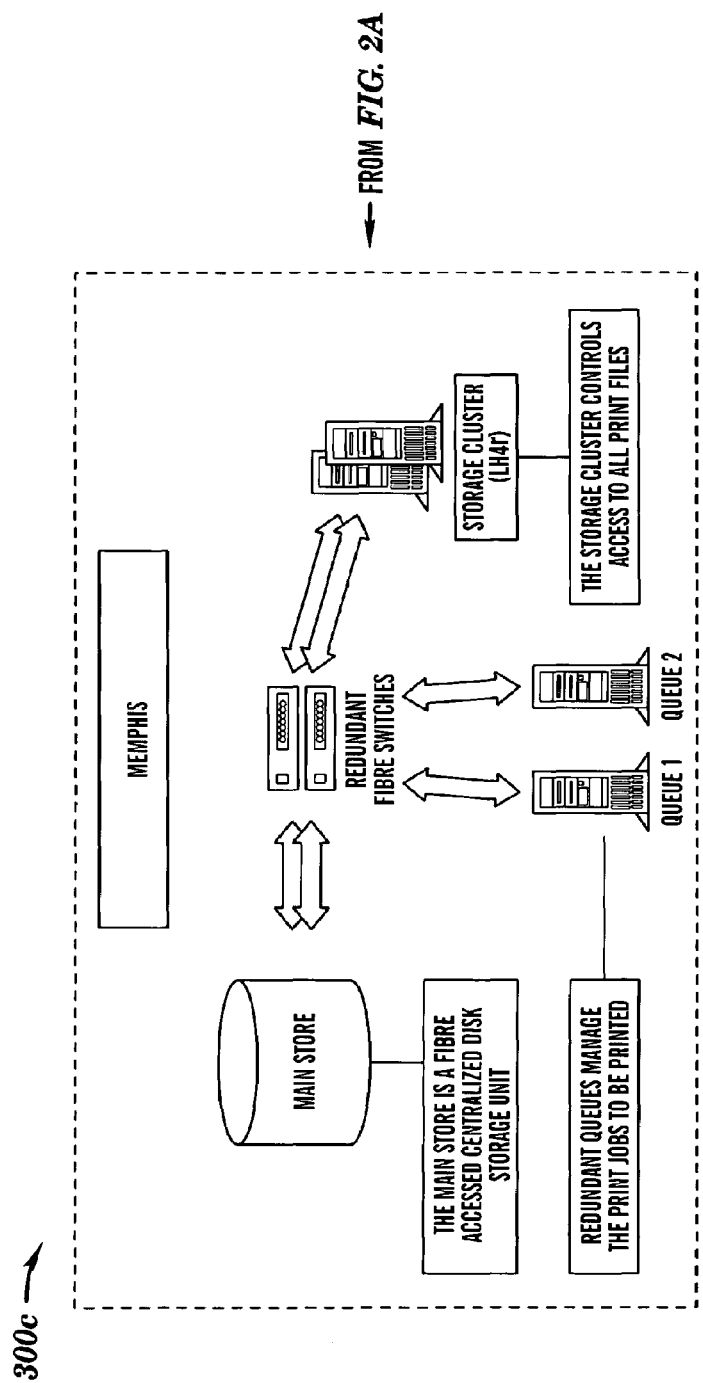

Communication of data occurs over a network, such as a LAN, WAN, internet, or the network illustrated in the various Figures. FIG. 2 illustrates an exemplary network of the invention. Connection to the network 300 can also occur, for example, by modem or dial-up telephone connection, or as readily understood by one having skill in the art. The network 300 illustrated in the FIG. 2 includes, for example, a client 310, a local internet service provider (ISP) 312, a universal print job acceptor ("UPJA") 320, a storage unit (e.g. a mini store) 330, and multiple web servers 315. The network 300 described in FIG. 2 is exemplary and can be modified as readily understood by one having ordinary skill in the art.

The network 300 can be divided, for explanatory purposes, into three sections: the client side of the network 300a, the back end side of the network 300b and the printing side of the network 300c. Communication between the client side 300a, the back end side 300b and the printer side 300c occurs, for example, through the network 300. As illustrated in FIG. 2, added levels of security, such as use of firewalls, ensure that information sent over the network 300 is not disturbed (e.g. the information is not modified, changed or breached). Generally speaking, a user on the client side 300a of the network can request printing from, for example, a personal computer, and generate a document for shipping and/or delivery from printer side 300c. The back end side 300b of the network 300 is transparent to the user.

Figure 3:
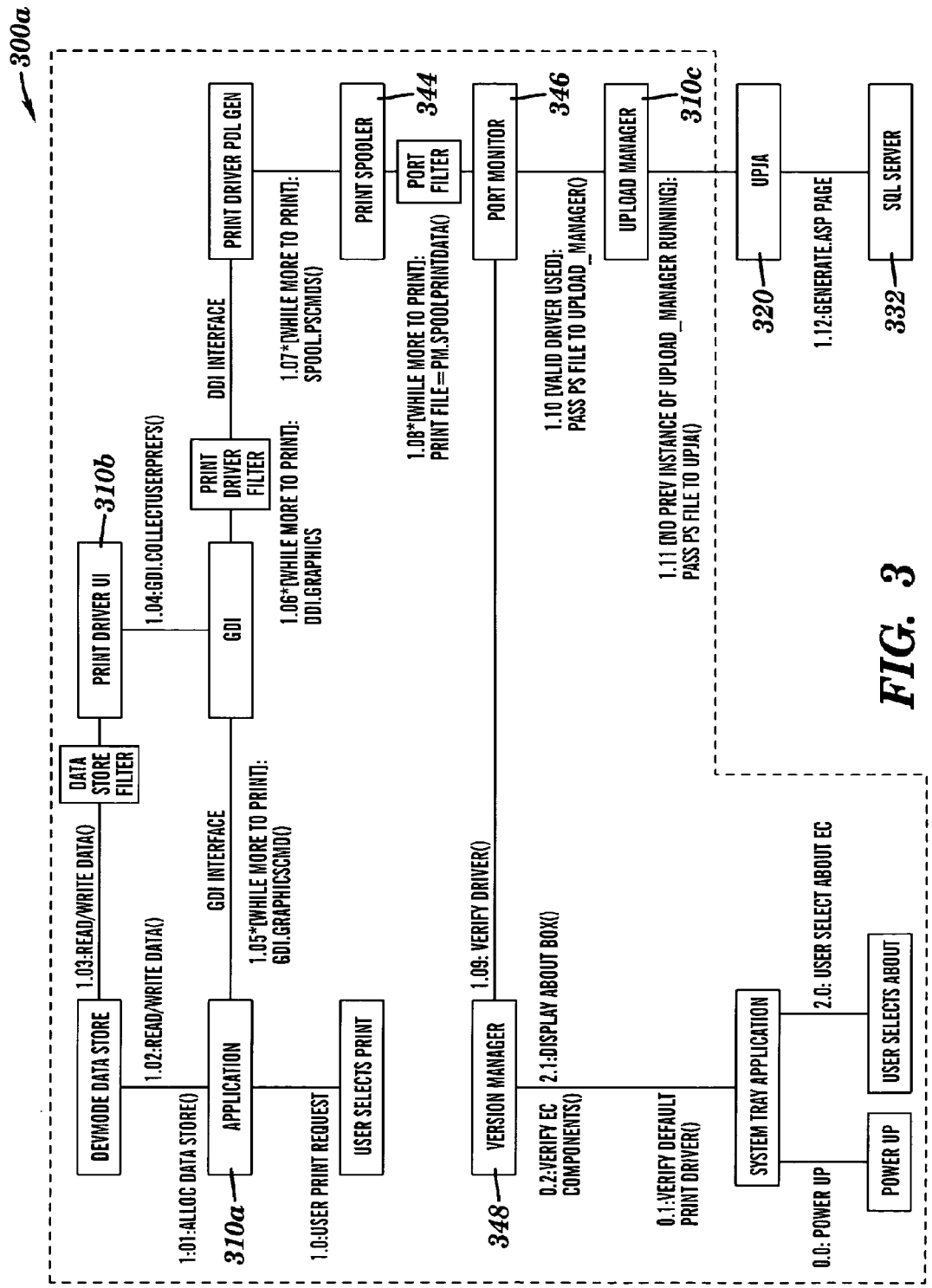
FIG. 3 is an exemplary diagram of an embodiment of the system in the invention.

FIG. 3 is an exemplary diagram of an embodiment of the system in the present invention. FIG. 3 primarily illustrates the client side 300a of the network 300, with the addition of the UPJA 320 and database, such as a SQL server 332, which are on the back end side 300b of the network 300 as shown in FIG. 2. The system includes, for example, a Data Store, a Print Driver UI 310b, a local application 310a, a graphics library, a Print Driver PDL Gen, a Print Spooler 344, a Port Monitor 346, an Upload Manager 310c, a Universal Print Job Acceptor (UPJA) 320, a SQL server 332, a Version Manager 348, and a System Tray Application which allows pop-up menus and user selection of icons.

First, relevant file information (parameters) will be sent from the spooler 344 via the port monitor 346 and upload manager 310c to a web server 320 (e.g. UPJA). The relevant file information includes, for example, a handle identifying the location of the printer, printer name, job id, printing level, and document information such as color, stapling, etc. After the relevant file information is sent to the port monitor 346, a check is performed to determine whether a valid component (e.g. a print driver 310b) is being used, for example, to print the document. In the preferred embodiment, the print driver resides as a file on the client, and comprises Windows™ based code. The print driver 310b may be installed, for example, by downloading it from a server or installed from disk. In order to validate the print driver 310b, the name of the print driver 310b is sent to the version manager 348, and a check (e.g. a CRC) is performed to compare the components of the print driver stored in the file with information stored in a registry. The registry includes, for example, predetermined information which can authenticate that a valid print driver is being used. If the comparison results in an invalid print driver, the data file (document) will not be sent (uploaded) to the web server. If, on the other hand, the comparison results in a determination that the component (print driver) is valid, then the data file is sent from the print spooler 344 to the port monitor 346. The data file is sent, for example, as packets of information from the print spooler 344 to the port monitor 346. In this embodiment, it is preferable that the packets of data are sent in 4 Kbyte packets. Once the entire data file has been sent to the port monitor 346, the entire data file is sent, via the upload manager 310c, to the UPJA 320 and stored. The upload manager 310c then launches a web browser 310d for viewing the document.

In one embodiment of the invention, an object (e.g. a filter) may be placed in between two other objects (e.g. the Print Spooler and the Port Monitor). The filter can be used, for example, to detach the port monitor 346 from the Print Spooler 344, allowing the system to easily upgrade object code for future versions of software. The filter would preferably be a proxy filter. Other embodiments may include a data store filter in between the DevMode Data Store and the Print Driver UI, and a Print Driver Filter in between the GDI and the Print Driver PDL Gen.

With reference to FIGS. 2 and 3, the client 310 (e.g. a terminal, personal computer, PDA, mobile phone, etc.) stores, for example, local applications 310a such as Word™ or PowerPoint™, print drivers 310b, a port monitor 346, an upload manager 310c and a browser 310d. The local applications 310a can be used to create or download a document (the term "document" is being used to broadly refer to any data or information that can be transmitted over the network 300) that the user can ultimately forward to the print side 300c for shipping and/or delivery to a specified location. Print driver 310b builds and creates objects necessary to communicate with the selected printing device (e.g. a printer directly attached to the client 310, a printer on the network 300 or a printer located at the printer side 300c). The upload manager 310c is responsible for compressing and transferring files (e.g. documents) over the network. The browser 310d, such as Internet Explorer™ or Netscape Navigator™, is used to download print drivers 310b, and to view and order documents. Downloading of this data preferably occurs prior to requesting a print job. Of course, other systems and methods may be used to browse and download print drivers and view or order documents as one having ordinary skill in the art would recognize. For example, print drivers 310b may be loaded onto the client 310 by reading software stored on a recordable medium. The upload manager 310c communicates with the UPJA 320, for example, via Extensible Markup Language (XML) messages over http/https. XML allows browser clients to download an HTML page and then manipulate the page off line, without referring back to the server. The main task of the upload manager 310c and UPJA 320 is to transfer and compress files (preferably secure PostScript print files) via, for example, a Secure Socket Layer (SSL).

Operation of the upload manager 310c is now described. The upload manager 310c, which resides on the client 310 and is software in the preferred embodiment, handles upload and recovery of data for print jobs on the network 300. Once a complete document has been uploaded and transmitted to a server for reproduction processing, the upload manager 310c launches a web browser that allows a user to view and edit the document. For software including version information, the upload manager 310c can determine which version of the software is supported by the system and can monitor the data to determine whether a valid version of the software is being used, as described below.

A caching server 340 manages the download of driver software and other common HTML and image data elements between the client 310 and the UPJA 320. The UPJA 320 (which is a server in the preferred embodiment and therefore includes the conventional components of a computer, including memory, storage and a process, in the preferred embodiment), in one embodiment, receives the document as it is transmitted from the client 310, via the ISP 312, across the network 300. The document is received by the UPJA 320, via the upload manager 310c, after the print driver 310b being used has been authenticated by the version manager 348, and the entire document has been sent to the port monitor 346. Replicating servers 350 (i.e. lightweight directory assistance protocol, or LDAP, servers) authenticate clients 310 requesting services from the UPJA 320 and web servers 315. Authentication occurs as is readily understood by one having ordinary skill in the art. For example, the web servers 315 provide application services for web browsing and viewing of order information of newly uploaded and previously ordered documents. Software, such as AlchemyPS, is used to render "gif" images of the PostScript document for viewing. The mini store 330 stores documents (i.e. files) uploaded to the UPJA 320, as well as web, application, SQL and LDAP data.

Figure 4:
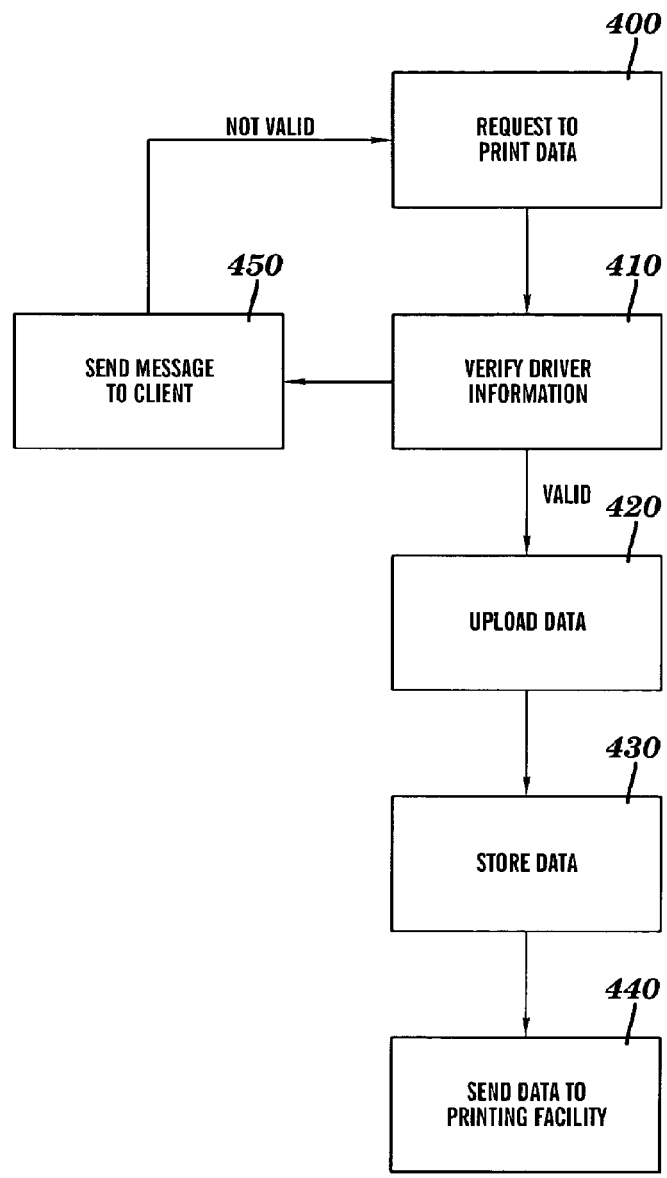
FIG. 4 illustrates an exemplary diagram of a user requesting a file to be printed using the system and method of the invention.
Figure 5:
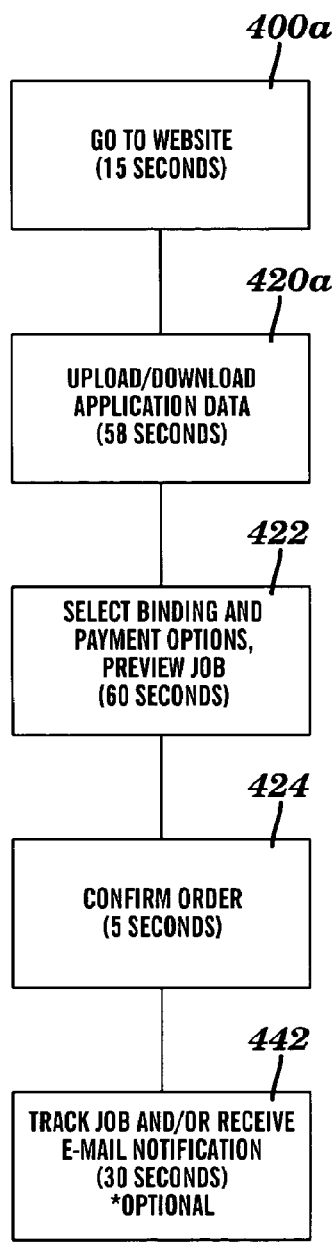
FIG. 5 illustrates an exemplary diagram of a user requesting a file to be printed using the system and method of the invention.

After a document has been sent to the UPJA 320, it can be downloaded to the printer side 300c. The printer side 300c allows the user on the client side 300a to print, bind and deliver documents that have been uploaded and stored on the network 300. The physical location of the print side 300c can be anywhere relative to the client side 300a and back end 300b. In the preferred embodiment, print side 300c is located in a printing facility next door to a delivering company such as Federal Express™. Documents are downloaded to a storage unit (e.g. main storage) located on print side 300c, as illustrated in FIG. 2, and then replicated on printers for ultimate shipping and delivery of the completed product to an address or location specified by the user. The completed product is an actual representation of the virtual product created by the user on the client side 300a. For example, a user may select a file that has been created using a standard editor such as Word™. The file may then be edited or modified by selecting font size and color, binding and paper using the interface opened by browser 310d. More specifically, FIGS. 4 and 5 illustrate exemplary diagrams of a user requesting a file to be printed using the system and method of the present invention. Operation of the system and method are discussed below.

Referring to FIG. 4, a user requests data to be printed at 400. After data (i.e. a document) has been selected at 400, the user may configure the settings of the document using a configuration unit (e.g. the item configuration wizard), as described below. Before uploading the selected document(s)

to the UPJA 320, the print driver 310*b* selected by the user is verified by the version manager 348 at 410. If the version manager 348 determines that the print driver is not valid (i.e. not acceptable), then a message is sent to the client 310 at 450, and the process begins over. If, on the other hand, the version manager 348 determines that the print driver information is valid, then data is uploaded from the client 310, for example, to the port monitor 346 via the print spooler 344 (see, for example, FIG. 3). That is, when data being uploaded includes version information, the upload manager 310*c* can query about, for example, what version of software the system supports. For example, when a "print" command is issued, the upload manager 310*c* can monitor, in real time, the data to determine if a valid version of the print driver 310*b* (e.g. driver software) is being used. The upload manager 310*c* also verifies that the client 310 software (e.g. local applications), and/or components making up the software, represent a coherent set of components and work properly together. This can be accomplished, for example, by a version manager 348 authenticating the components of the drivers and client software.

Uploading a document begins at 420. The upload manager 310*c* compresses the document(s) that has been selected for printing, and sends it to the UPJA 320 for storage (preferably temporary) at 430. The preferable method of transferring documents using the upload manager is the discussion of a separate application. Of course, one having ordinary skill in the art will recognize that documents can be transferred in a variety of ways, and the present invention is not limited to the preferred embodiment. Documents sent to UPJA 320 may also be stored in mini store 330 for later retrieval at 430. Finally, the document is sent to printer side 300*c* where it is stored in a main storage unit, and printed according to the user defined specifications at 440.

As illustrated in FIG. 5, users can go to a website (400*a*) and upload/download application data (420*a*). Subsequent to uploading a document in 420*a*, in one embodiment users can specify with the aid of a configuration wizard, the item, for example, document type, paper stock, printing options, double or single sided copies, color versus black and white, cover and orientation (422). The user is then presented with the option of either viewing their shopping cart and choosing an item (e.g. another document) to be purchased for printing, or can select the number of copies to be printed (422). After the selection of the number of copies has been made, the user can select the appropriate address or location for delivery of the printed document, convey billing information, preview and submit the order, and receive confirmation and updates regarding the order (424 and 442).

Figure 6:
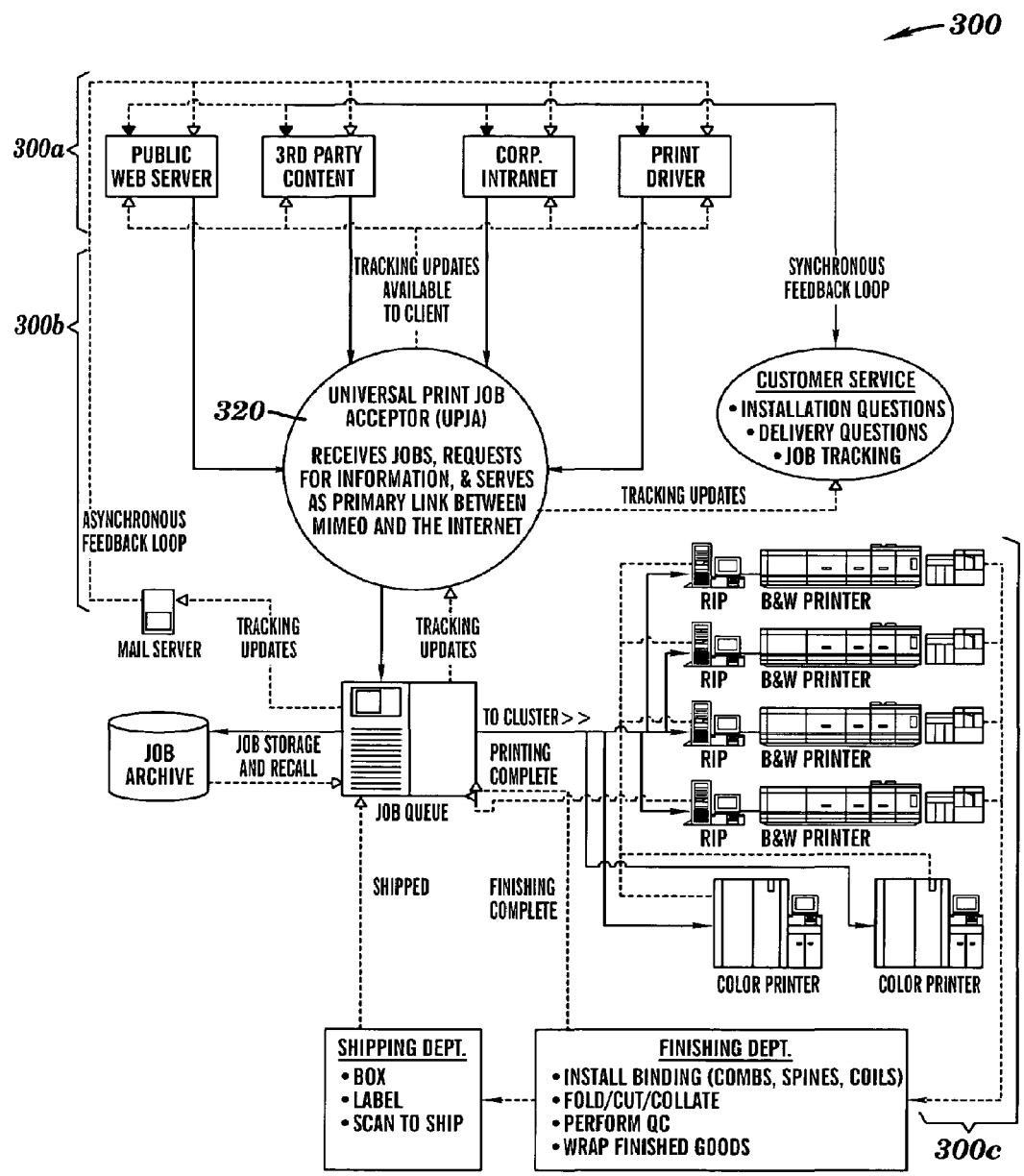
FIG. 6 is an exemplary diagram illustrating one embodiment of the system of the invention.
Figure 7A:
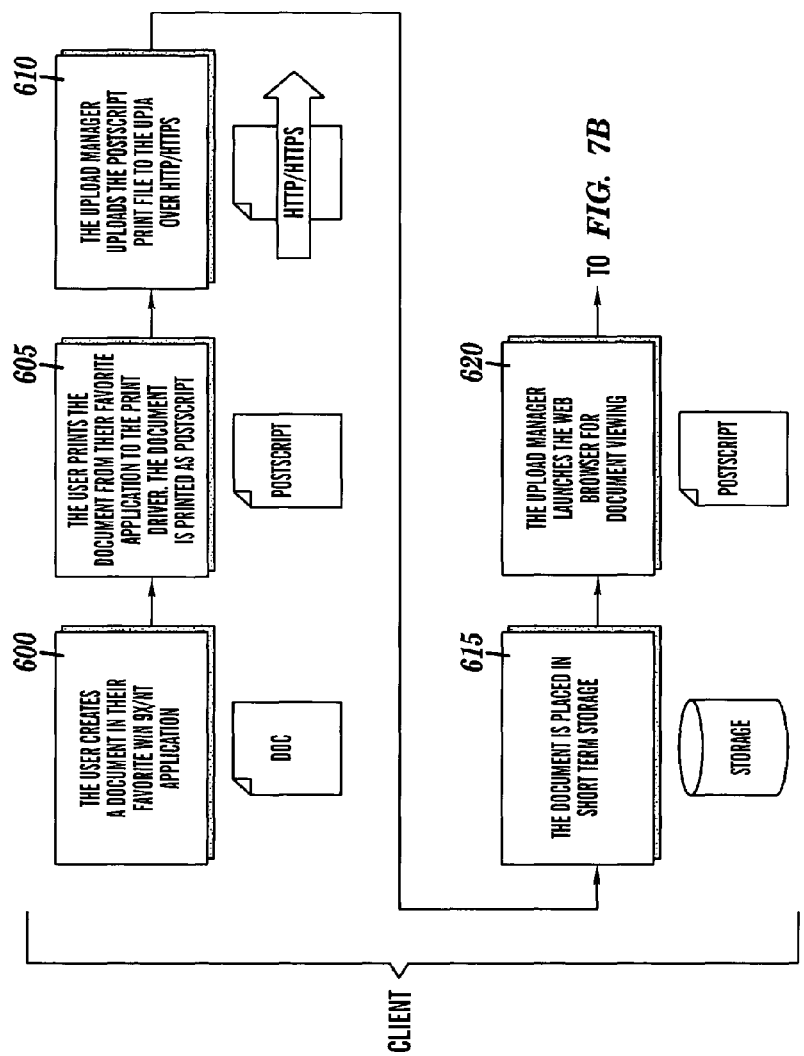
FIGS. 7A-7D, hereinafter collectively referred to as FIG. 7, are an exemplary flow diagram of a method of using the system of the invention.
Figure 7B:
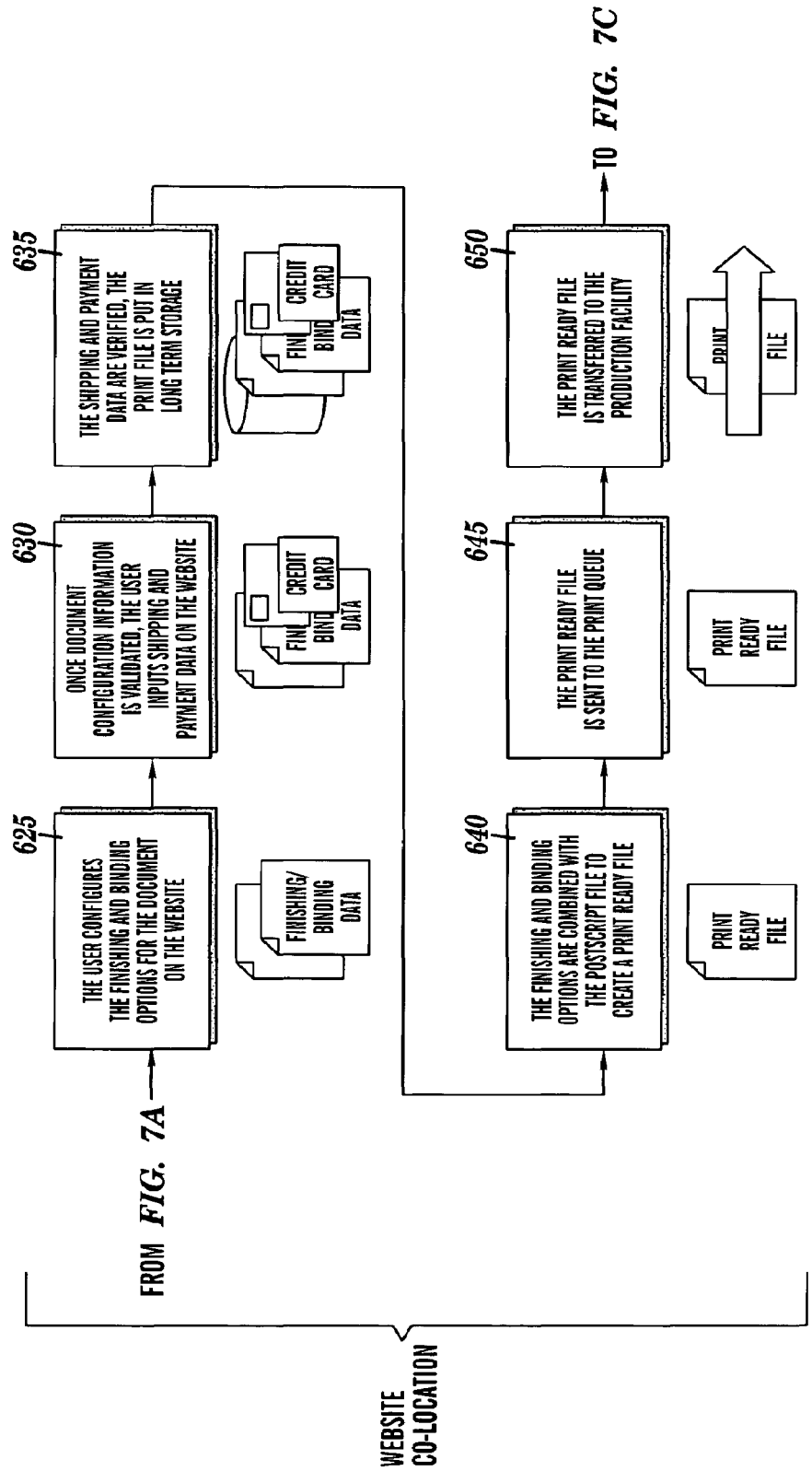
Figure 7C:
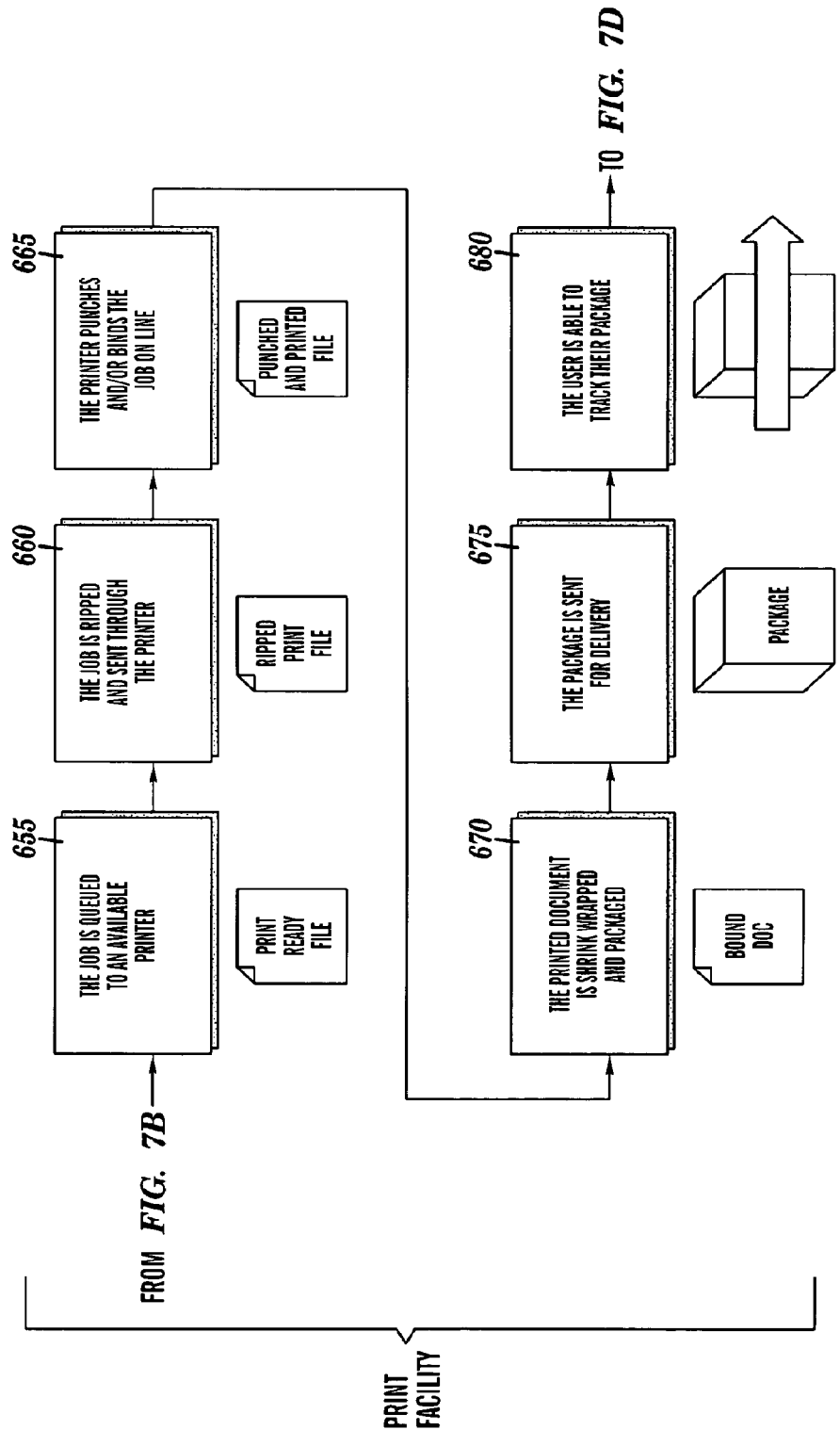
Figure 7D:
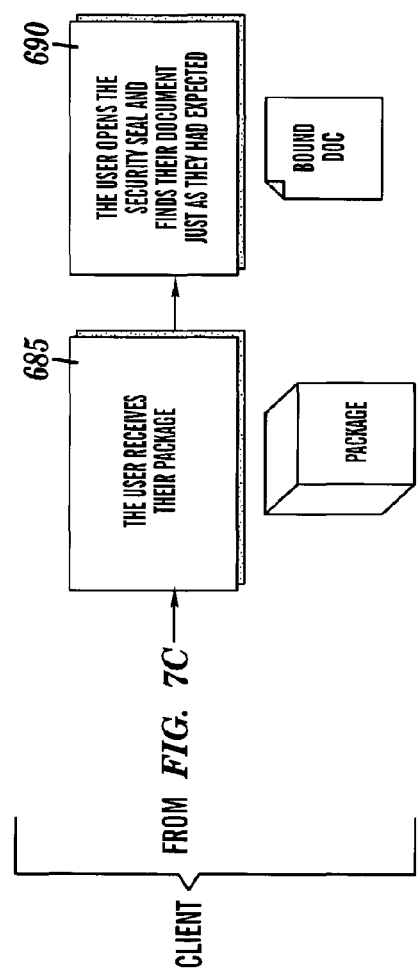

FIG. 6 is an exemplary diagram illustrating one embodiment of the system of the invention. The network 300 includes, for example, client side 300*a*, back end side 300*b* and print side 300*c*. The client side 300*a* includes a public web server, third party content, a corporate intranet and a print driver. Each of these components can freely communicate with each other and with the UPJA 320 on back end side 300*b*. The UPJA 320, as described above, can receive jobs, requests for information, etc., and serves as the primary (although not the exclusive) link between the client side 300*a* and the print side 300*b*. The back end side 300*c* includes a main storage to store documents downloaded from the UPJA 320, a job queue, workstations and printers to complete the ordered jobs. Servicing on the completed jobs can also be handled at the print side 300*c*, or at a separate location. Servicing includes, for example, binding, cutting, collating and wrapping the documents to be shipped, as well as boxing, labeling and shipping or delivery of the document(s) to a specified address or location.

FIG. 7 is an exemplary flow diagram of a method of using the system in the invention. The flow illustrated is merely an example of one embodiment of a process that a user accessing the system may perform. The user creates a document in a local application 310*a* on, for example, their personal computer (600), and prints the documents from the application to the selected print driver 310*b* (605). The document is printed as a postscript document (610). The upload manager 310*c* then uploads the postscript print file to the UPJA 320 over http/https (615), and the upload manager launches the web browser 310*d* for document viewing (620). The user can then configure the finishing and binding options for the document using the interface on the personal computer (625). Once document configuration information is validated, the user inputs shipping and payment data on the interface (630). The shipping and payment data are verified, and the print file is put in long term storage (635). The finishing and binding options are then combined with the postscript file to create a print ready file (640), and the print ready file is sent to the print queue (645) and transferred to the production facility (i.e. printing facility) (650). A printer operator can then select a job and queues it to an available printer (655), and the job is ripped and sent to the printer (660). The printer punches and/or binds the job on-line (665), the printed document is shrink wrapped and packaged (670), and the package is sent for delivery (675). The user is able to track the package, receive the package and open the. package (680-690).

Figure 8:
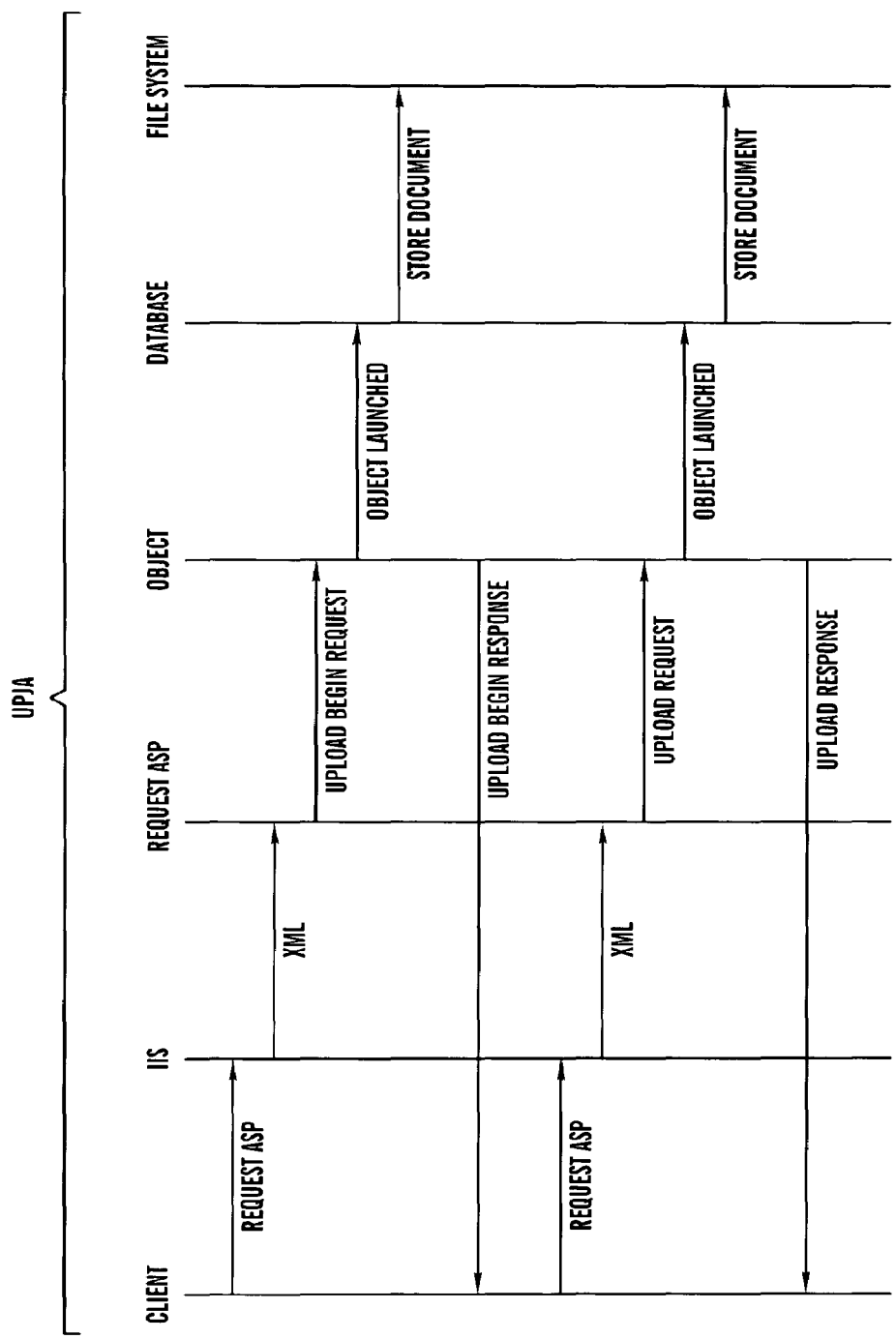
FIG. 8 is an exemplary flow diagram of the operation performed by the upload manager.

FIG. 8 is an exemplary flow diagram of the operation performed by the upload manager. A client's "upload request" is sent via, for example, an XML protocol such as a Java active server page (ASP) to a server, such as the UPJA 320 depicted in FIG. 3. The server creates an "upload.begin" request ASP and an associated object identifying the request. The object is sent to a database and stored. In response, the object initiates an "upload.begin" response, which is transmitted to the client 310 via, for example, XML. This process repeats for each client upload request. Further details of the processing performed relative to uploading an entire document are described below relative to FIG. 5.

Figure 9:
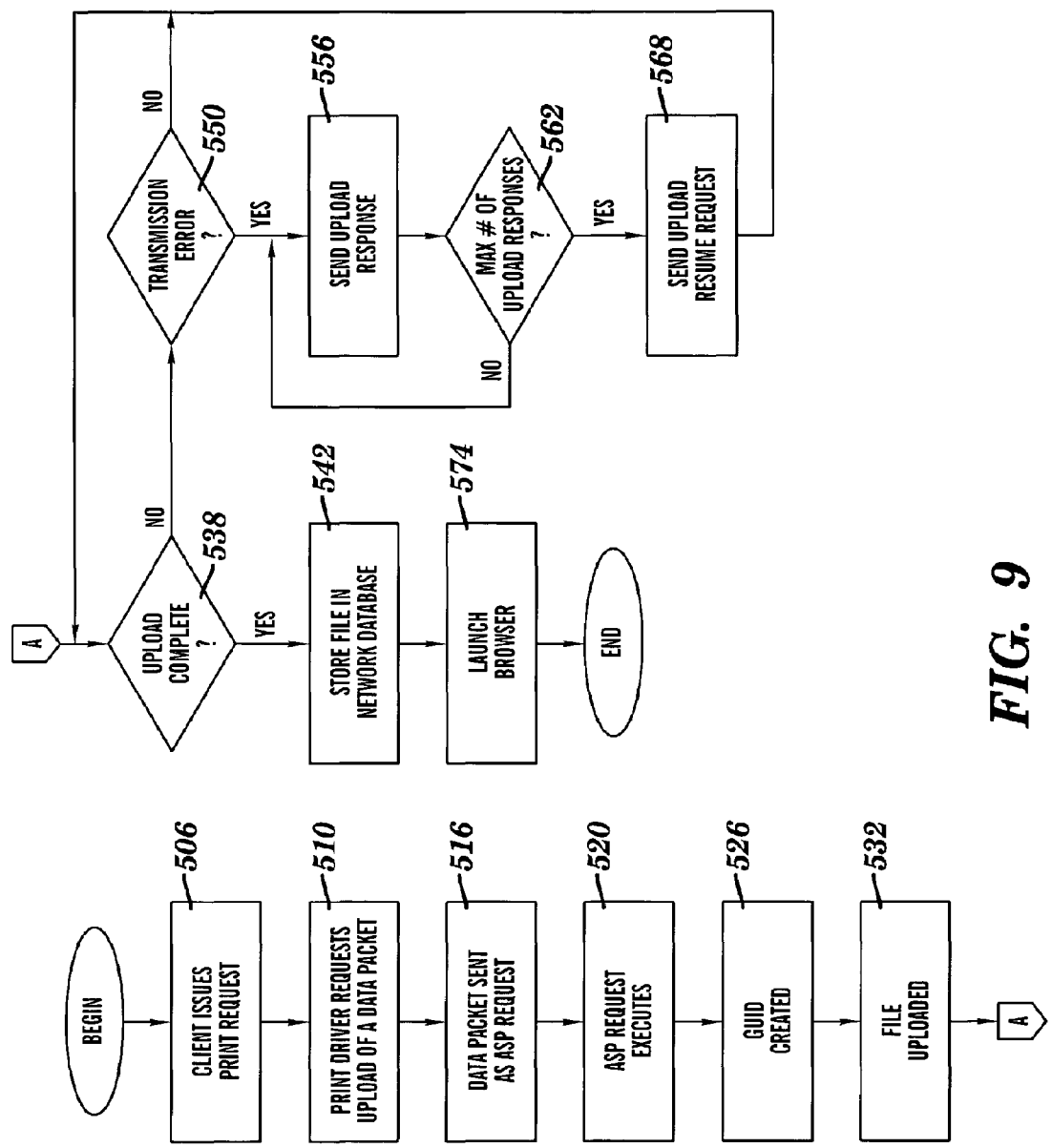
FIG. 9 is an exemplary flow diagram of uploading a document.

FIG. 9 is an exemplary flow diagram of uploading a document. Referring to FIG. 9, the transfer of information across the network 300 begins with a request by the client 310, for example, a command to print a file at 506. The print driver 310*b* residing, for example, on the client 310 makes a request to upload a data packet at 510. The data packet is sent as an ASP request to web server 315, such as a IIS Windows-based web server at 516. The request may be, for example, an "upload-begin" request, an "upload-request" or an "upload-complete-response."

The ASP provides the server-side equivalent to using a scripting language and objects on the client 310. When the print driver 310*c* makes the request to upload a data packet, the client 310 keeps track of which data packet(s) has been sent. That is, the data packet is "marked" for subsequent reference. If a problem occurs in the transmission, for example a modem failure, machine failure, the interne goes down, a database goes down, the file is corrupted, etc., or if the file is successfully transmitted, the system can properly respond to the client 310. For example, if the file is successfully transmitted, the client 310 is notified of the successful transfer. If, on the other hand, a transmission error occurs, the network 300 is able to identify which data packet was last sent using the marked reference. In this regard, the system can continue, i.e. resume; uploading from the point of error, without having to resend or retransmit the entire data file.

The ASP request then executes at the server 315 and launches associated objects stored in the server at 520. After the ASP request executes, an initial handshake occurs between the client 310 and server 315. During the initial handshake, an object is launched to create a new globally unique identification (GUID) of the file at 526. The newly created GUID is then sent to the client 310 as an "upload-begin-response" and is used for subsequent "upload-request" uploading of the file. Uploading of the file then begins and information about the file, such as file size, CRC, document names, color, orientation and number of pages, is transferred to the UPJA 320 at 532. Once the entire file and corresponding file information is transferred to and stored in the UPJA 320 at 538, it is transferred and stored in a computer readable medium, such as, a mini store 330 at 542.

If at any time during the transfer of data an error occurs, an "upload-response" is sent to the client. The response indicates to the client 310 that an error during transmission has occurred at 550. The client 310 responds to the "upload-response" by re-transmitting the packets from a point at which the last packet was successfully sent at 556. This re-transmission process can be repeated for a predetermined number of times. If an error is still present after the system has re-tried the predetermined number of times at 562, then an "upload-resume" request is initiated at 568. The "upload-resume" request transmits the GUID to the upload manager 310c so that the upload manager 310c can determine which file the upload resume request relates to. The upload manager 310c then determines the last referenced, or "marked," data packet and resumes the transfer of data beginning with that packet. The data packets are transmitted until the entire file has been successfully transferred to the server.

Once the complete file, along with corresponding file information, has been transferred to the server and stored, a browser 310d located at the client 310 is launched at 574. The browser 310d allows the user to view, configure, format, print, etc. the uploaded document as described above.

User Interface

This invention also provides a graphical user interface that allows users to configure, view, and order documents online. A user may select various configuration, binding, formatting, and payment options online and preview the impact of such selections on a final document prior to reproduction of the document according to such selections. The graphical user interface generally allows a user to freely navigate the system to copy or reproduce documents. The graphical user interface may be implemented as a single user interface, or as separate component interfaces. The graphical user interface may be stored, for example, on a web server, in a database, or as software residing on the client.

Figure 10A:
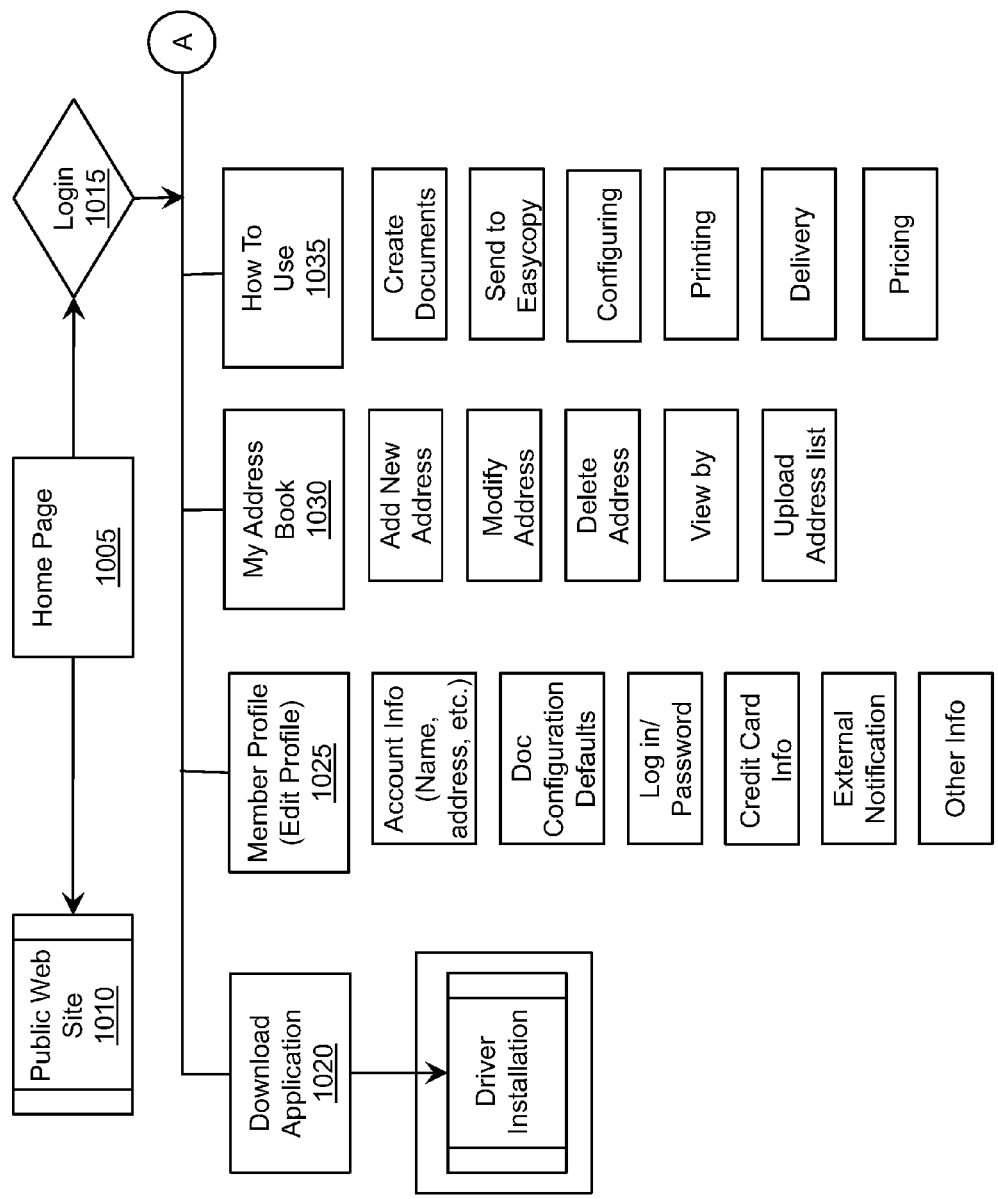
FIGS. 10A-10C, hereinafter collectively referred to as FIG. 10, illustrate a flow diagram of an embodiment of the graphical user interface of the invention.
Figure 10B:
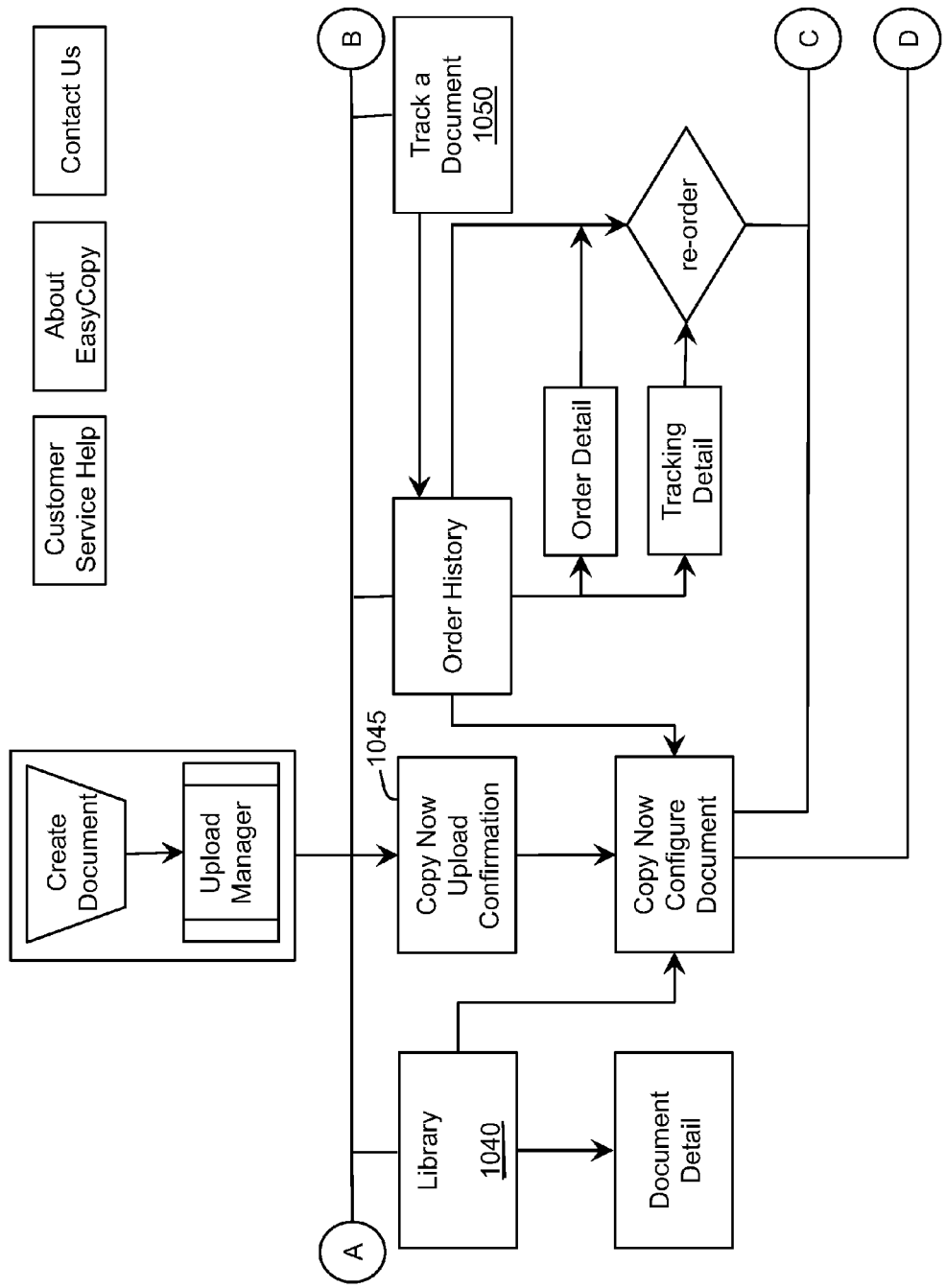
Figure 10C:
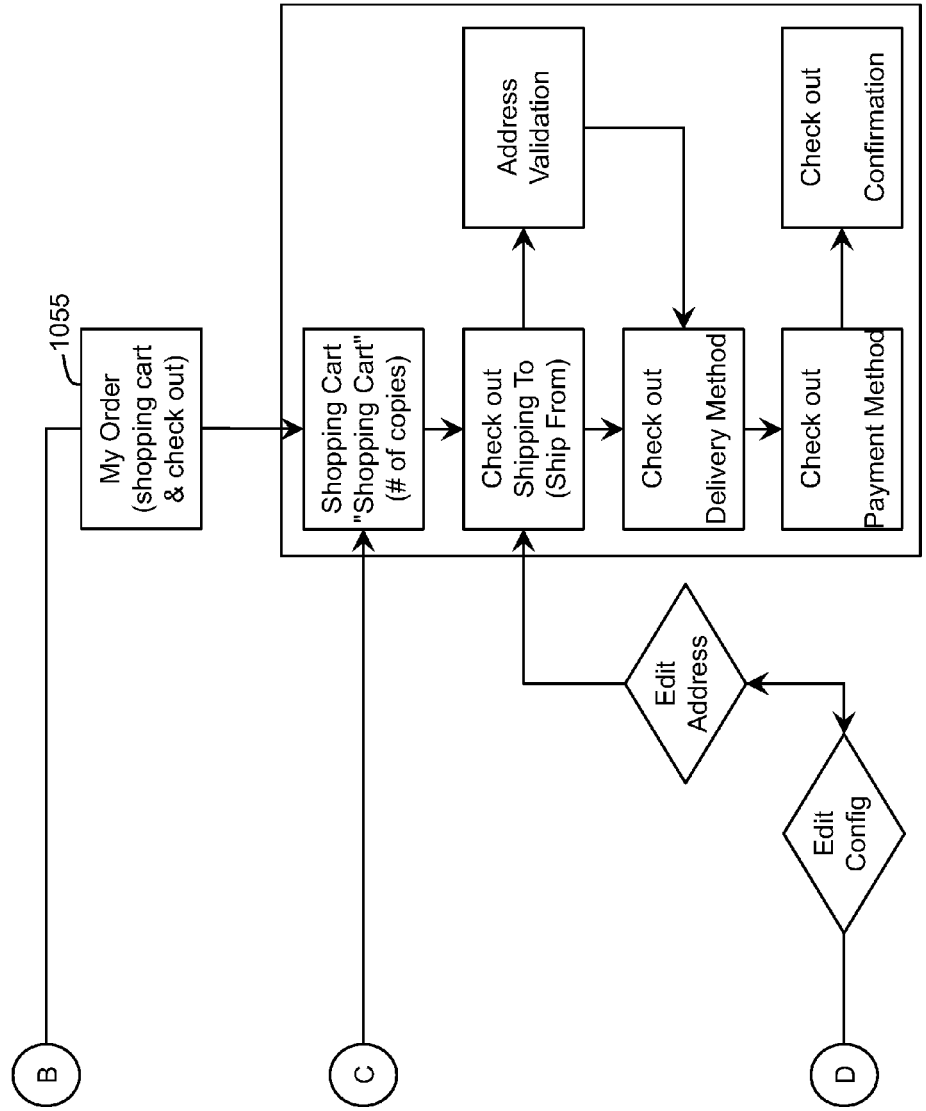

FIG. 10 illustrates a flow diagram of an embodiment of the graphical user interface of the invention. Further details of the components of the graphical user interface are described below. Referring to FIG. 10, a user can access a home page (1005) associated with the reproduction system from a public web site (1010). From the home page (1005), the user can either log in to the system, or users who have not previously registered with the system may so register (1015). Once the user has logged into the system, the user can access a variety of functions, or graphical user interfaces, including, for example, download an application (1020), such as a system print driver, edit member profile (1025), view and edit address book (1030), receive instructions on using the system (1035), view a list of documents currently stored in the system (1040), copy (and configure) a document (1045), track a document (1050), and order a document (1055). Significantly, the "address book" allows the user to locate addresses both stored on the client, as well as stored in a database accessible by the system.

Figure 11:
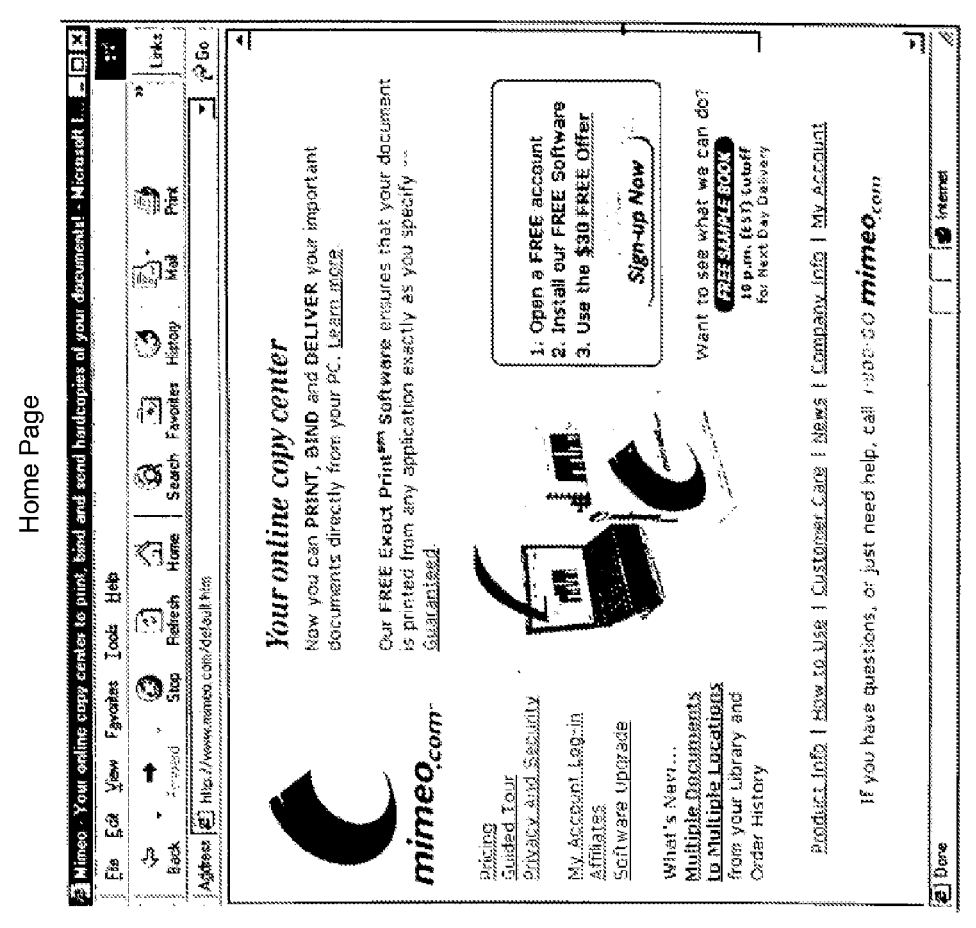
Figure 12:
FIG. 12 depicts a screen shot of an illustrative sign-up screen that collects basic user identification information, such as name, address, email address, password, and telephone number.

FIG. 11 depicts an illustrative home page. From the home page, first time users who have not registered with the system can create an account and register with the system, and registered users may log in to the system. FIG. 12 depicts a screen shot of an illustrative sign-up screen that collects basic user identification information, such as name, address, email address, password, and telephone number.

Figure 13:
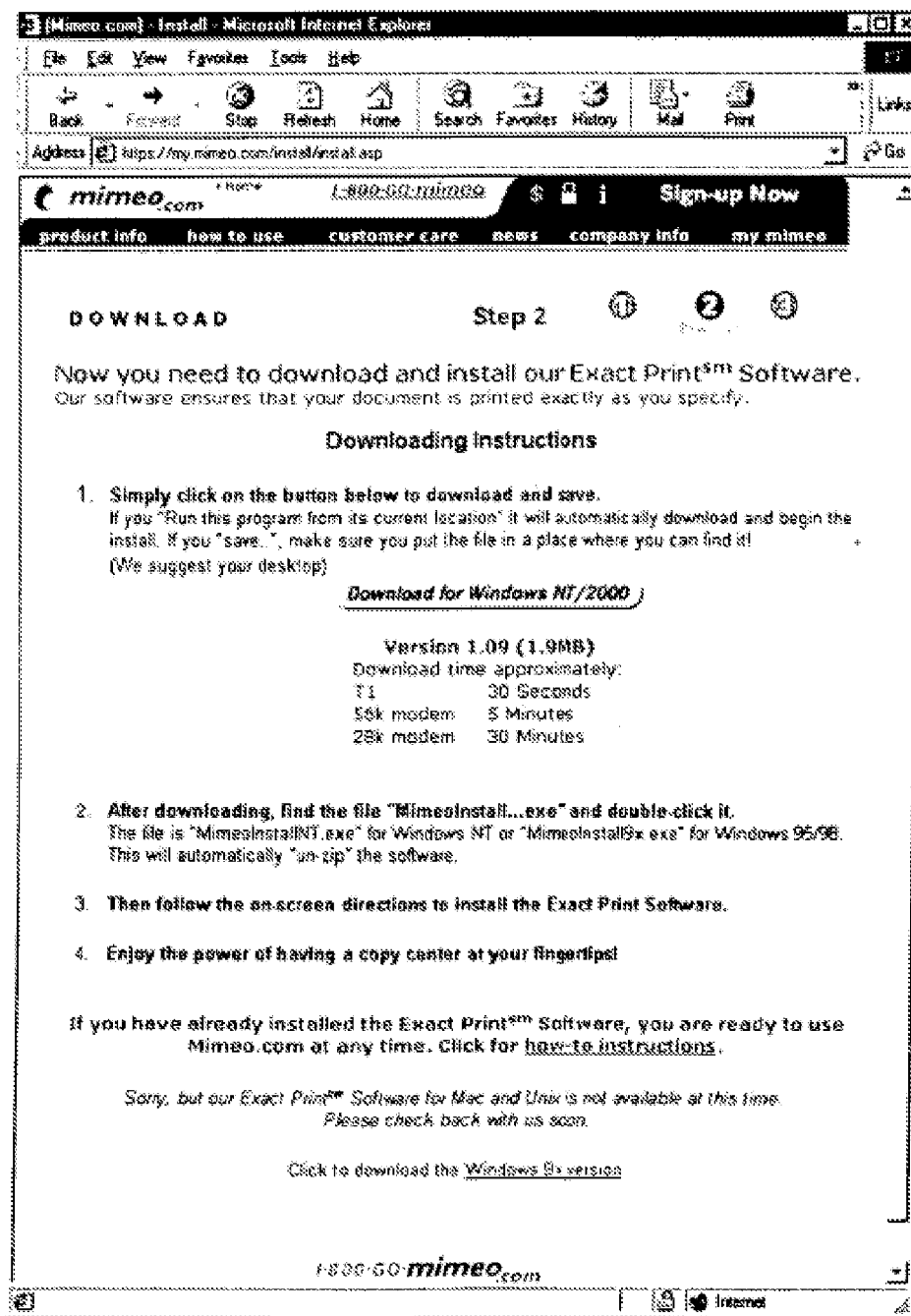
FIG. 13 depicts an illustrative download screen that determines the user's operating system and browser and automatically downloads and begins the process to install the software on the user's computer.
Figure 14A:
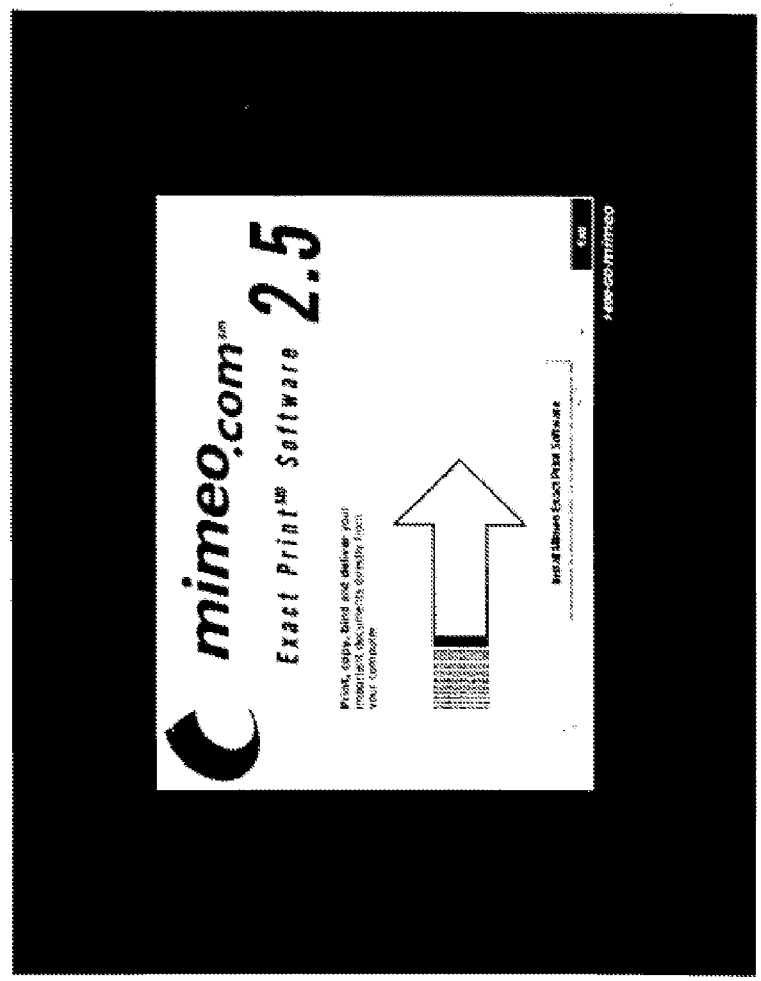
FIGS. 14A-14I depict illustrative screen shots of the complete installation process.
Figure 14B:
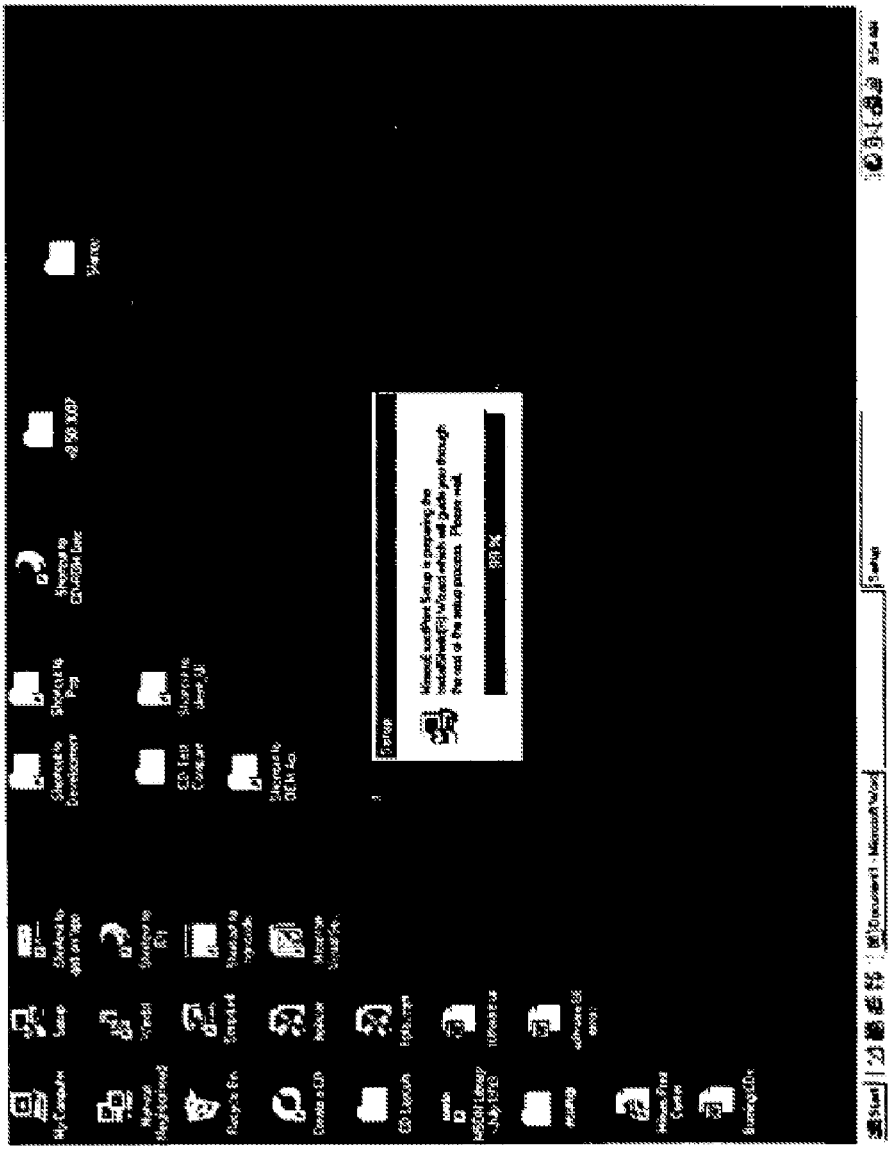
Figure 14C:
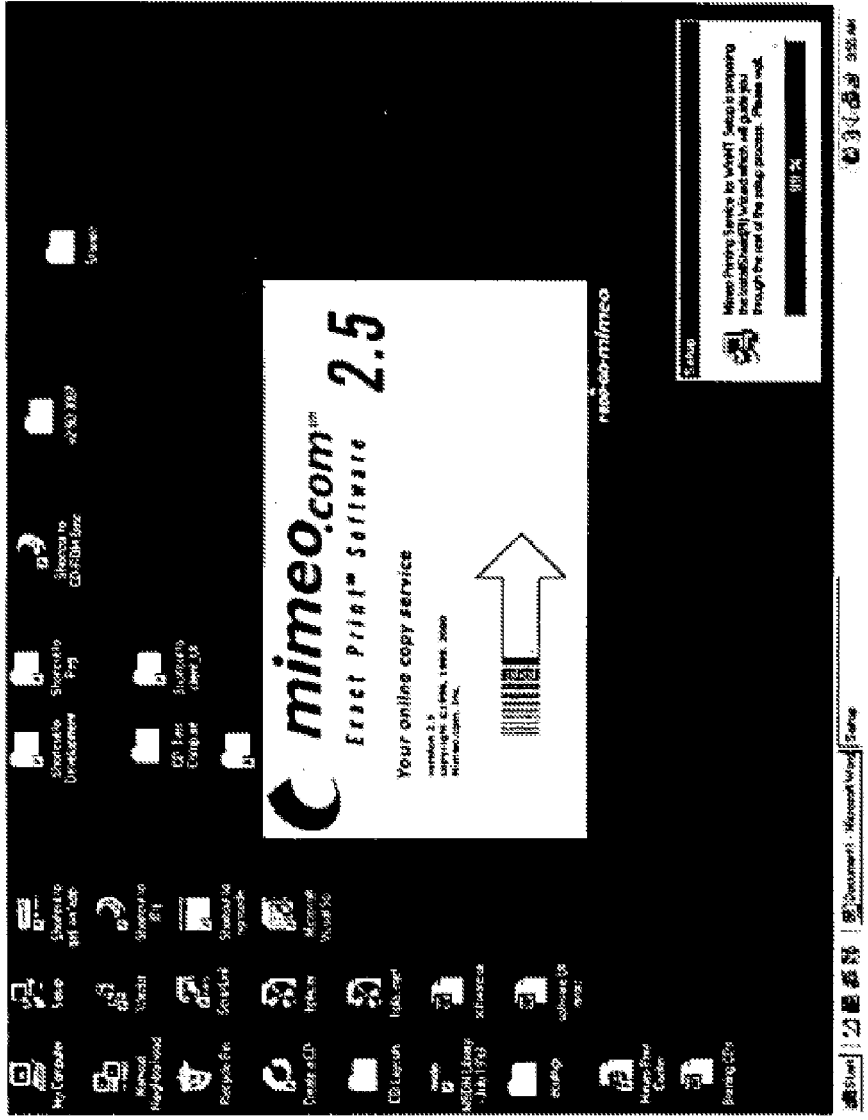
Figure 14D:
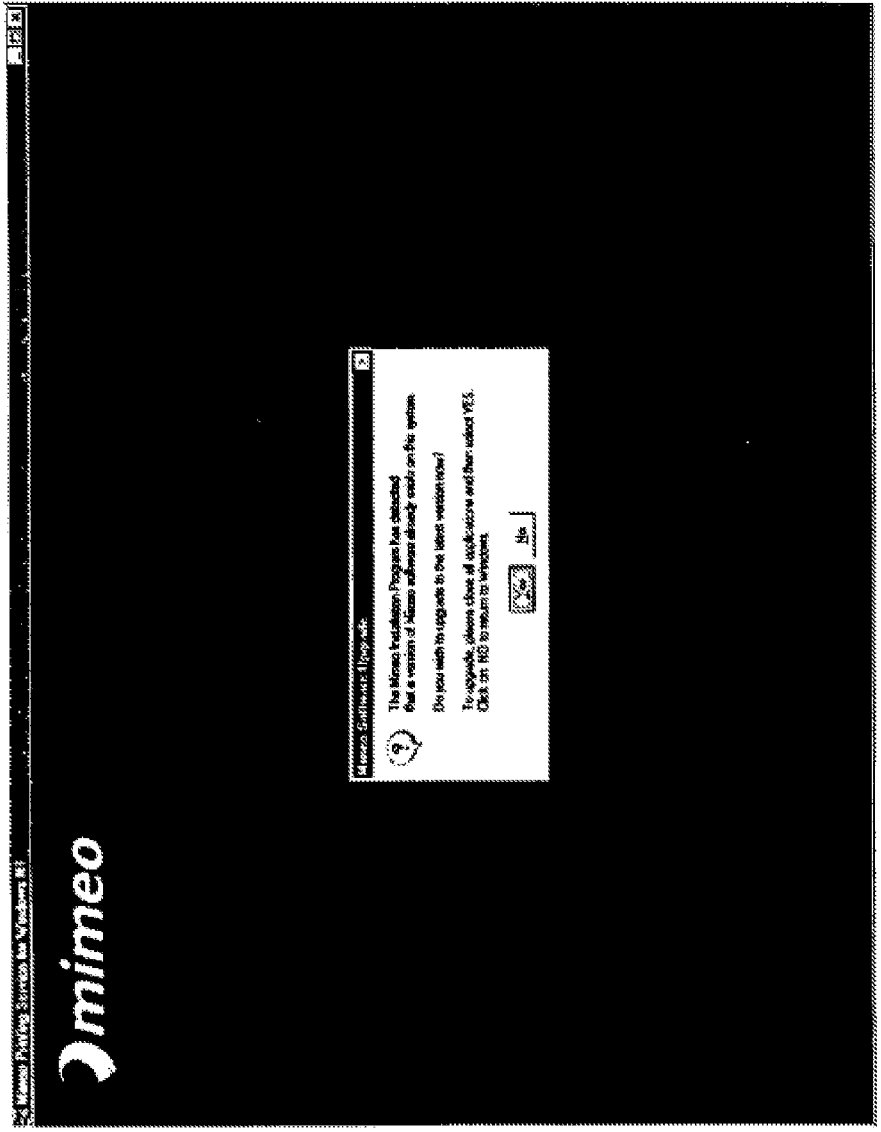
Figure 14E:
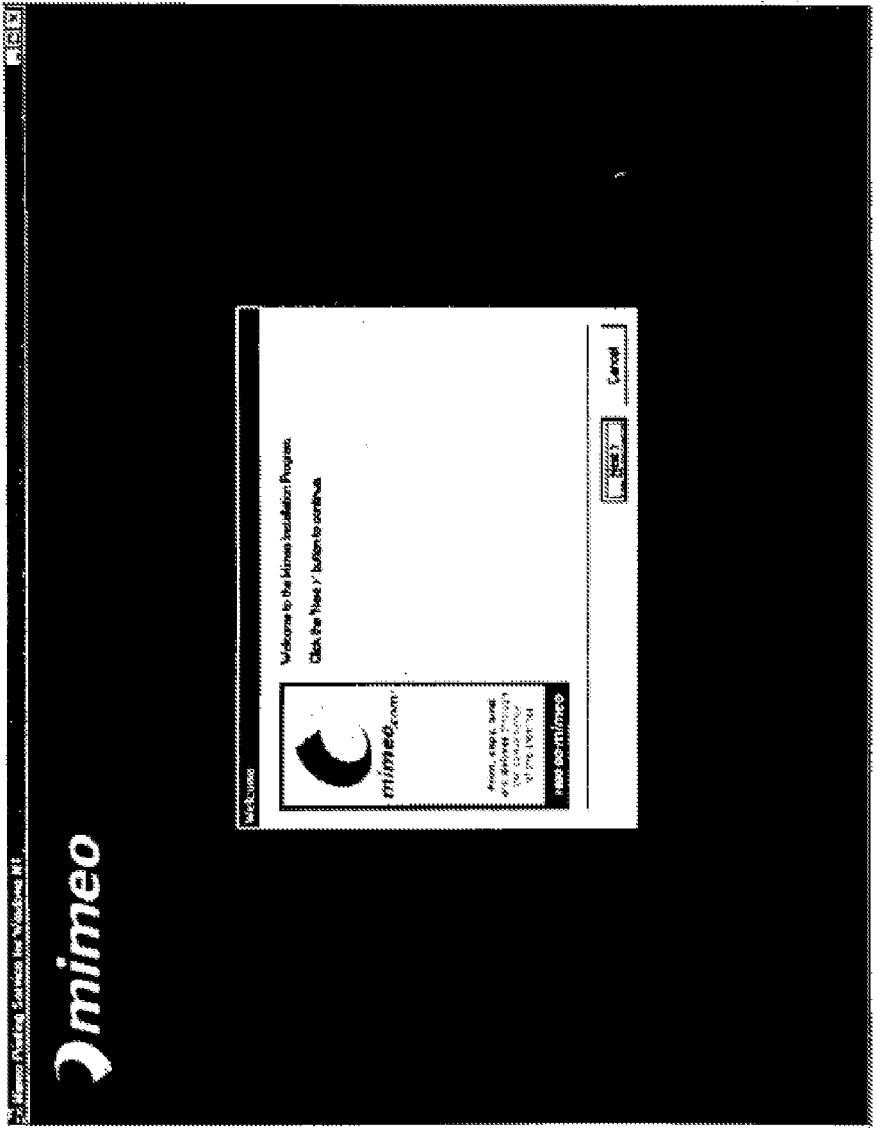
Figure 14F:
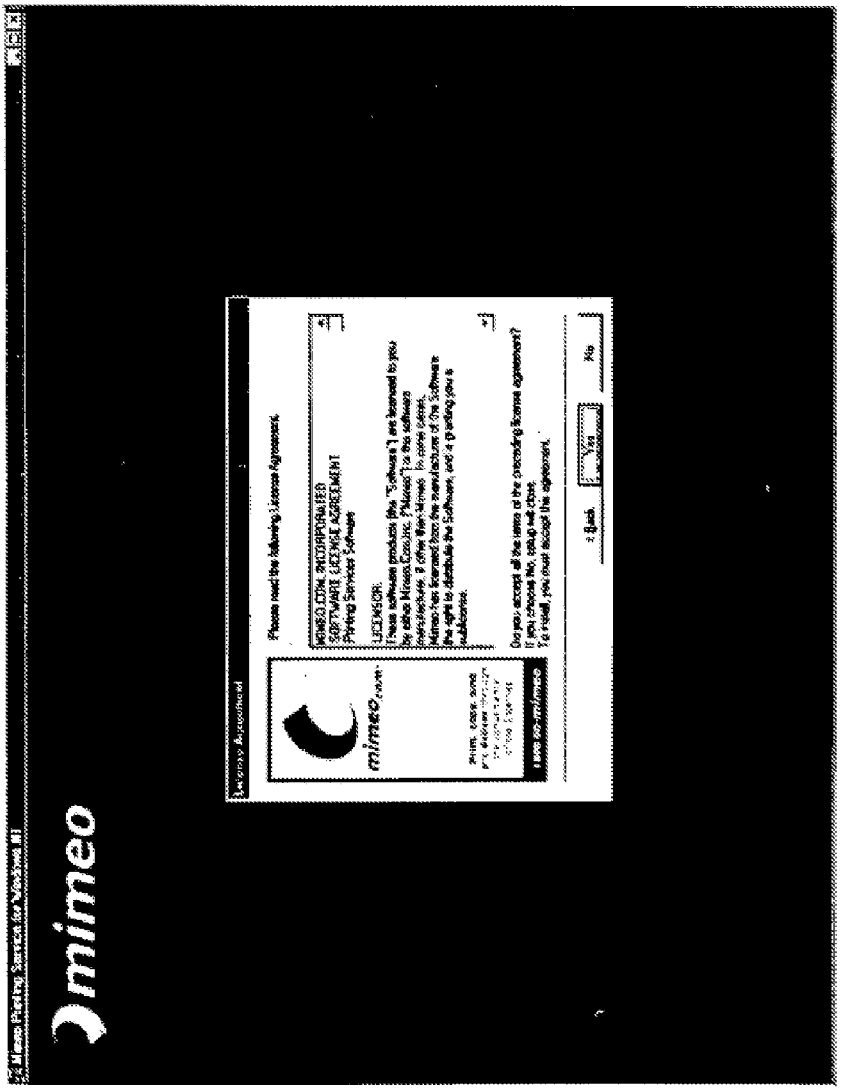
Figure 14G:
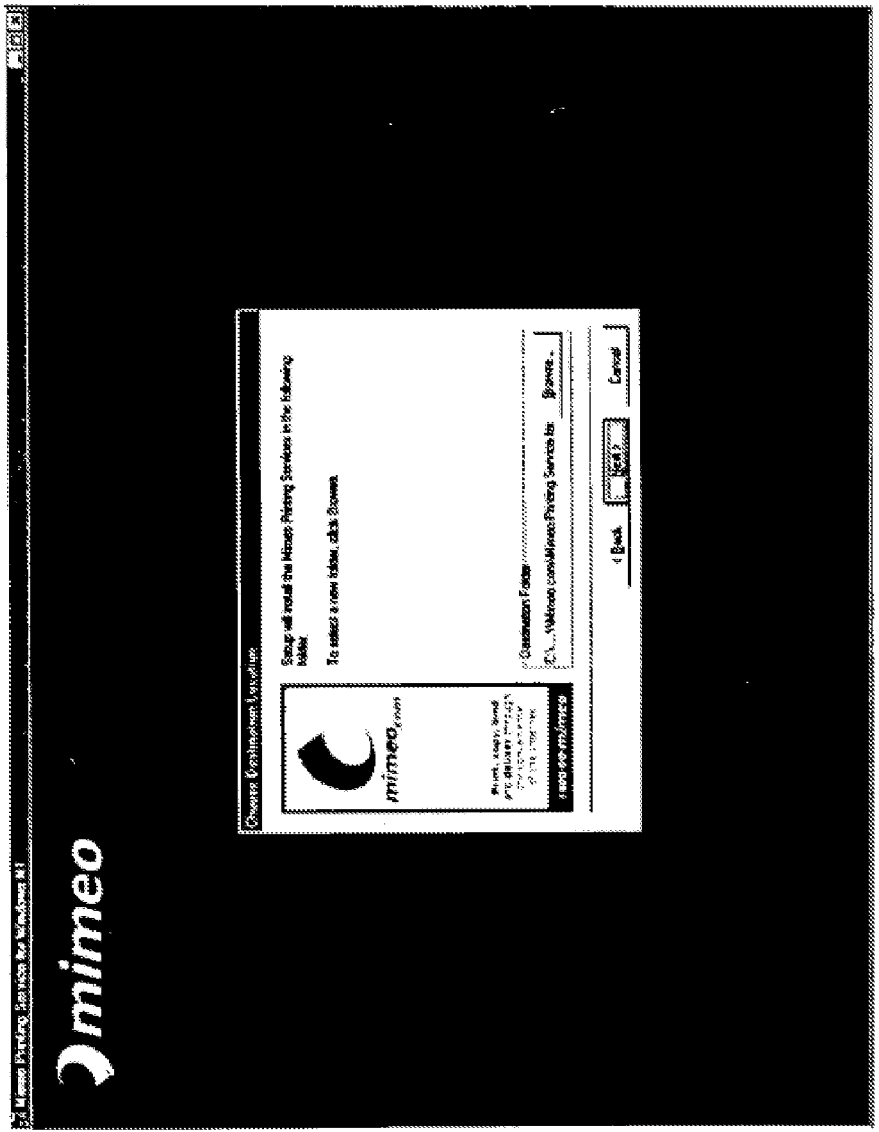
Figure 14H:
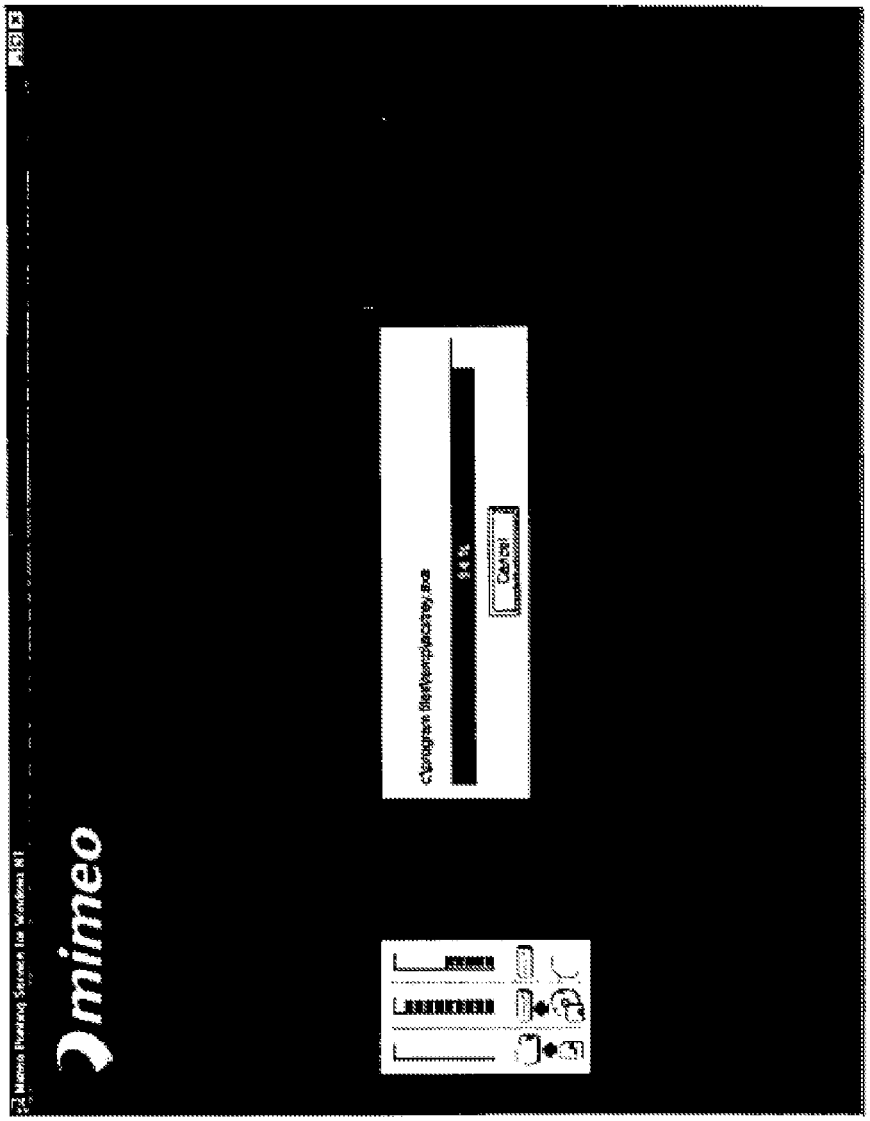
Figure 14I:
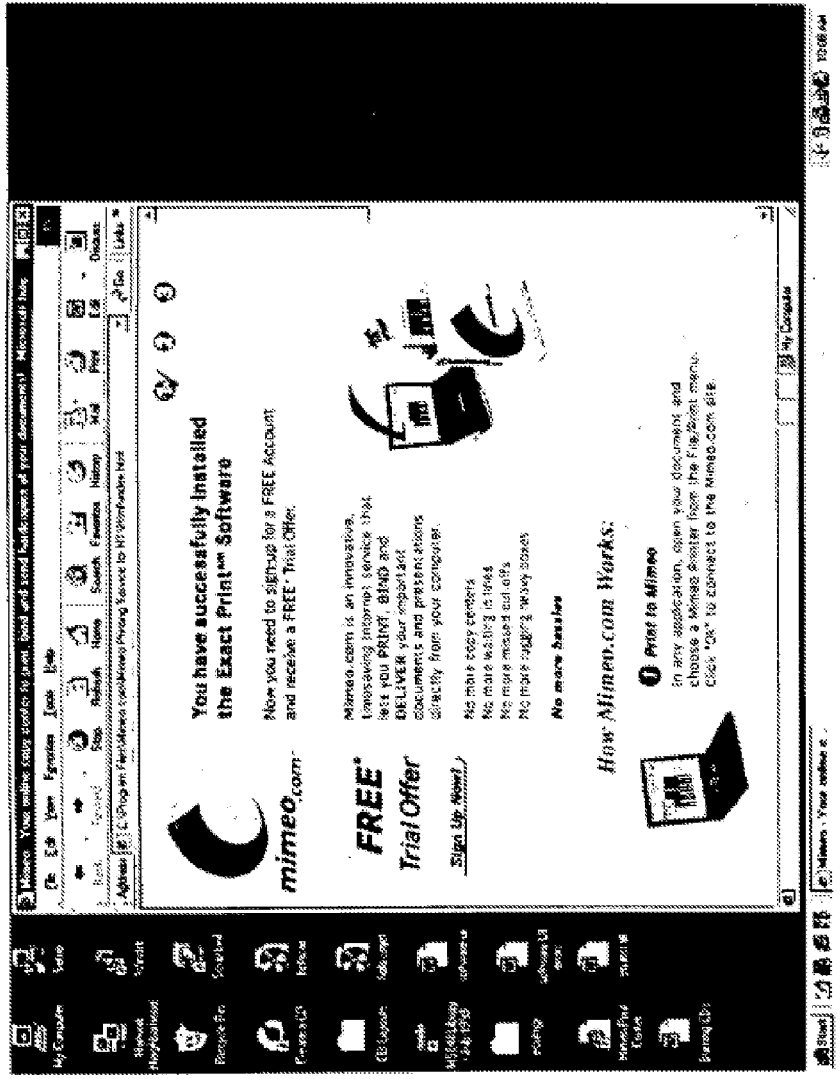

After registering with the system, a user can download and install the system software. FIG. 13 depicts an illustrative download screen that determines the user's operating system and browser and automatically downloads and begins the process to install the software on the user's computer. As depicted in FIG. 13, after the software has been downloaded to the client, the user double-clicks the install document to complete the installation process. FIGS. 14A-14I depict illustrative screen shots of the complete installation process. FIG. 14D depicts a screen shot of an inquiry that is displayed to a user who already has a copy of the software on the client. Such user may choose to upgrade the software and continue the install by selecting "yes," or may choose to maintain the current version of the software by selecting "no."

Figure 15A:
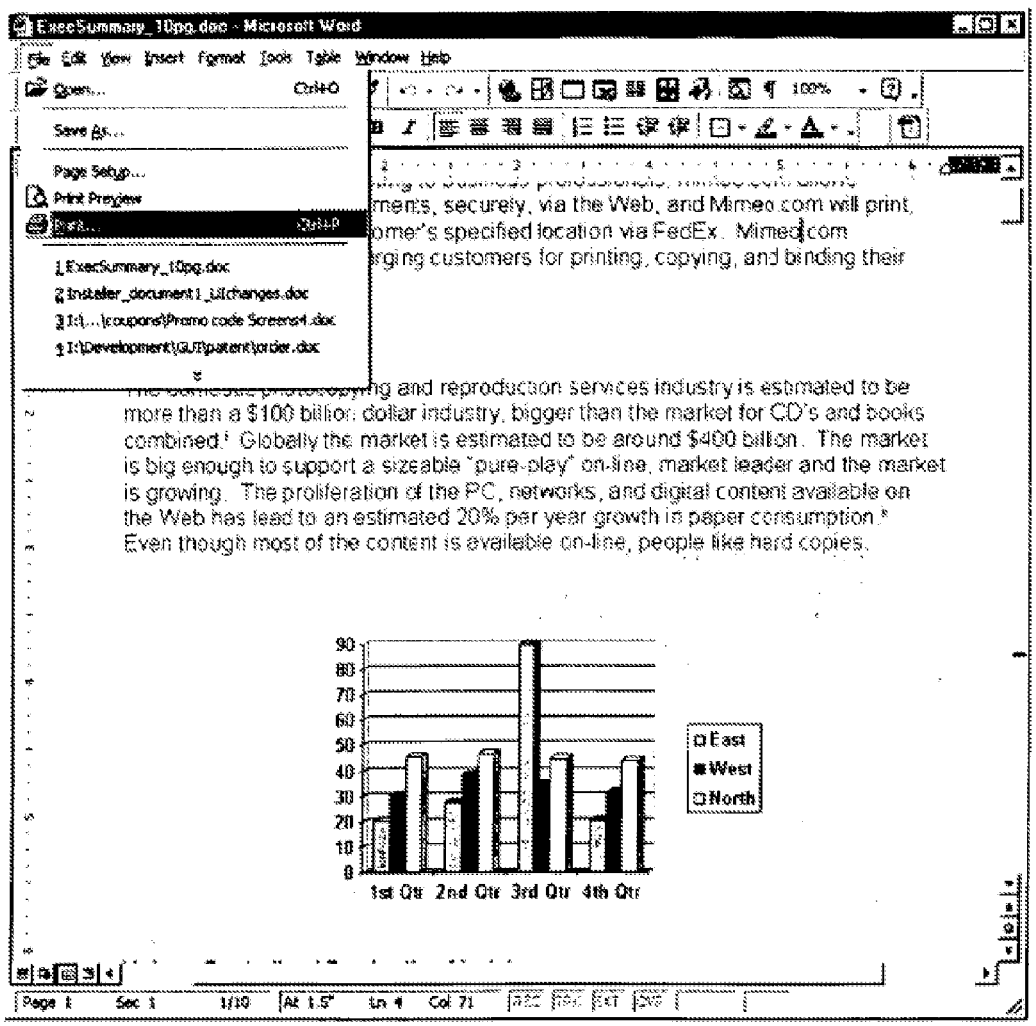
FIGS. 15A-15K depict illustrative screen shots of screens that allow a registered user to use this invention to print a document over a network.
Figure 15B:
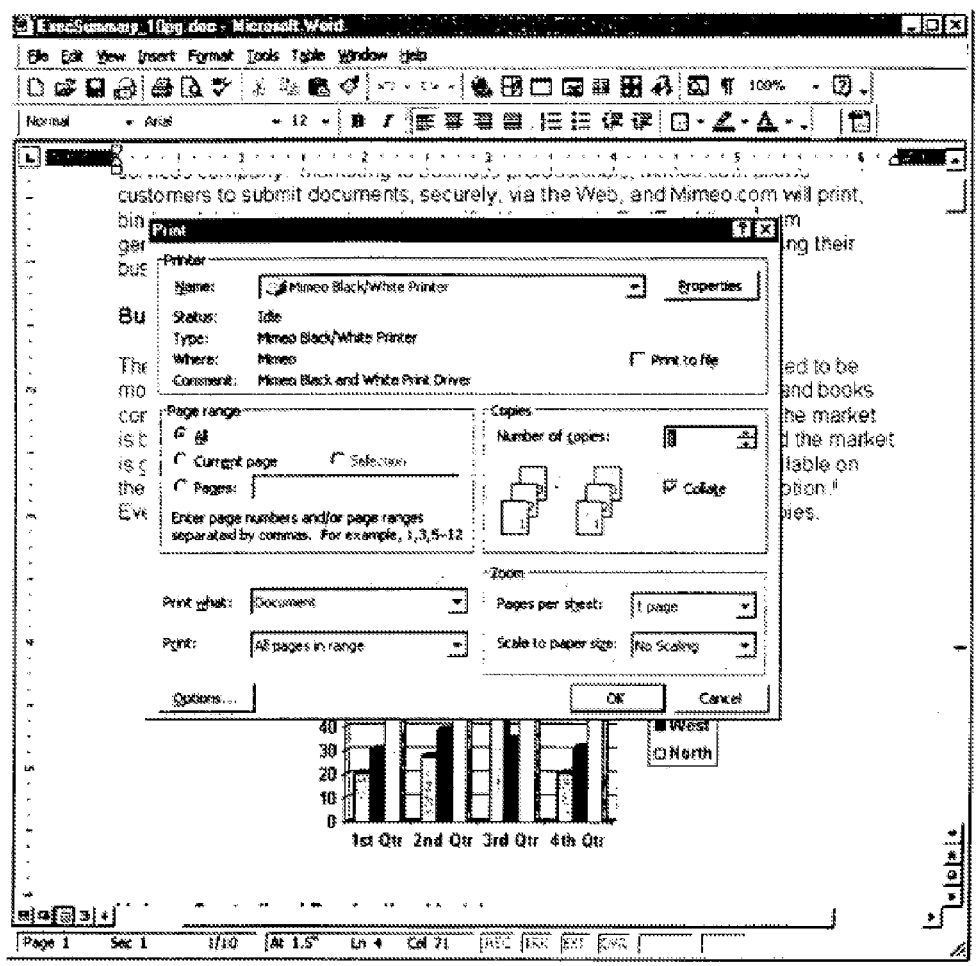
Figure 15C:
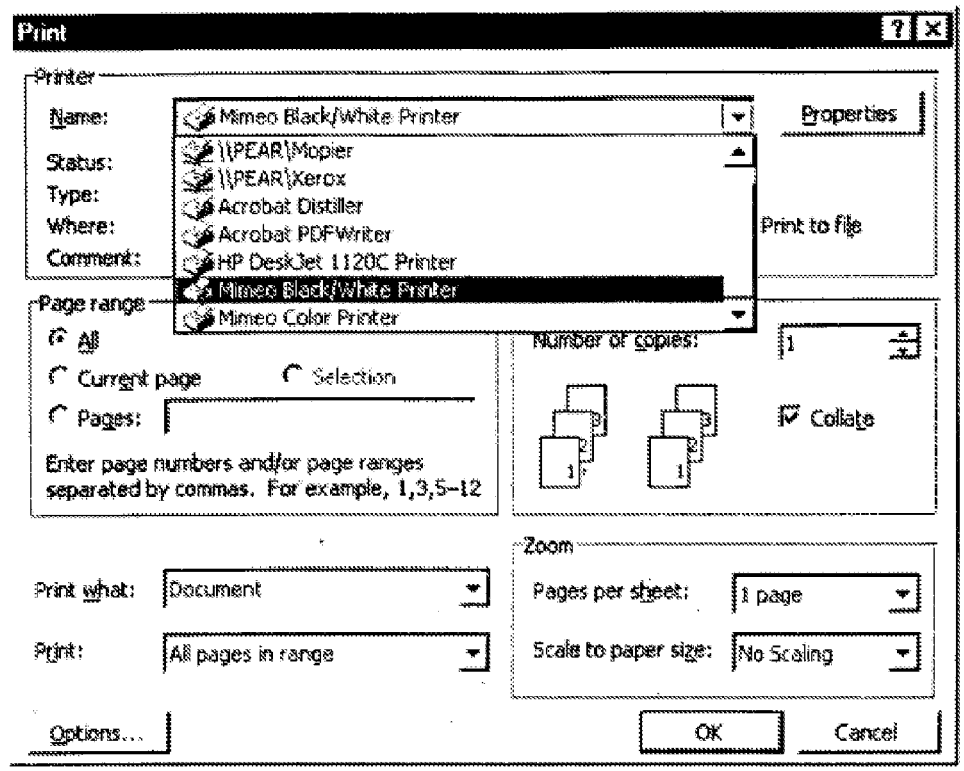
Figure 15D:
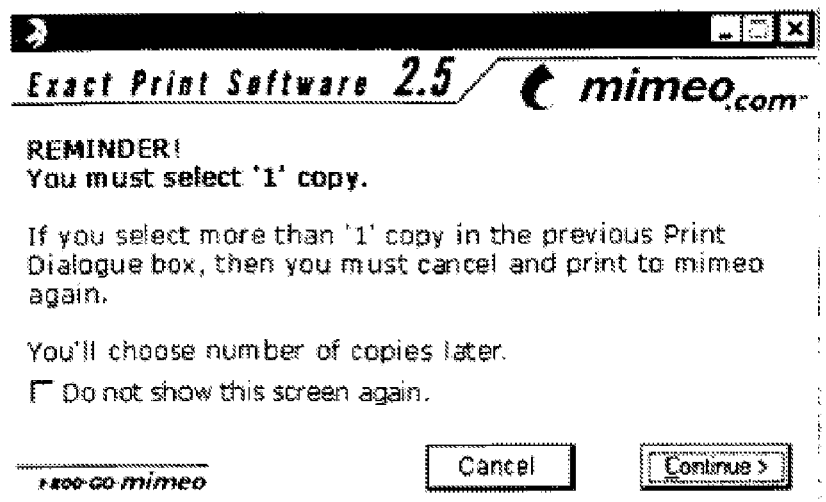
Figure 15E:
Figure 15F:
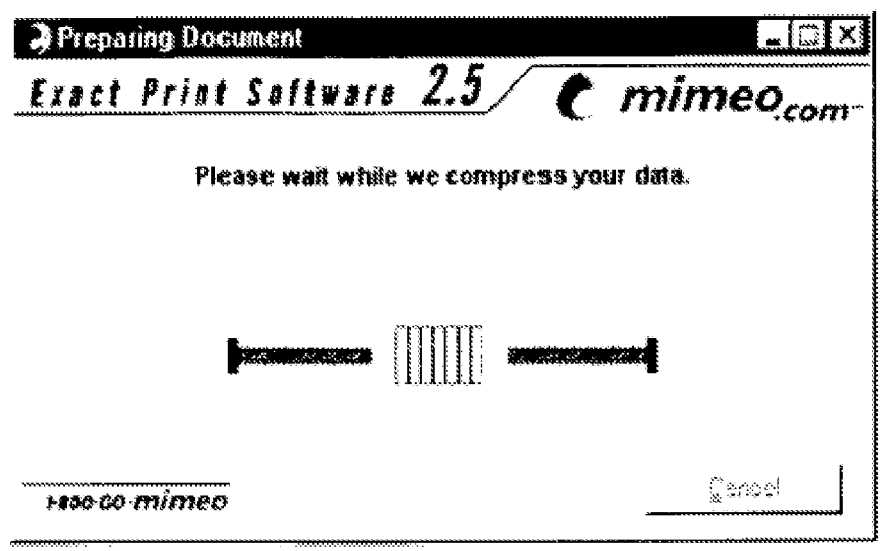
Figure 15G:
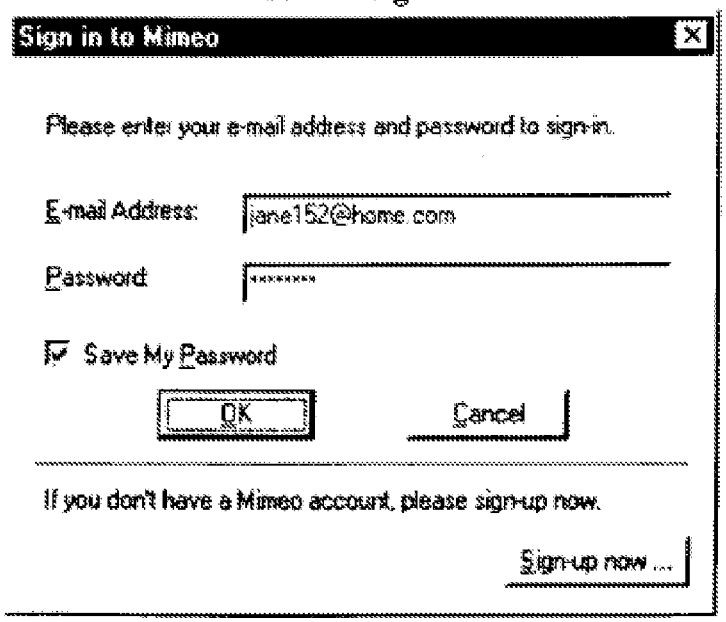
Figure 15H:
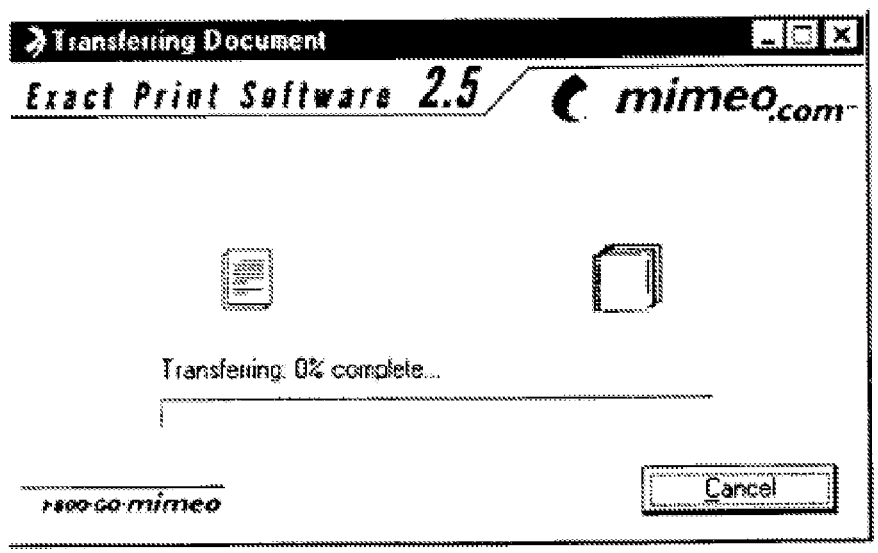
Figure 15I:
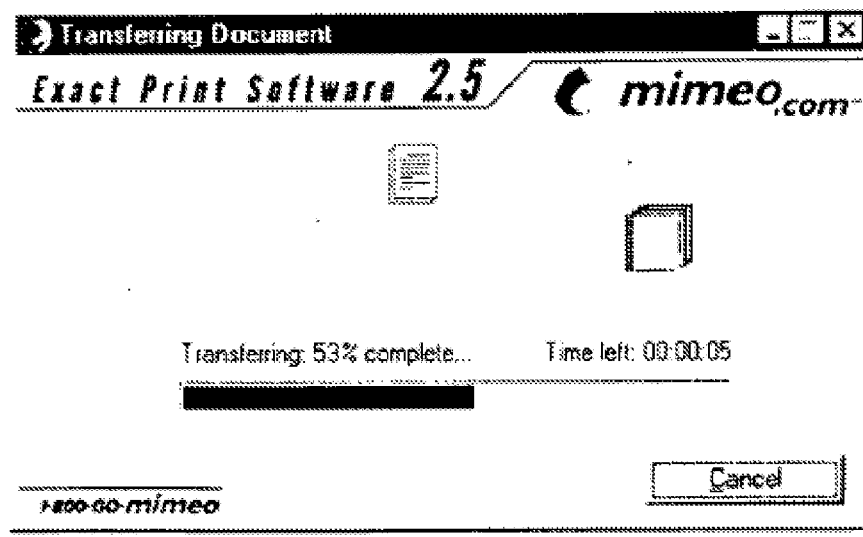
Figure 15J:
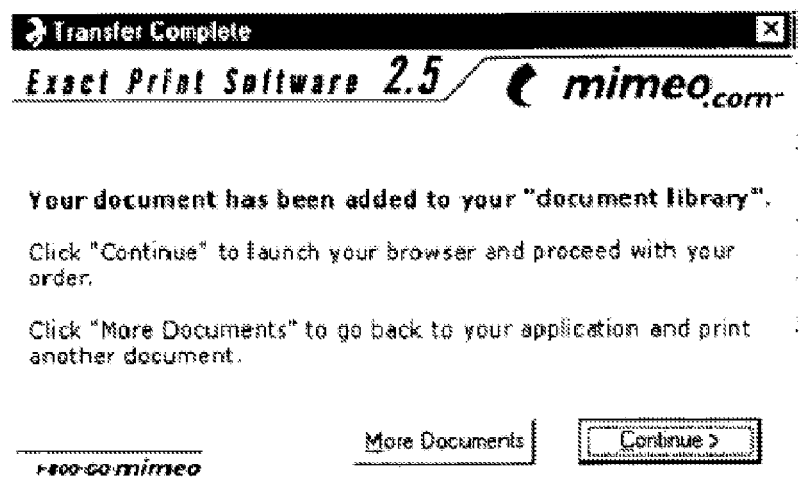
Figure 15K:
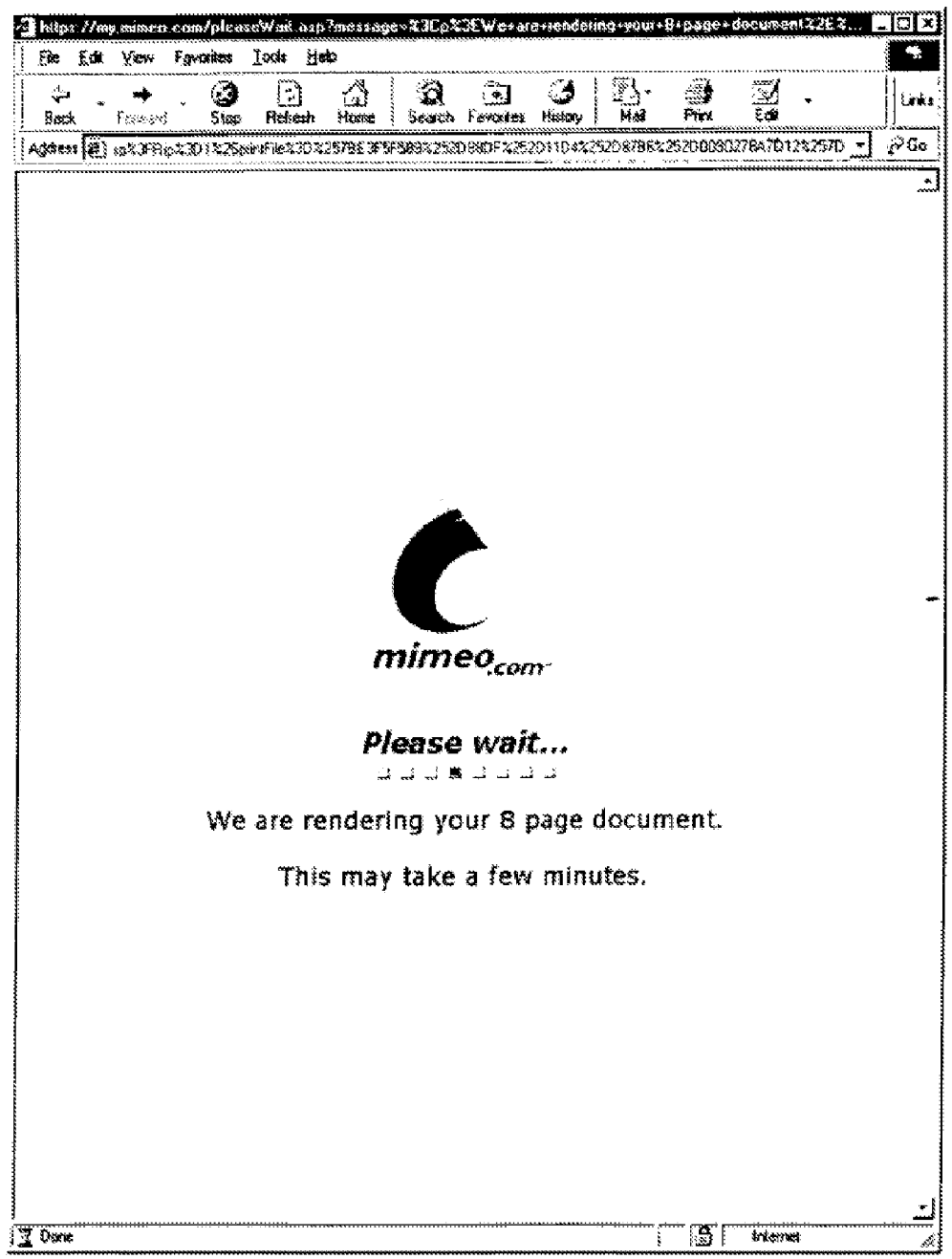

FIGS. 15A-15K depict illustrative screen shots of screens that allow a registered user to use this invention to print a document over a network. A user chooses a document residing on the client for printing. The document may be, for example, a Word document that the user has created. The user communicates to the upload manager a desire to use the system to print a selected document. For example, a user may select "print" from the "document" menu. When the print dialogue box is displayed, the user then selects a printer. To print over a network with the invention, the user can select, for example, a Mimeo printer option, such as the Mimeo Black/White printer as depicted in FIGS. 15B and 15C. From the print dialogue box, the user sets the number of copies to "1" even if the user actually desires to print multiple copies of the document. Once the document has been uploaded, a configuration GUI will allow the user make additional reproduction selections, including specifying the number of copies. The document is then compressed and encrypted, see FIGS. 15E and 15F. Then, the user logs in to the system, see FIG. 15G, and the upload manager transfers the indicated document from the user's computer to the UPJA 320, as described above. A confirmation screen notifies the user when the transfer is complete and outlines the specifications of the uploaded document. At this point, the user can also preview the uploaded document.

Figure 16A:
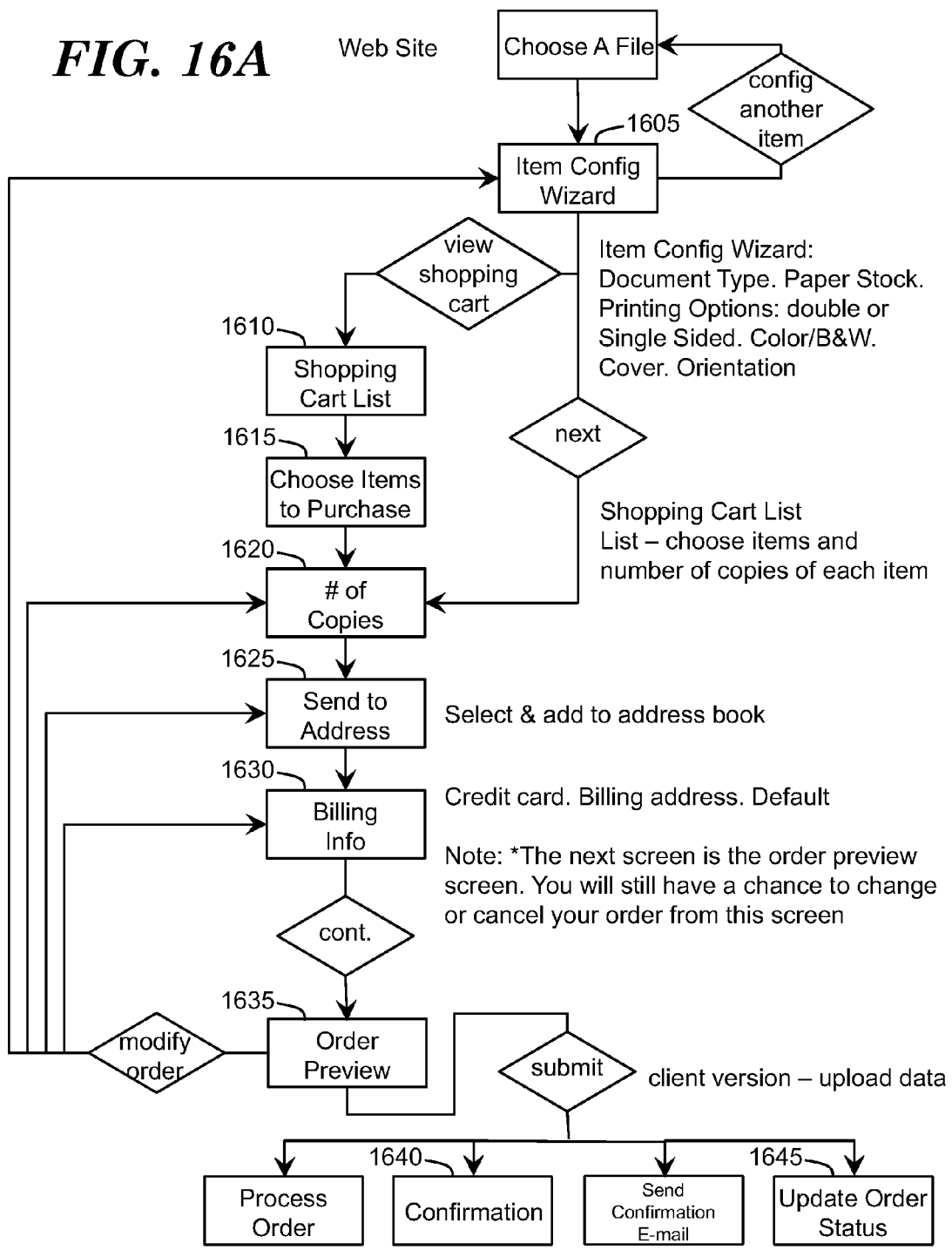
FIGS. 16A and 16B illustrate processing performed to configure a document.
Figure 16B:
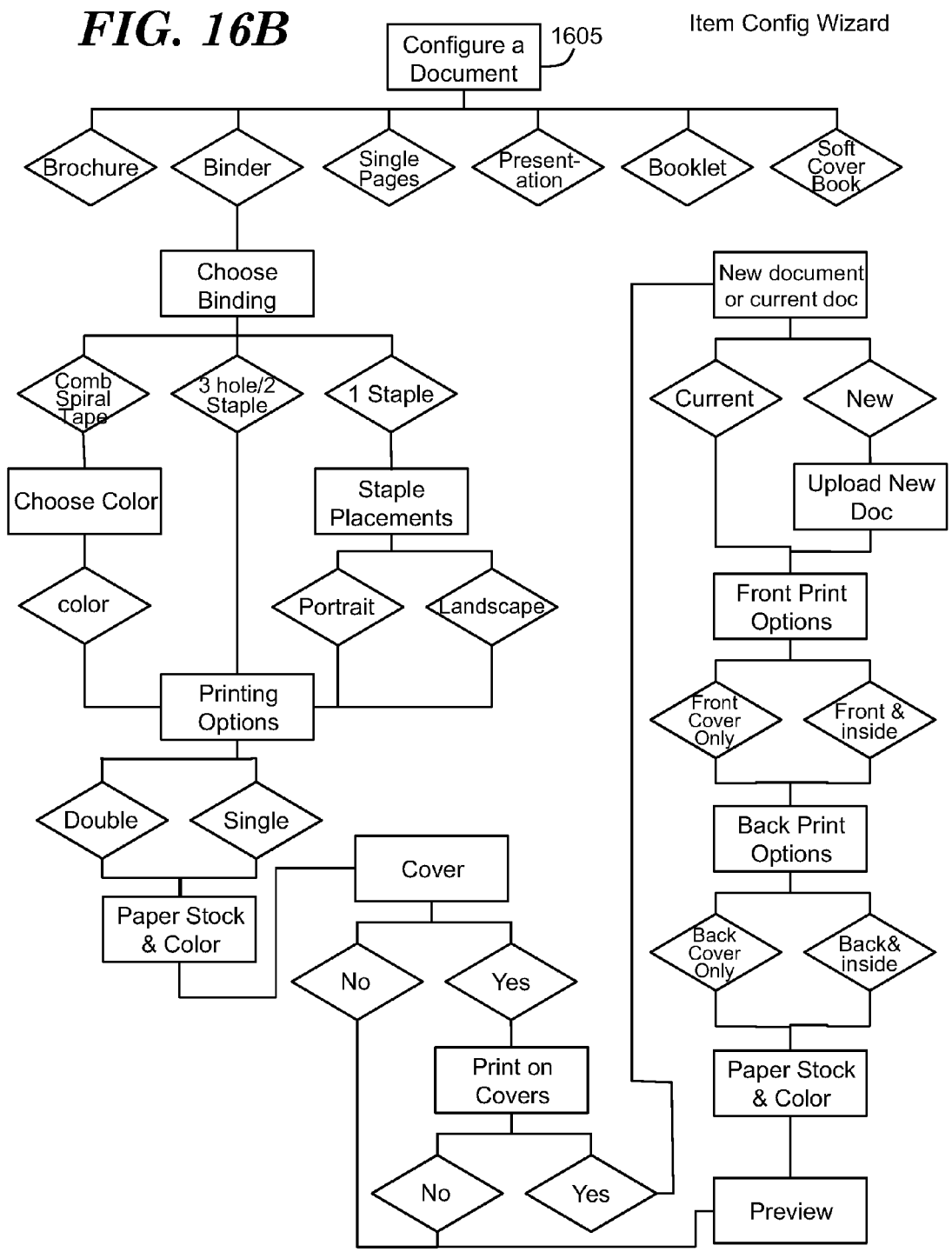

FIGS. 16A and 16B illustrate processing performed to configure a document. After logging on to the system, the user can select a document that has been uploaded to the system and is stored in a "library" of documents maintained by the system. The user may then configure and order the selected document. A configuration user interface, such as the "Item Configuration Wizard" allows the user to specify a variety of configuration and formatting options. FIG. 16A depicts a flow diagram of the processing performed relative to the Item Configuration Wizard. The Item Configuration Wizard allows the user to specify, for example, document type, paper stock, printing options, double or single sided copies, color versus black and white, cover and orientation (1605). Once the user has completed the configuration, document formatting process and previewed the document, the user is presented an option to either view their shopping cart (1610) and choose an item (i.e., a document) to be purchased for printing (1615), or to select the number of copies if only one document exists (1620). After the number of copies has been selected, the user can select the appropriate address for delivery of the printed document (1625), convey billing information (1630), preview and submit the order (1635), and receive confirmation (1640) and updates regarding the order (1645). The order may also be modified after preview if necessary. An order may be sent to multiple parties.

FIG. 16B illustrates an exemplary flow diagram for the Item Configuration Wizard described in FIG. 16A. Once a document has been selected by the user, the user can select the style in which the document will be printed (1605). For example, the user can select a document to be printed as a brochure, binded, single pages, presentation, booklet or soft cover book. If, for example, the user selects to bind the document, then the user can choose between multiple options such as staples, staple placement, landscape or portrait, spiral tape, and color of the tape. The user can then select printing options such as double or single sided, paper stock and color, a cover sheet, etc. These selections may be made, for example, from a pull-down menu. A user may also specify configuration parameters by clicking on specific areas of the document and selecting or dragging options over the page.

After completion of the selection process, the user can preview the document in accordance with the selections. This preview shows the actual view or representation of the document according to the selections. The preview feature allows a user to preview multiple pages of the document simultaneously, as desired, so that the user may, for example, view the overall view and representation of the document. The graphical user interface also includes a zoom feature that allows a user to zoom into any page and preview the document at full size. Configuration parameters may be repeatedly changed by a user until the document has been ordered.

Figure 17A:
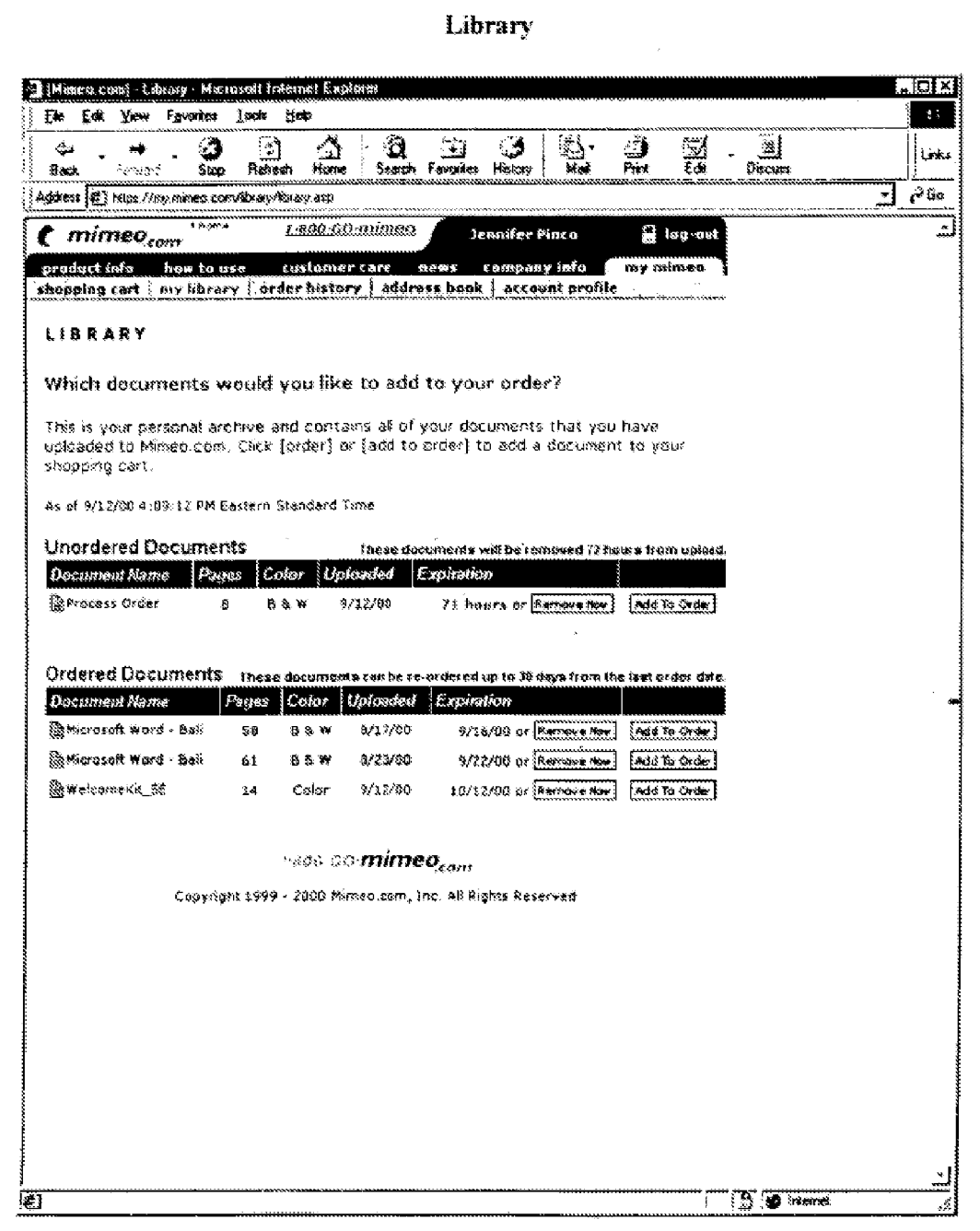
Figure 17B:
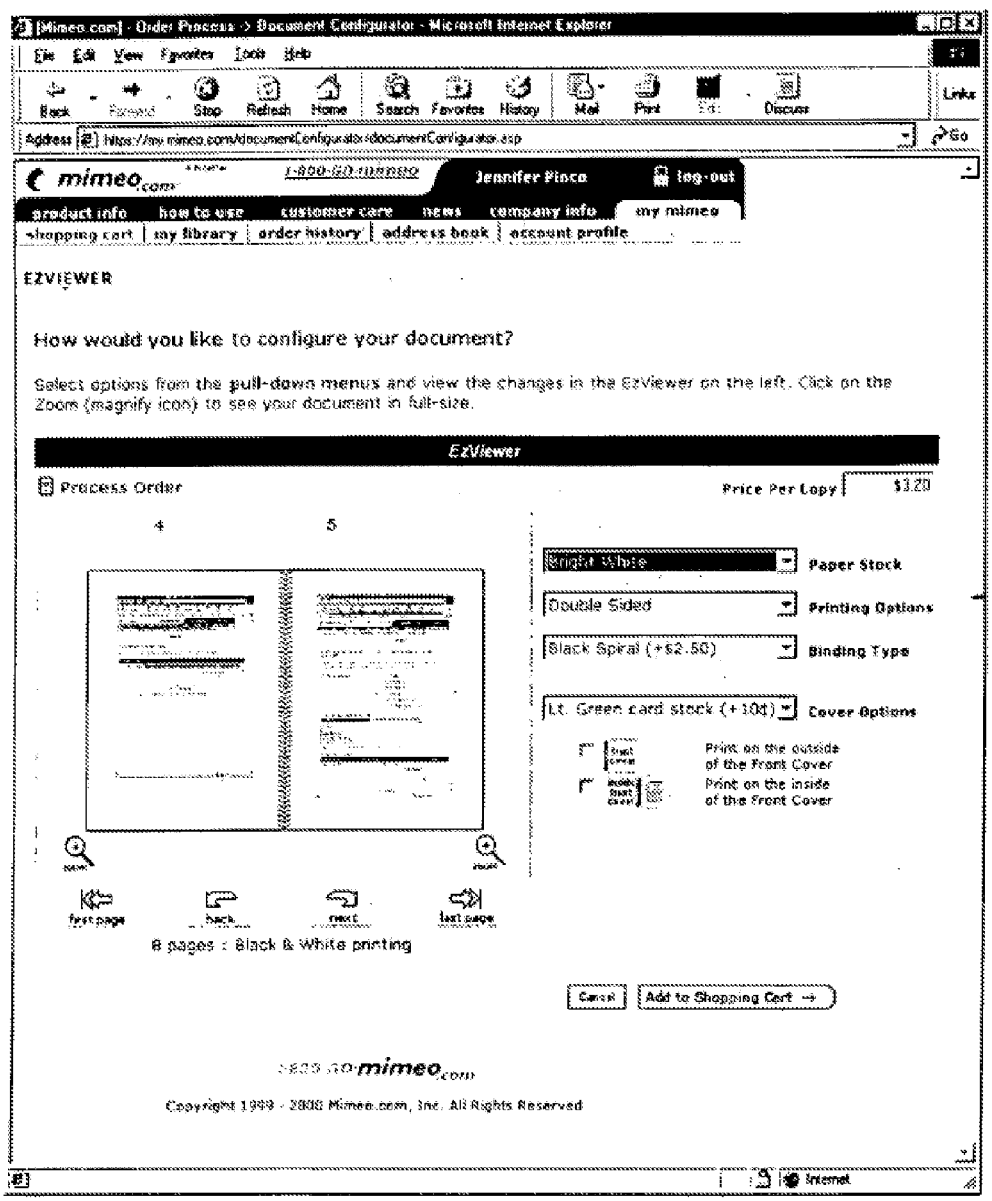
FIGS. 17A-17Q depict additional illustrative screen shots of a graphical user interface for configuring, viewing and ordering a document.
FIG. 17S depicts an illustrative screen shot of an address book entry screen.
FIG. 17R depicts an illustrative screen shot of an account file screen that allows a user to verify and modify account settings such as password, account address, and default delivery.
Figure 17C:
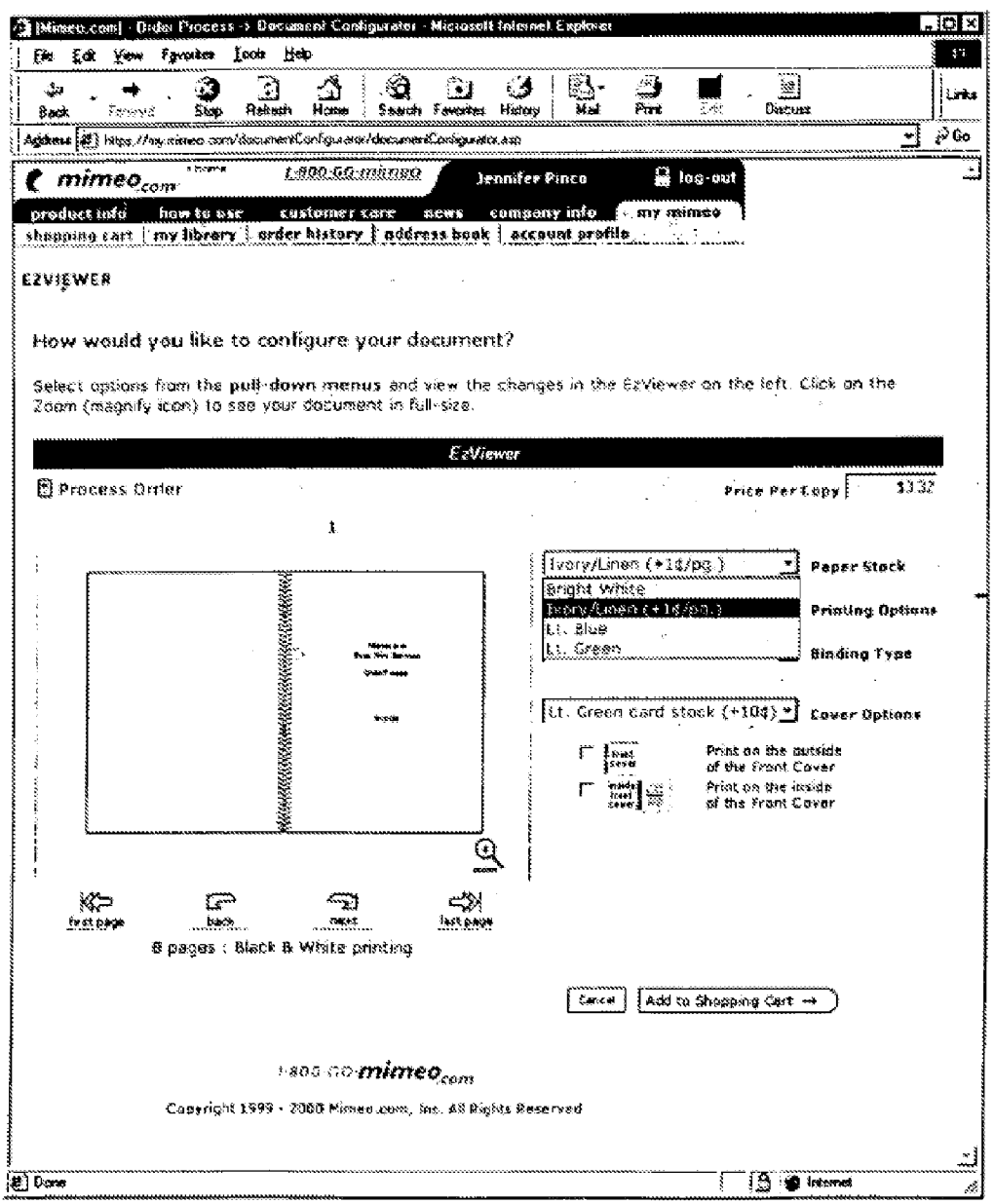
Figure 17D:
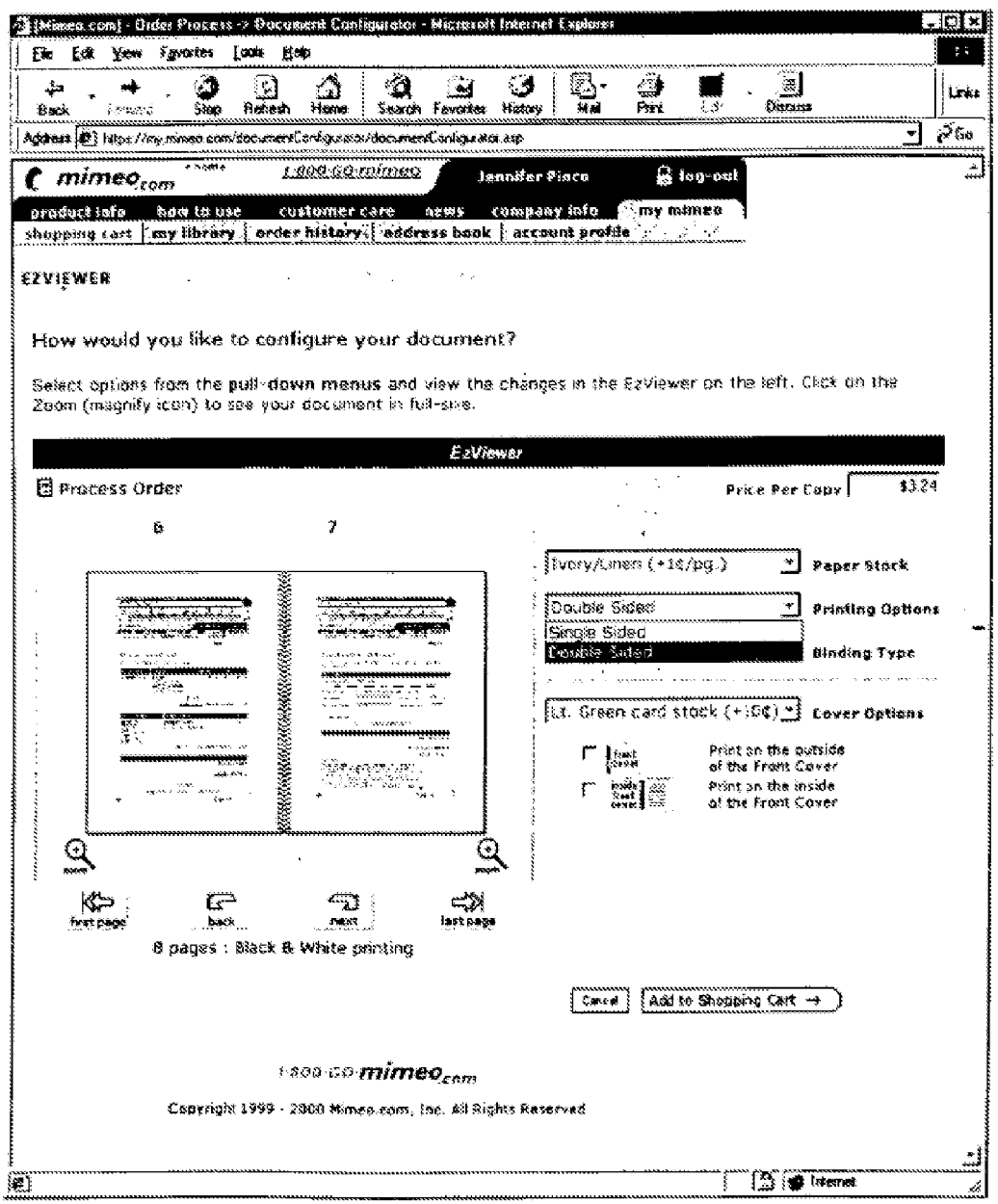
Figure 17E:
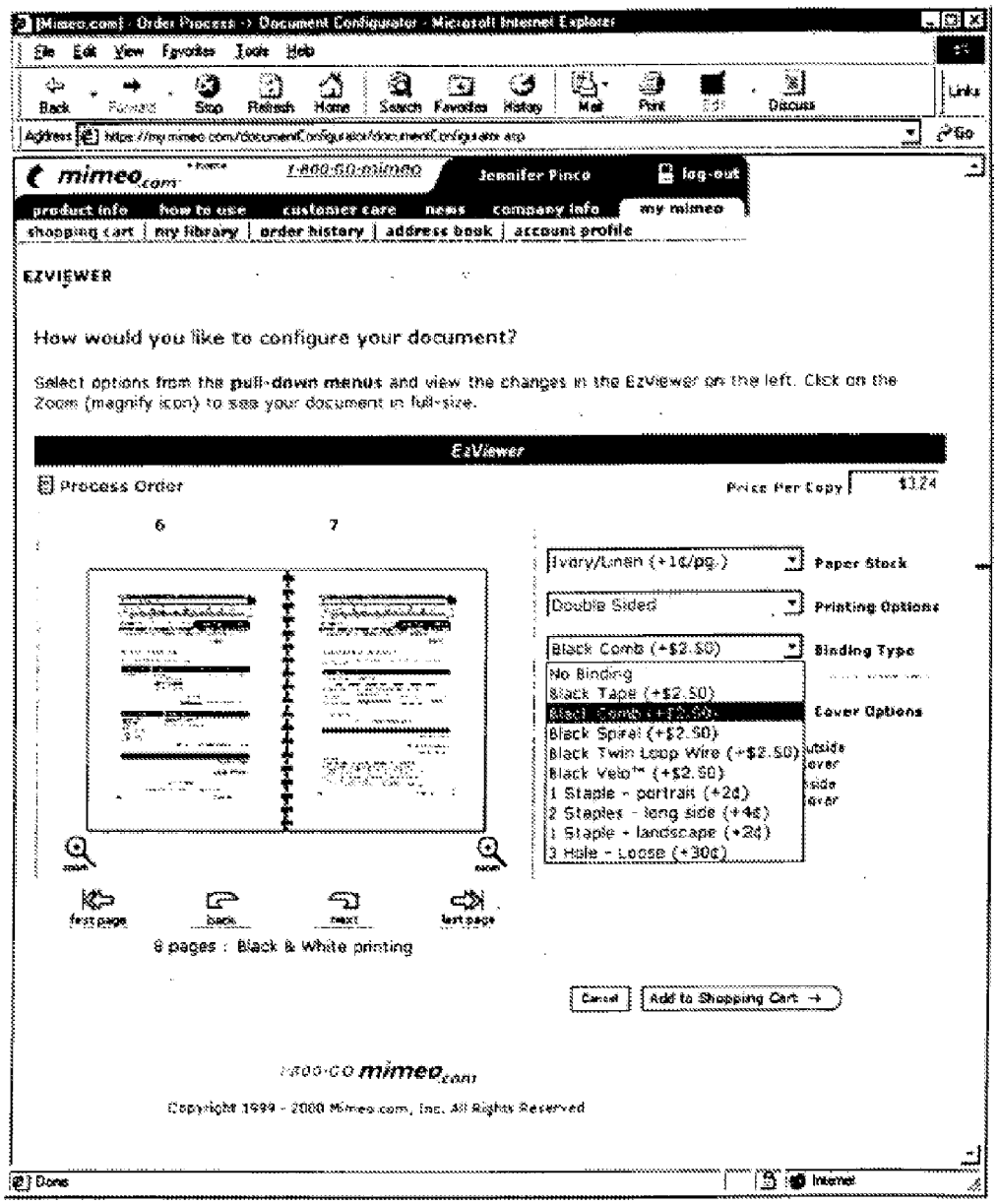
Figure 17F:
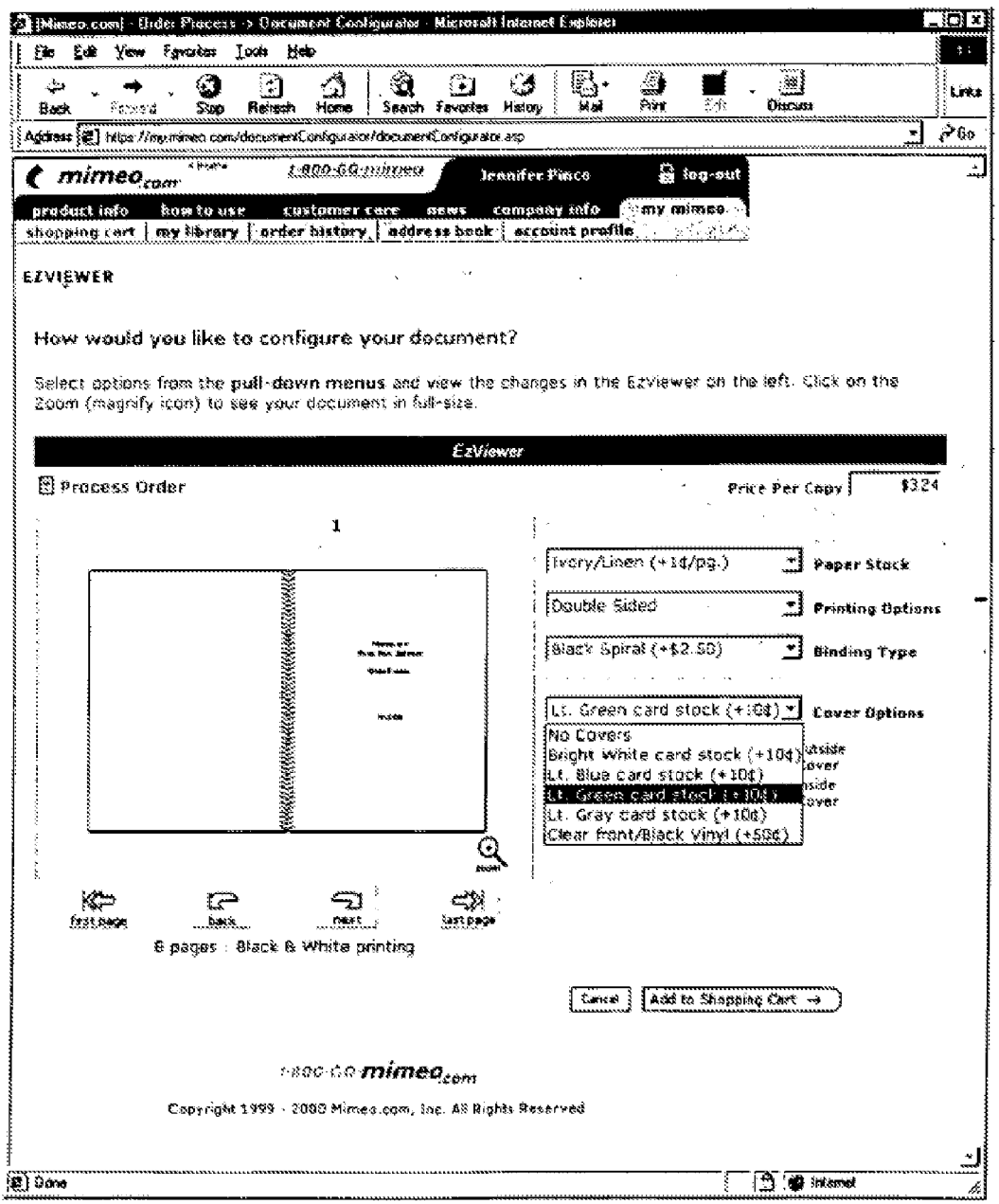
Figure 17G:
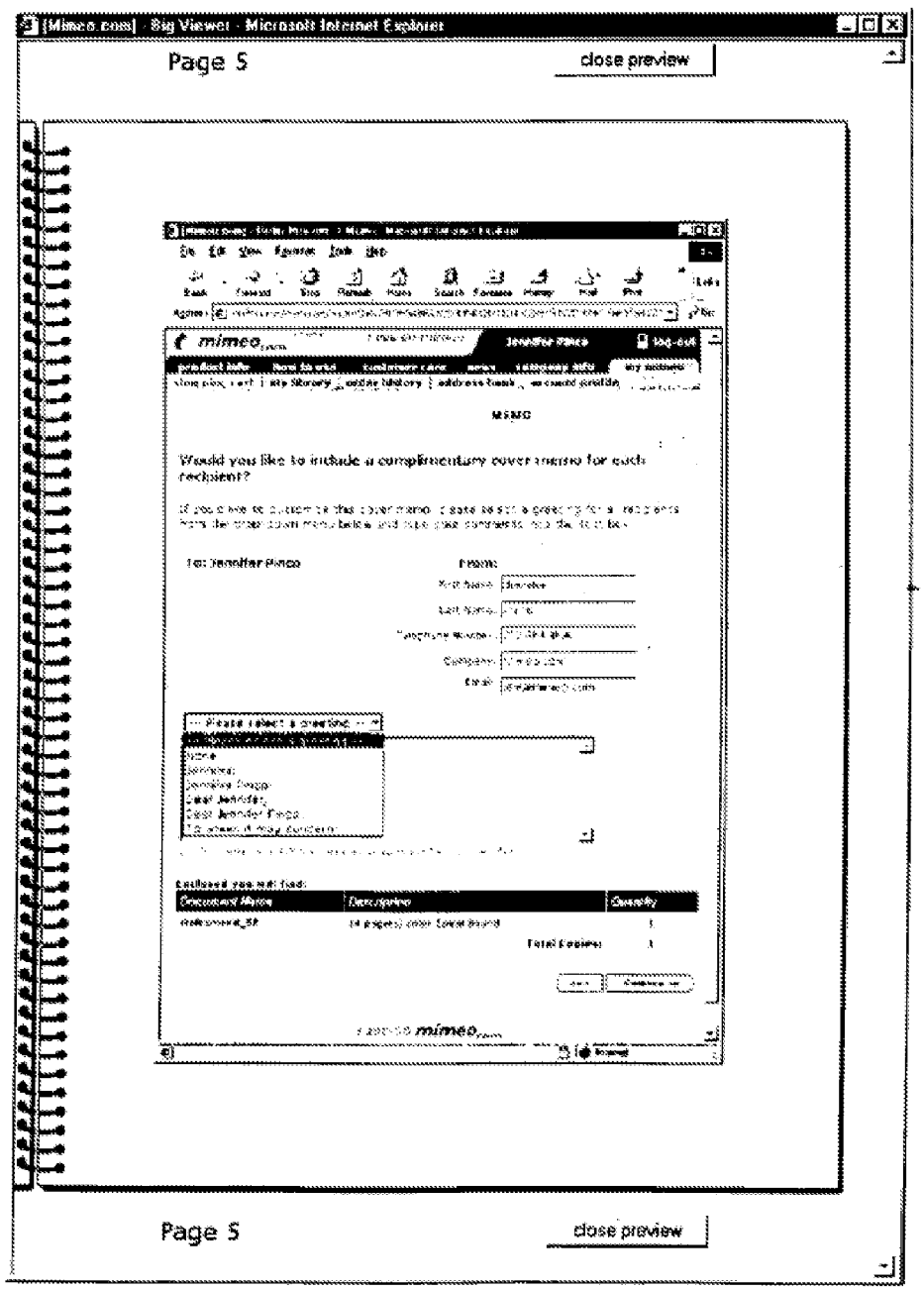
Figure 17H:
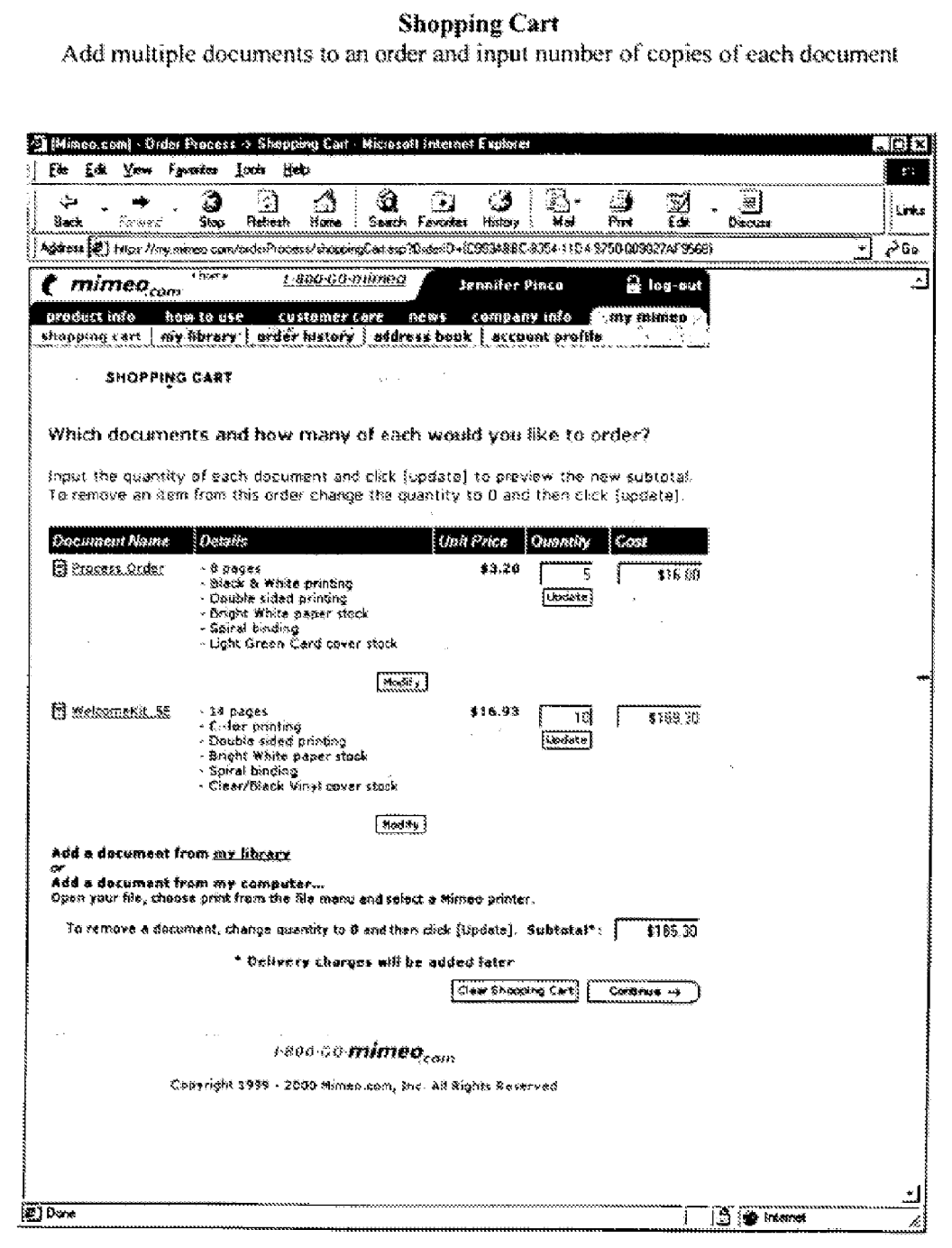
Figure 17I:
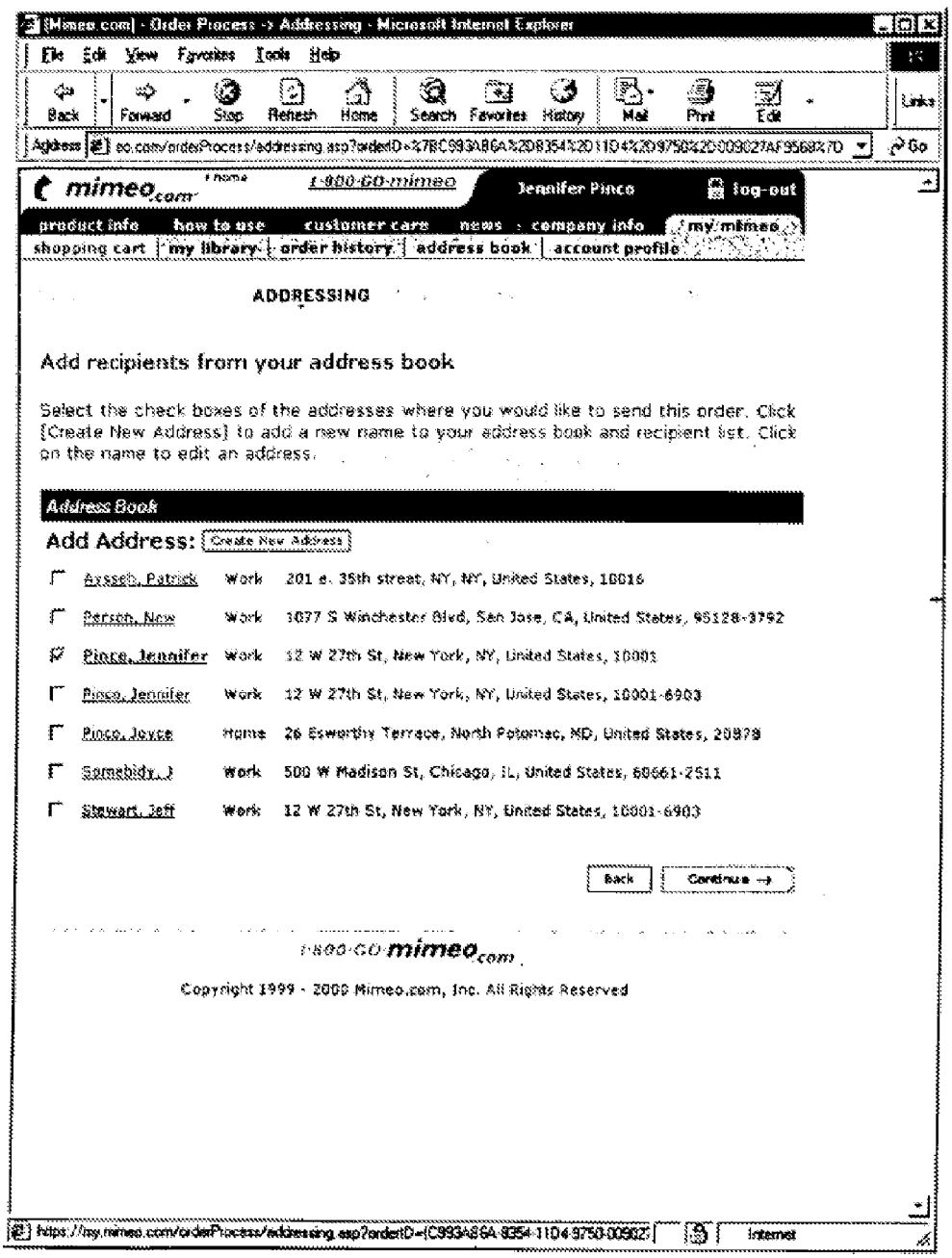
Figure 17J:
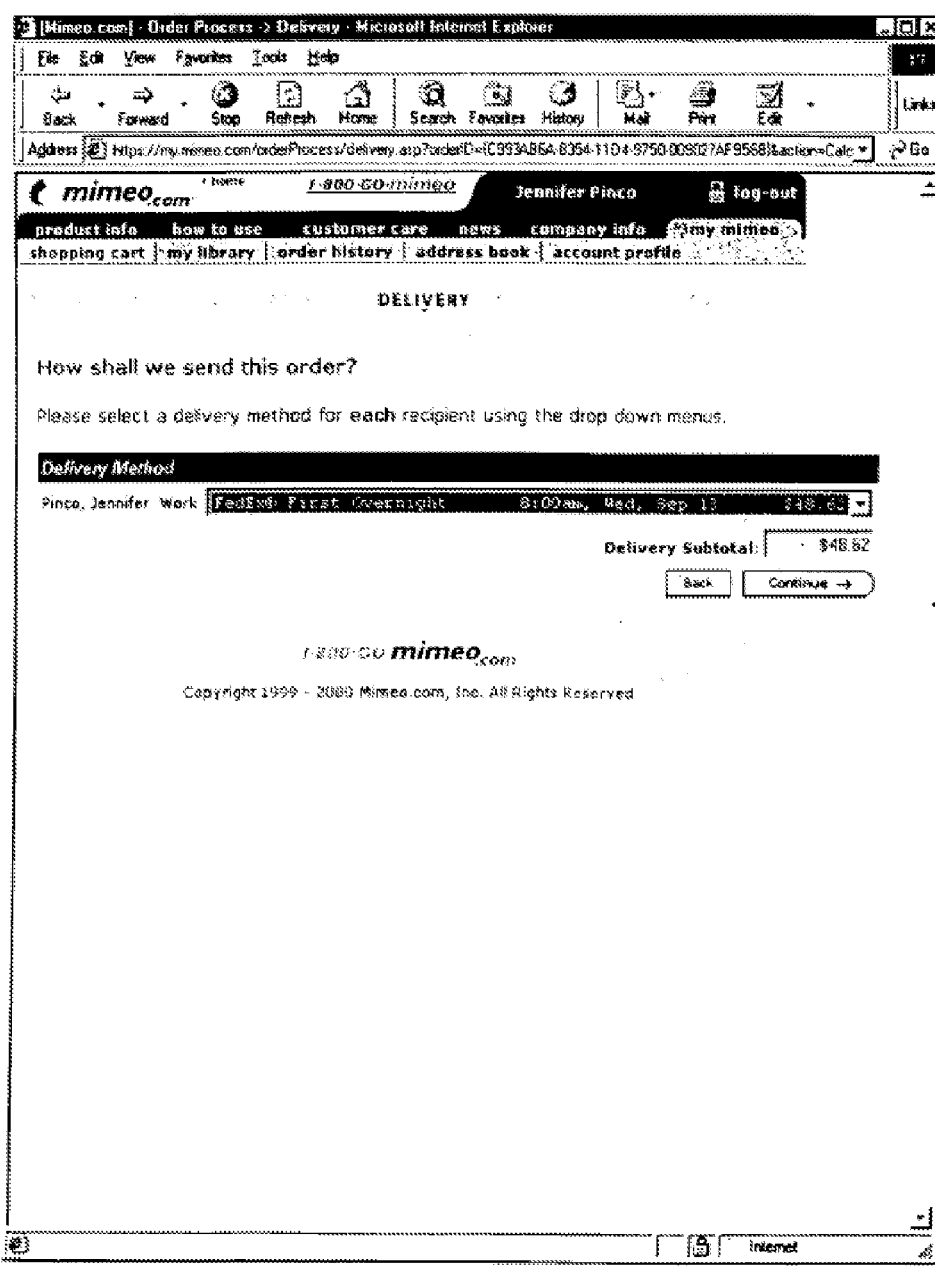
Figure 17K:
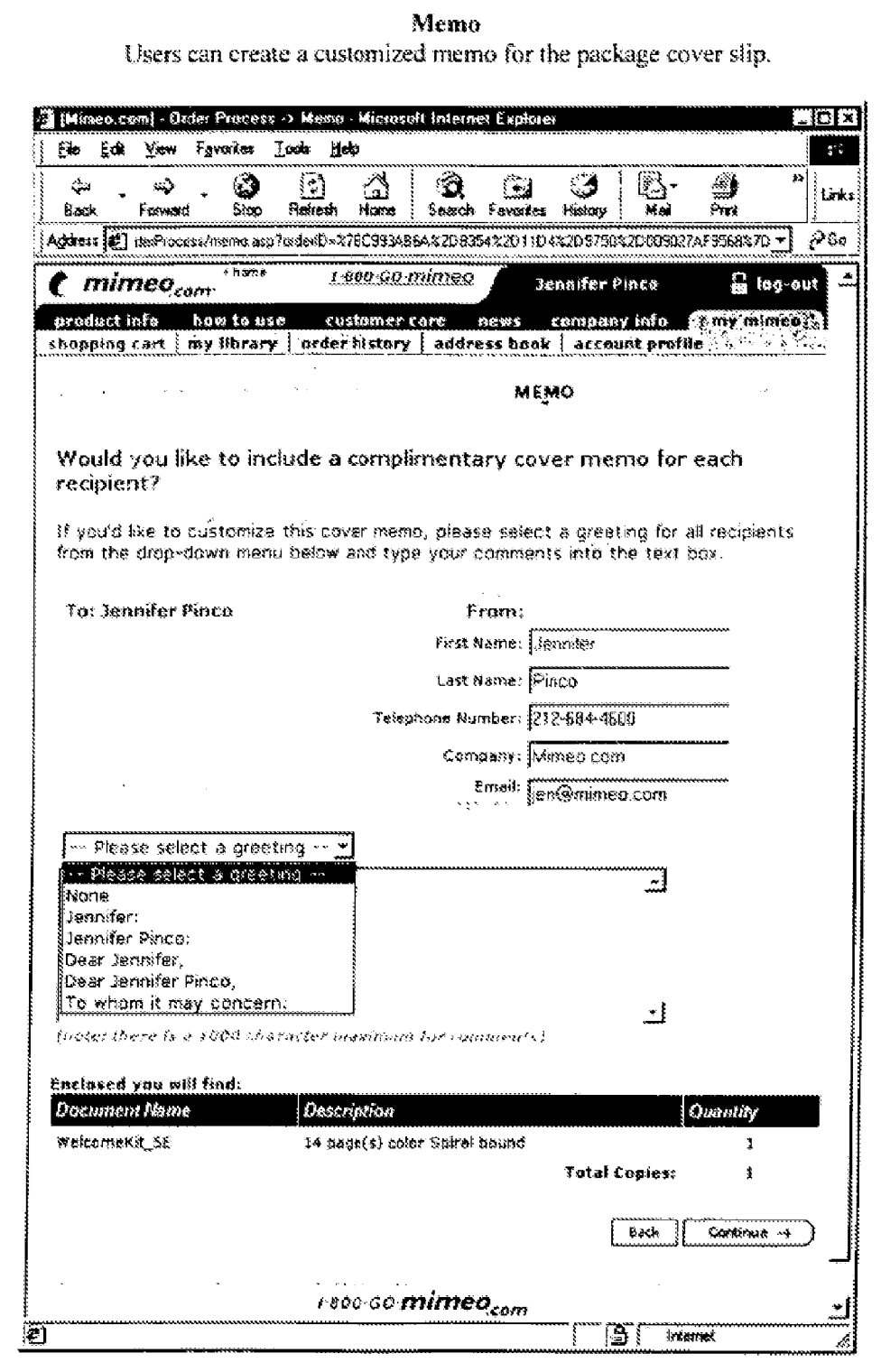
Figure 17L:
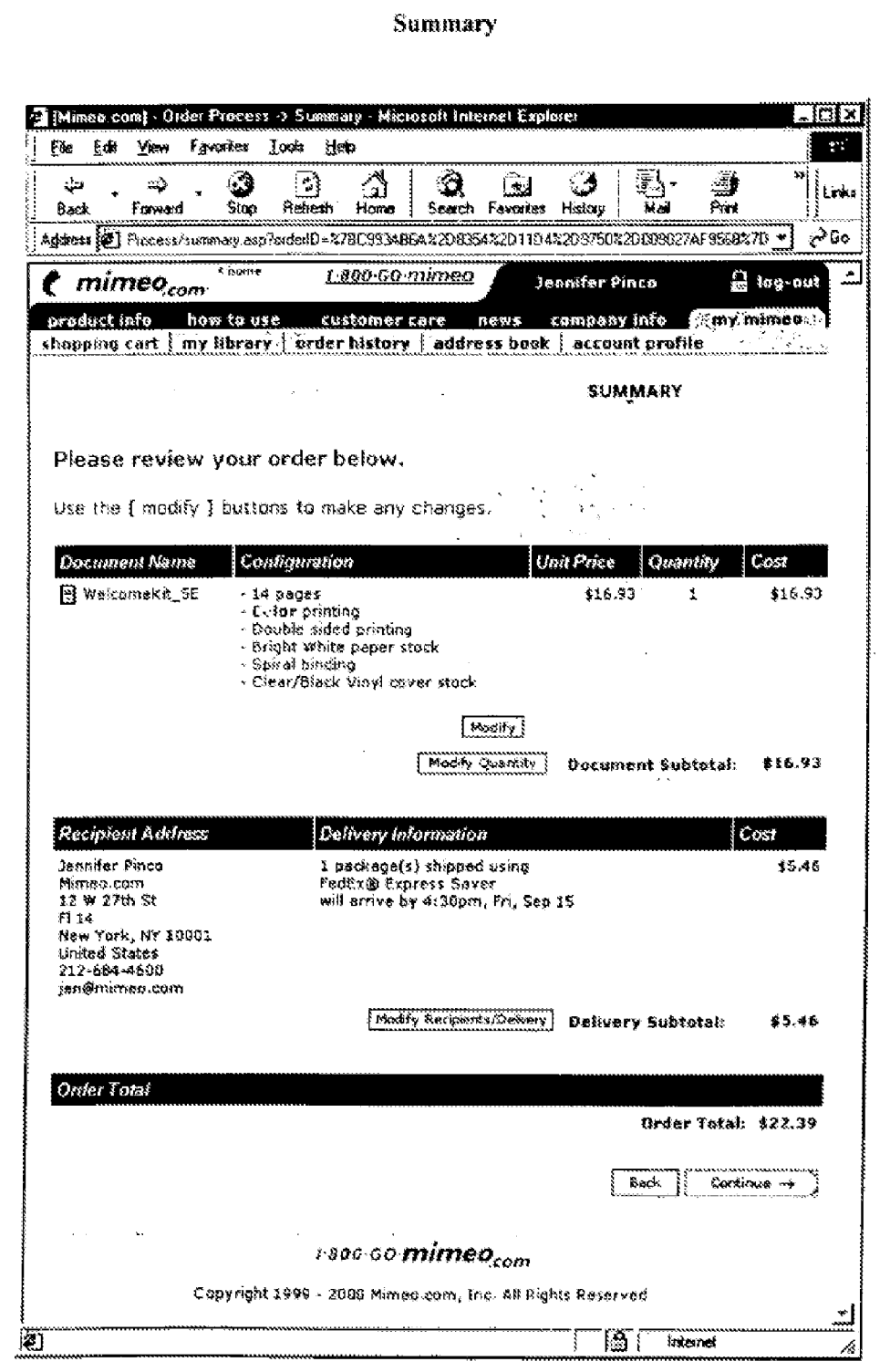
Figure 17M:
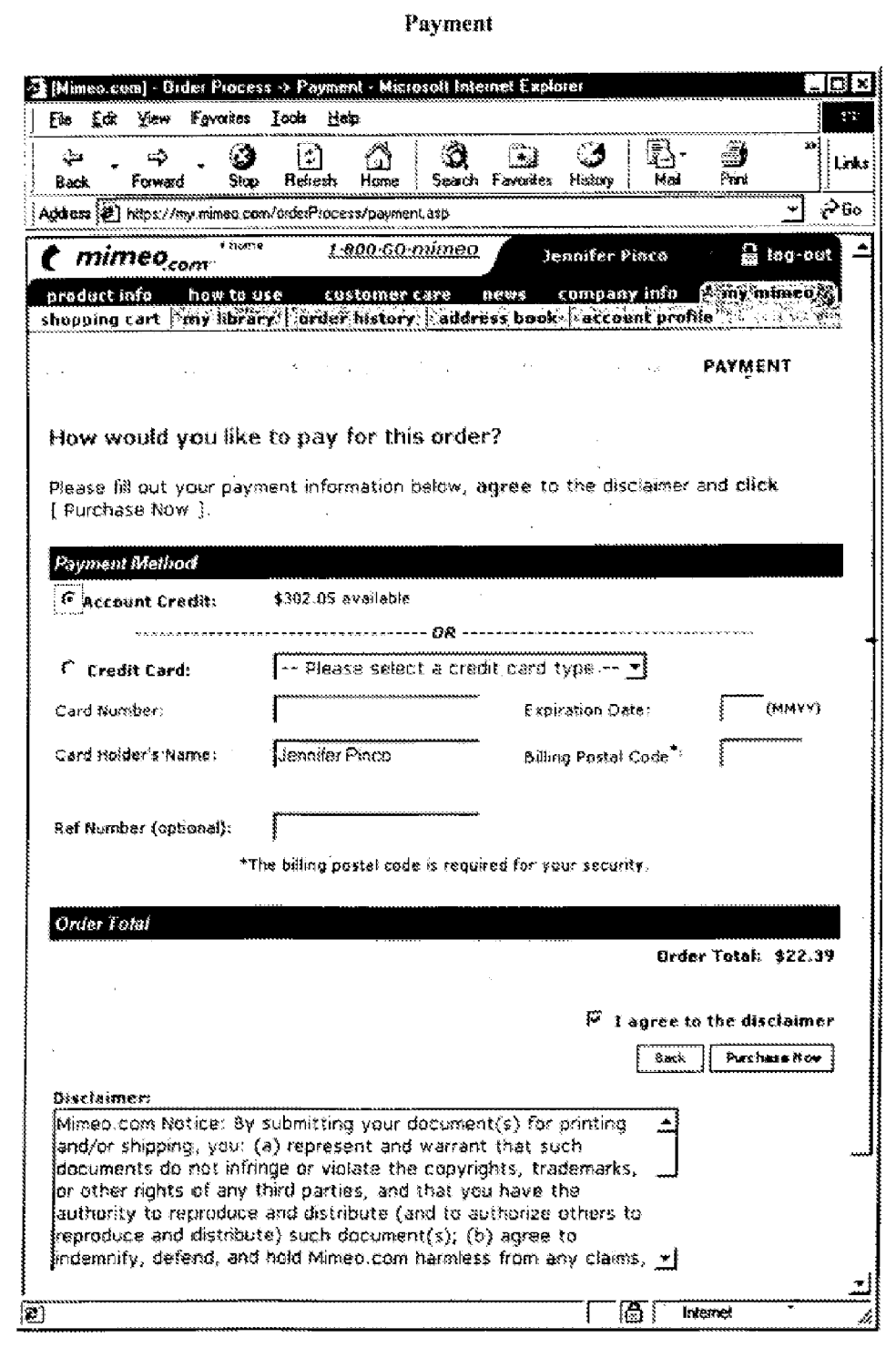
Figure 17N:
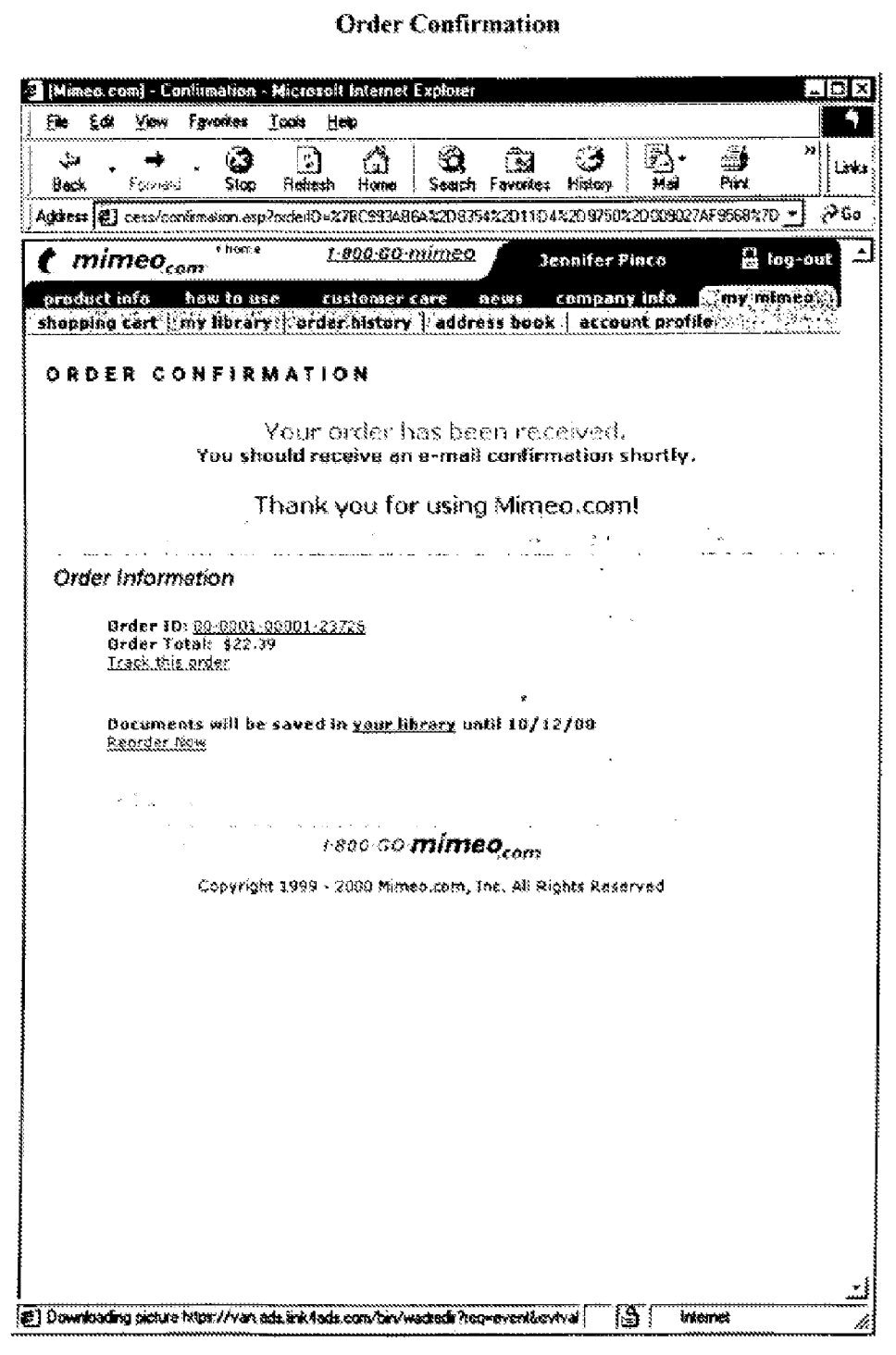
Figure 17O:
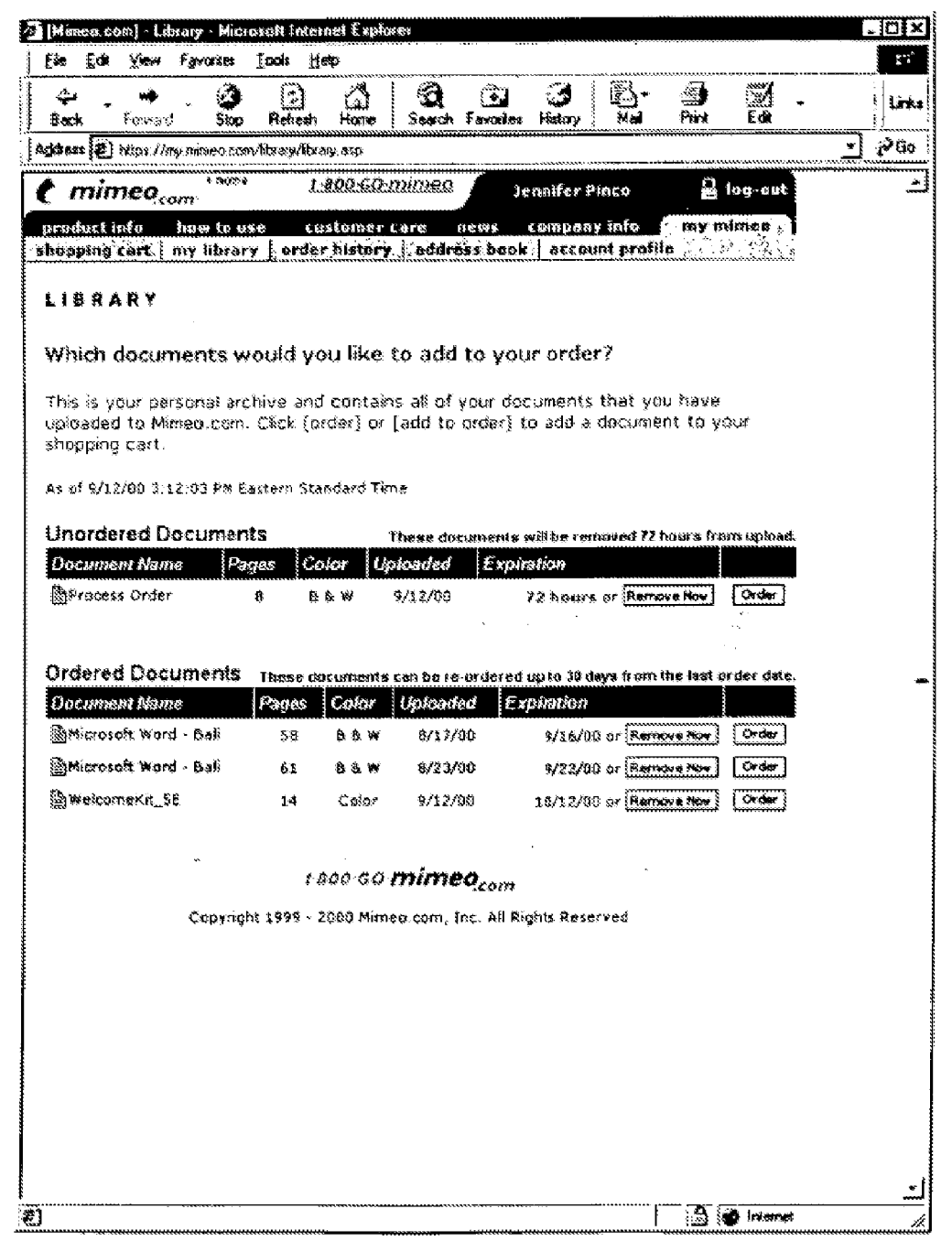
Figure 17P:
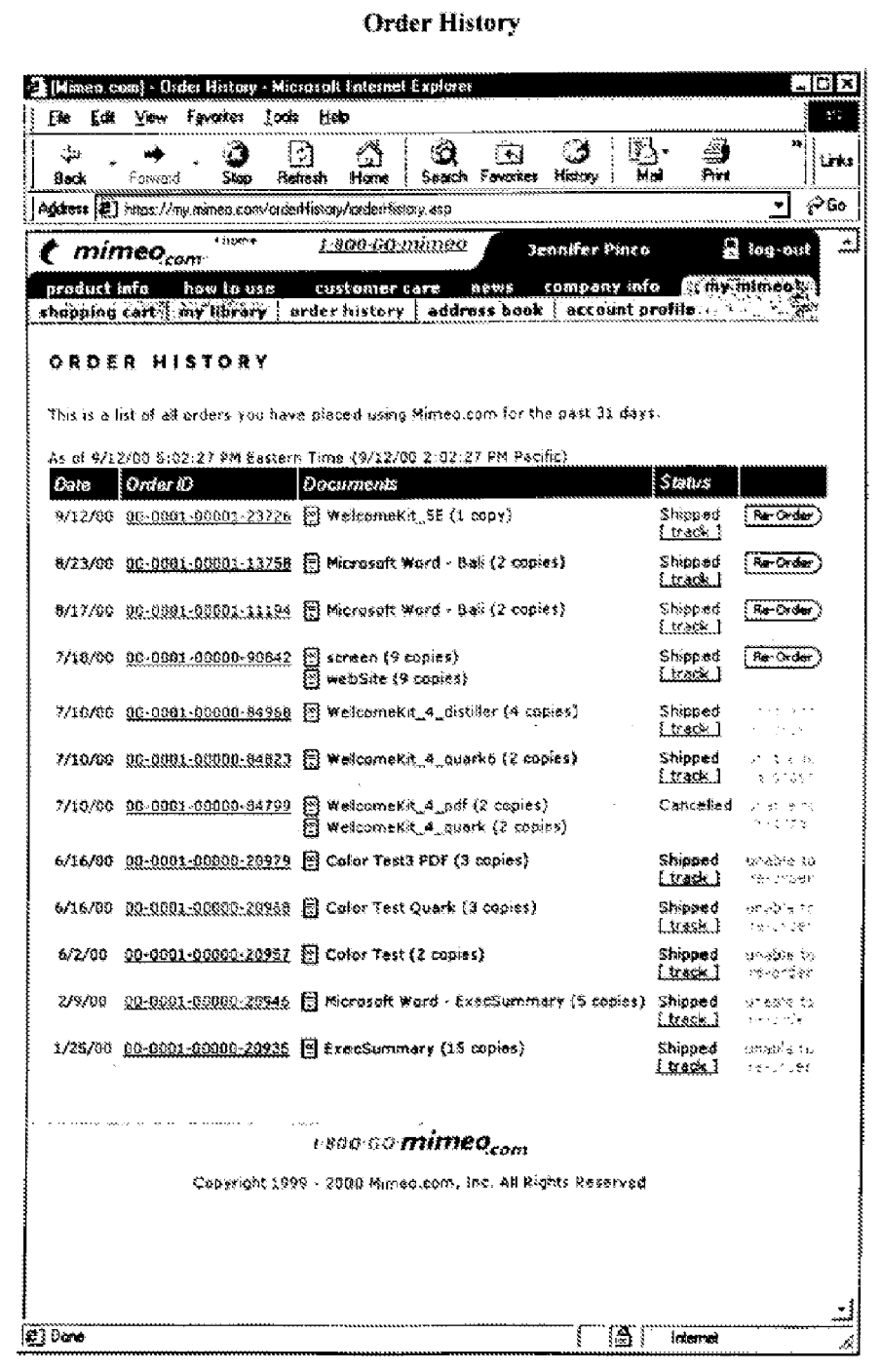
Figure 17Q:

FIGS. 17A-17Q depict additional illustrative screen shots of a graphical user interface for configuring, viewing and ordering a document. As depicted in these figures, after completing the configuration process, a user specifies an address list of intended recipients. Then, the user selects a delivery method for each recipient by making selections, for example, from a pull-down menu. The system also allows the user to create a customized memo, i.e., package cover slip, for each recipient (see FIG. 17K). Once the order process is completed, a summary screen, depicted in FIG. 17L, displays details of the order. If the order is correct, then the user proceeds to a payment screen, depicted in FIG. 17M. Otherwise, the user may return to the previous order and configuration selection screens to amend the order as appropriate. Once the user indicates a payment method, the a confirmation screen, depicted in FIG. 17N, is displayed.

FIGS. 17O-17Q depict screen shots of illustrative order tracking screens.

Figure 17R:
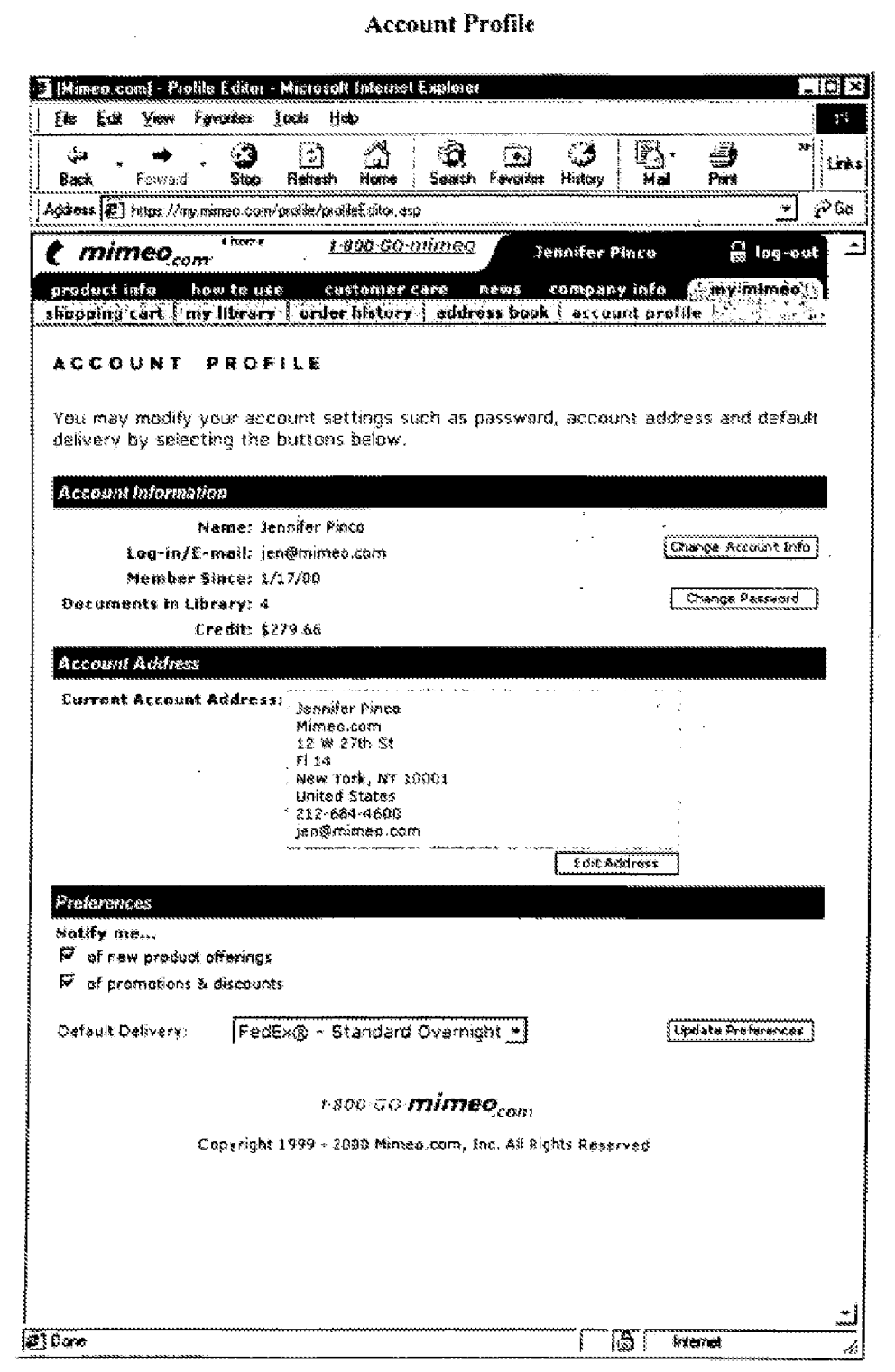
Figure 17S:
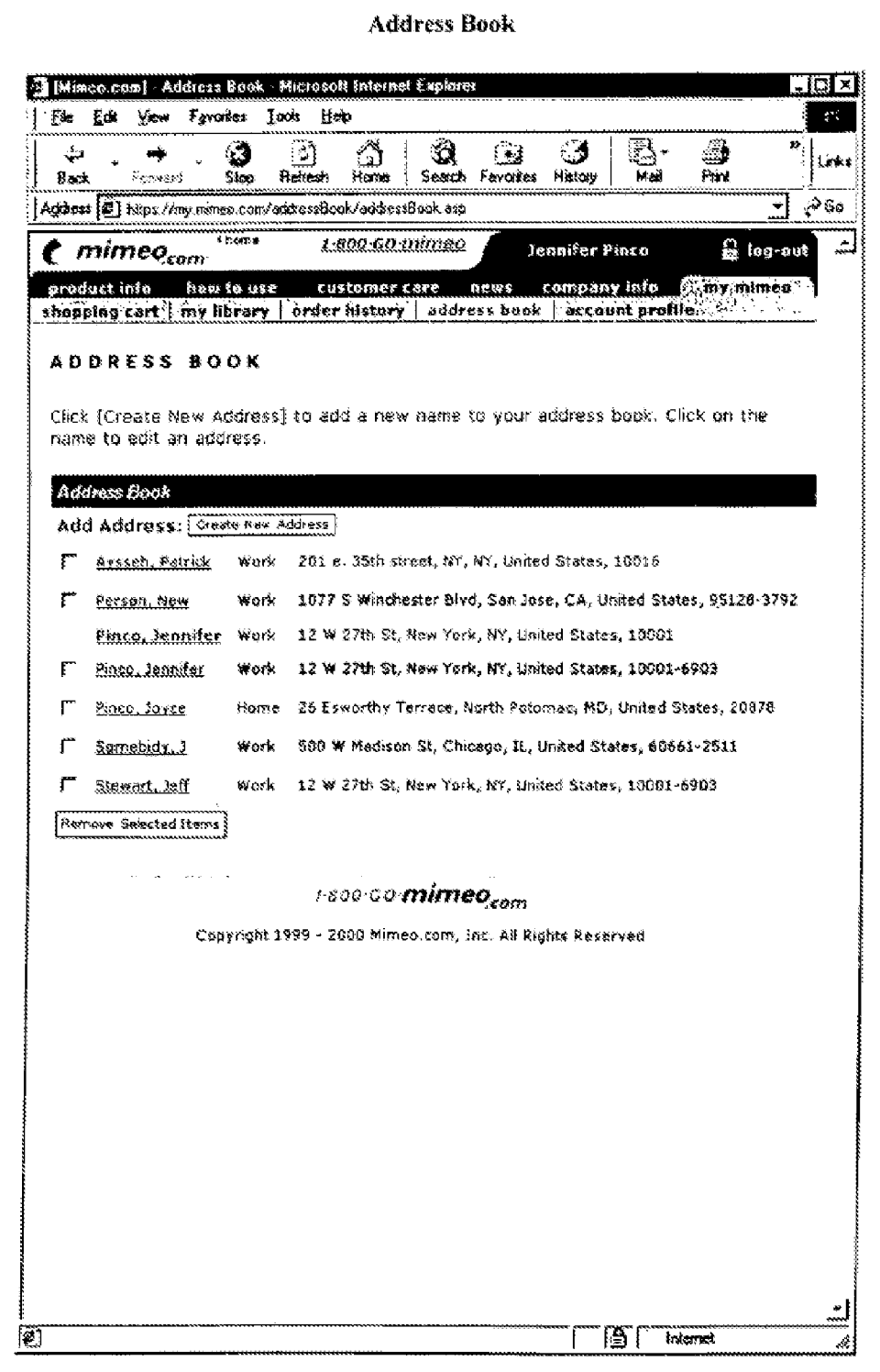

FIG. 17S depicts an illustrative screen shot of an address book entry screen.

FIG. 17R depicts an illustrative screen shot of an account file screen that allows a user to verify and modify account settings such as password, account address, and default delivery.

The graphical user interfaces can be stored, for example, on a web server, in a database or as software residing on the client: It should be noted that other types of manufacturing over a network can be previewed. For example, similar to previewing a document before it is bound, the manufacturing of a product may be viewed prior to production.

Although this invention has been described relative to a particular embodiment, one of skill in the art will appreciate that this description is merely exemplary and the system and method of this invention may include additional or different components. This description is therefore limited only by the appended claims and the full scope of their equivalents.

What is claimed is:

1. A method of printing a document over a network, the method comprising:

obtaining document information for a document on a server from system software executing on a client, wherein the system software is configured to enable a user of the client to use an application to request generation of a print file based on the document using the application, generate the print file on the client in response to the request without further user interaction, and initiate transmitting the print file from the client to the server in response to the generation of the print file and without user-initiated interaction with the server;

generating a unique identifier for the document on the server and transmitting the unique identifier for use by the system software in response to obtaining the document information;

obtaining the print file on the server from the system software executing on the client subsequent to obtaining the document information;

storing the print file using the unique identifier;

obtaining a request for a configuration graphical user interface from the client subsequent to obtaining the print file; and providing the configuration graphical user interface for display in a browser on the client in response to the request.

2. The method of claim 1, further comprising:

obtaining configuration information for the document on the server from the configuration graphical user interface, wherein the configuration information includes at least one printing option for the document and defines how to assemble a printed copy of the document;

printing a copy of the document based on the print file and the configuration information; and assembling the copy of the document as defined by the configuration information.

3. The method of claim 2, wherein the obtaining configuration information includes:

generating a preview of a configured copy of the document on the server based on the print file and the configuration information, wherein the configuration graphical user interface includes a preview area for displaying the preview and a printing option area for obtaining a printing option;

providing the preview for display at the client;

obtaining the printing option for printing the document from the configuration graphical user interface at the server;

modifying the preview on the server based on the print file and the printing option; and providing the modified preview for display at the client.

4. The method of claim 1, further comprising:

installing the system software on the client, wherein the system software includes at least one print driver for generating the print file on the client and an upload manager for communicating the print file from the client to the server;

generating the print file on the client using one of the at least one print driver on the client; and transmitting the print file from the client over the network to the server using the upload manager.

5. A method of generating a graphical user interface comprising:

generating content for a display area of the graphical user interface, wherein the display area concurrently includes:
- a preview area for displaying a preview of a configured copy of a document, wherein the preview is based on a print file and configuration information for the document, wherein the configuration information includes at least one printing option and defines how to assemble a printed copy of the document;
- a navigation area that enables a user to select a portion of the configured copy of the document displayed in the preview area;
- an estimate area for displaying a price estimate for printing and assembling the configured copy, wherein the price estimate is based on the print file and the configuration information; and
- a configuration area that enables the user to alter the configuration information, wherein the preview area and the estimate area are automatically updated based on the altered configuration information.

* * * * *